(12) United States Patent
Nakamura et al.

(10) Patent No.: US 10,241,333 B2
(45) Date of Patent: Mar. 26, 2019

(54) LIGHT GUIDE, VIRTUAL IMAGE DISPLAY DEVICE, AND LIGHT GUIDE UNIT

(71) Applicants: Naoki Nakamura, Saitama (JP); Toshiaki Tokita, Kanagawa (JP); Shiori Ohsugi, Kanagawa (JP); Takashi Kubota, Tokyo (JP)

(72) Inventors: Naoki Nakamura, Saitama (JP); Toshiaki Tokita, Kanagawa (JP); Shiori Ohsugi, Kanagawa (JP); Takashi Kubota, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 64 days.

(21) Appl. No.: 15/394,157

(22) Filed: Dec. 29, 2016

(65) Prior Publication Data

US 2017/0192239 A1    Jul. 6, 2017

(30) Foreign Application Priority Data

Jan. 6, 2016   (JP) .................................. 2016-000829
Feb. 17, 2016  (JP) .................................. 2016-027802
Feb. 17, 2016  (JP) .................................. 2016-027803

(51) Int. Cl.
*G02B 27/14*    (2006.01)
*G09G 5/00*    (2006.01)
(Continued)

(52) U.S. Cl.
CPC ....... *G02B 27/0172* (2013.01); *G02B 6/0036* (2013.01); *G02B 6/0038* (2013.01);
(Continued)

(58) Field of Classification Search
CPC .... G02B 2027/0125; G02B 2027/0145; G02B 27/0101; G02B 27/0172; G02B 6/0036;
(Continued)

(56) References Cited

U.S. PATENT DOCUMENTS 6,361,180 B1   3/2002  Iimura
8,189,263 B1   5/2012  Wang et al.
(Continued)

FOREIGN PATENT DOCUMENTS

FR   2 973 889 A1   10/2012
JP   2002-162912    6/2002
(Continued)

OTHER PUBLICATIONS

Extended European Search Report dated May 9, 2017 in Patent Application No. 16206436.4.
U.S. Appl. No. 15/270,678, filed Sep. 20, 2016.

*Primary Examiner* — William Choi
(74) *Attorney, Agent, or Firm* — Oblon, McClelland, Maier & Neustadt, L.L.P.

(57) ABSTRACT

A light guide includes a light-guide member including an incidence portion through which image light emitted from an image display element enters the light-guide member; an exit portion through which the image light exits the light-guide member to an outside of the light-guide member; a retroreflection portion to reverse a direction of travel of the image light guided through the light-guide member; and an extraction portion to guide the image light reversed by the retroreflection portion to the exit portion. The retroreflection portion has a plurality of surfaces.

16 Claims, 42 Drawing Sheets

(51) Int. Cl.
  *G02B 27/01* (2006.01)
  *F21V 8/00* (2006.01)
(52) U.S. Cl.
  CPC .......... *G02B 6/0011* (2013.01); *G02B 6/0053* (2013.01); *G02B 2027/0125* (2013.01)
(58) Field of Classification Search
  CPC ... G02B 6/0038; G02B 6/0011; G02B 6/0053
  USPC .................................. 359/630–633; 345/7–9
  See application file for complete search history.

(56) References Cited

U.S. PATENT DOCUMENTS

| | | |
|---|---|---|
| 8,446,675 B1 | 5/2013 | Wang et al. |
| 2004/0263968 A1 | 12/2004 | Kobayashi et al. |
| 2006/0132914 A1 | 6/2006 | Weiss et al. |
| 2007/0159673 A1 | 7/2007 | Freeman et al. |
| 2007/0171328 A1 | 7/2007 | Freeman et al. |
| 2007/0171329 A1 | 7/2007 | Freeman et al. |
| 2009/0015929 A1 | 1/2009 | Dejong et al. |
| 2009/0251788 A1 | 10/2009 | Dejong et al. |
| 2010/0201953 A1 | 8/2010 | Freeman et al. |
| 2010/0202034 A1 | 8/2010 | Freeman et al. |
| 2011/0052282 A1 | 3/2011 | Shinshi et al. |
| 2012/0057253 A1 | 3/2012 | Takagi et al. |
| 2014/0092482 A1 | 4/2014 | Dubroca et al. |
| 2014/0177032 A1* | 6/2014 | Woodgate .......... G02B 27/2214 359/298 |
| 2015/0138646 A1 | 5/2015 | Tatsugi |

FOREIGN PATENT DOCUMENTS

| | | |
|---|---|---|
| JP | 2002-372881 | 12/2002 |
| JP | 2011-076060 | 4/2011 |
| JP | 2012-88472 | 5/2012 |
| JP | 2012-198260 | 10/2012 |
| JP | 2013-210633 | 10/2013 |
| JP | 2014-126773 | 7/2014 |
| JP | 2014-178520 | 9/2014 |
| JP | 2015-53163 | 3/2015 |
| WO | WO 03/081320 A1 | 10/2003 |
| WO | WO 2007/062098 A2 | 5/2007 |
| WO | WO 2009/074638 A2 | 6/2009 |

* cited by examiner

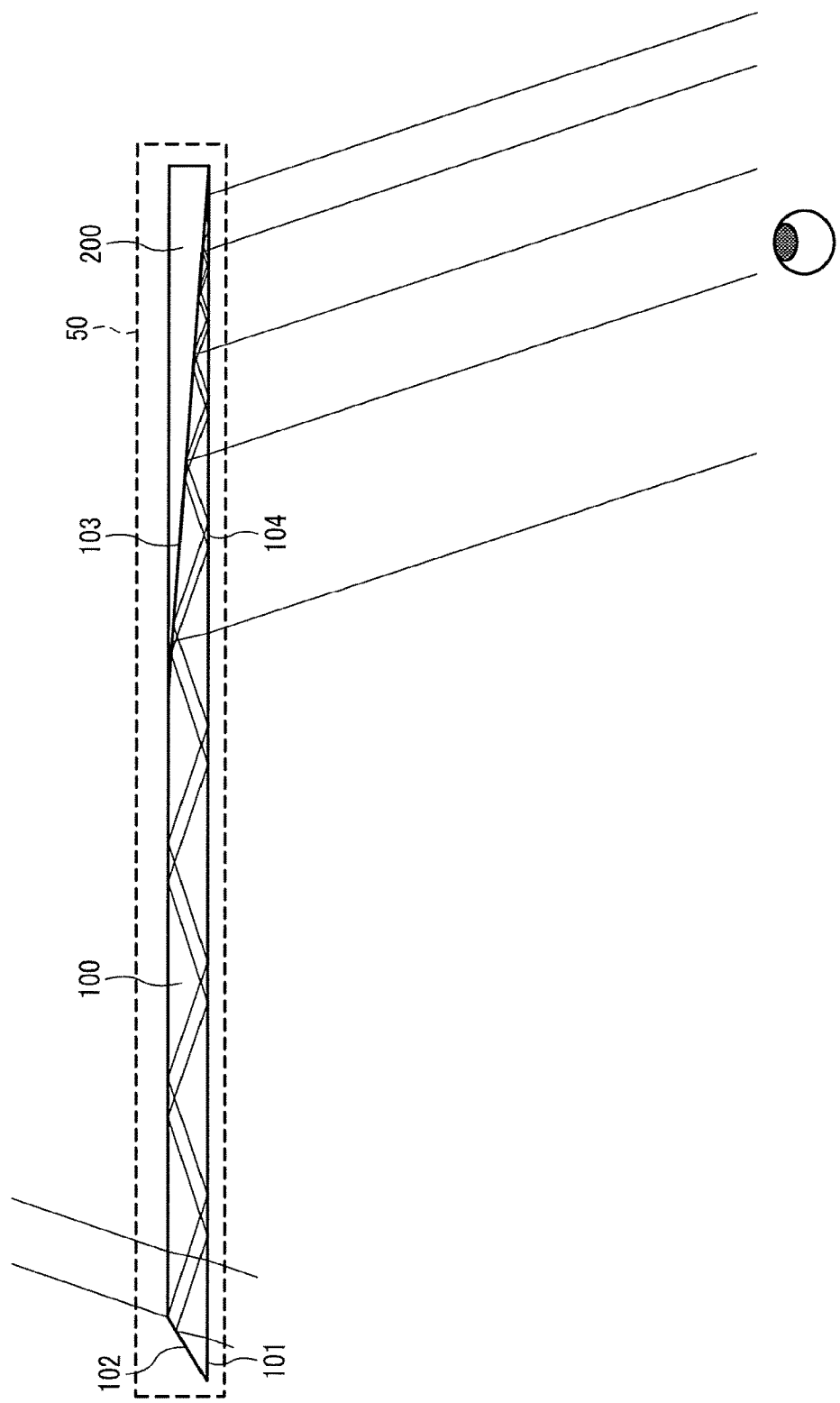

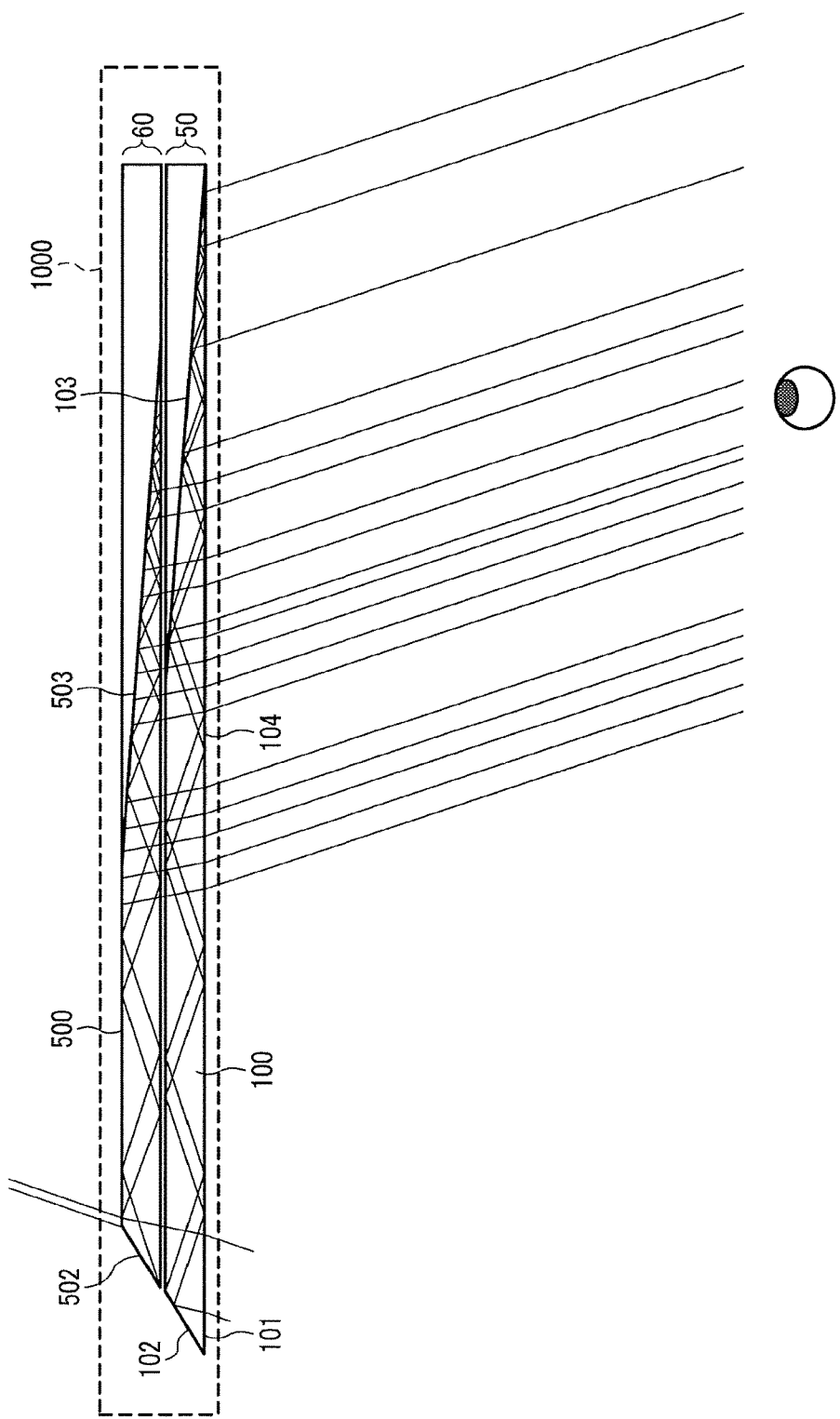

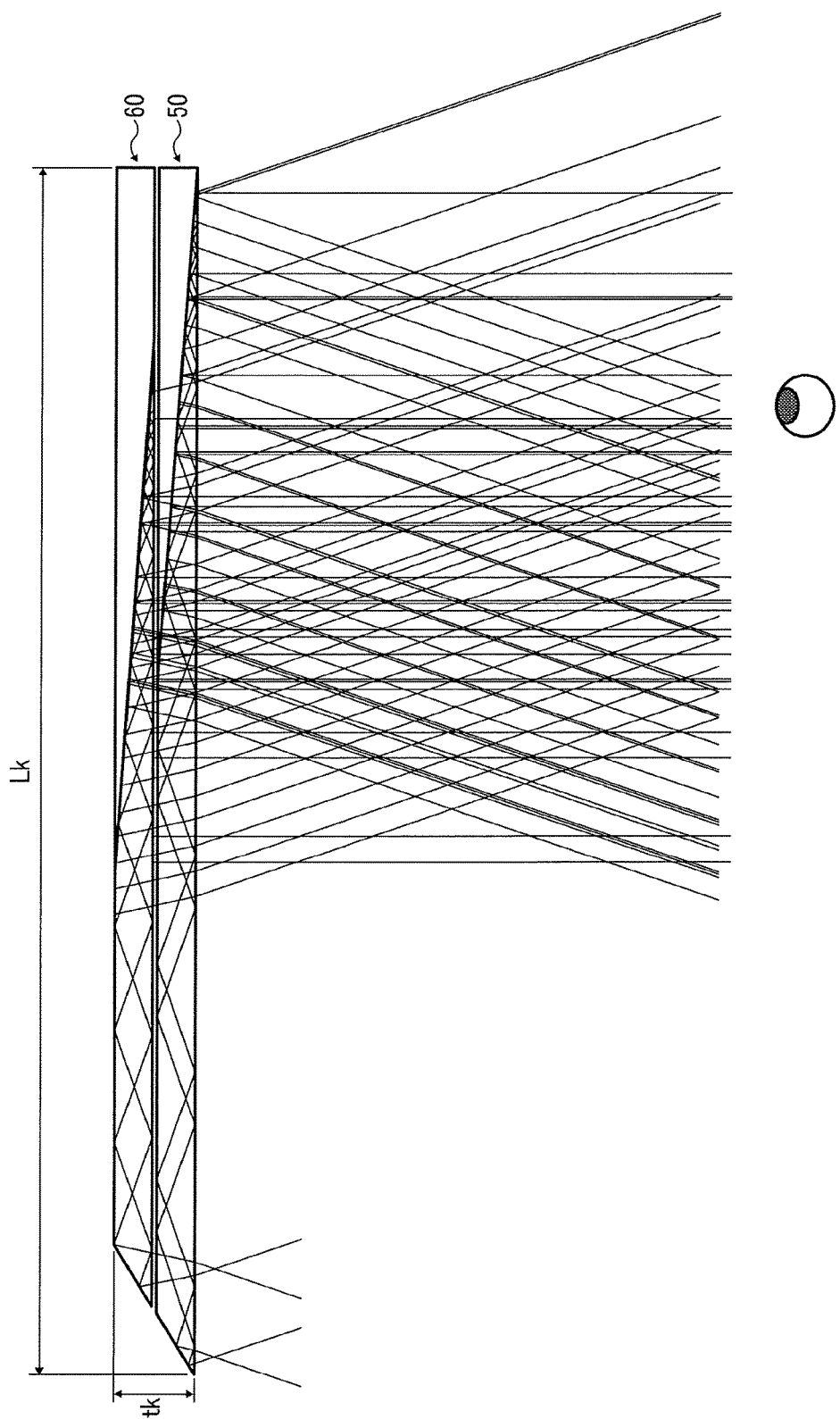

LIGHT GUIDE, VIRTUAL IMAGE DISPLAY DEVICE, AND LIGHT GUIDE UNIT

CROSS-REFERENCE TO RELATED APPLICATIONS

This patent application is based on and claims priority pursuant to 35 U.S.C. § 119(a) to Japanese Patent Application No. 2016-000829, filed on Jan. 6, 2016, Japanese Patent Application No. 2016-027802, filed on Feb. 17, 2016, and Japanese Patent Application No. 2016-027803, filed on Feb. 17, 2016, in the Japan Patent Office, the entire disclosures of which are hereby incorporated by reference herein.

BACKGROUND

Technical Field

Exemplary aspects of the present disclosure generally relate to a light guide, a virtual image display device, and a light guide unit.

Related Art

There has been known a virtual image display device including a light guide to enlarge a two-dimensional image with a virtual image optical system and display the enlarged image to an observer. As an example of the light guide for use in the virtual image display device, a head mounted display (HMD) is beginning to be widely used. The HMD is categorized into a transmissive and a non-transmissive display. Examples of a transmissive HMD include Google Glass (registered trademark) manufactured by Google Ltd.

A desired transmissive HMD is compact and portable to be used in combination with an information terminal or used to provide Augmented Reality (AR). A desired non-transmissive HMD, which is used for watching movies, playing games, or providing Virtual Reality (VR), has a wide viewing angle to provide a sense of immersion to users.

In recent years, there is a demand for the transmissive HMD to be thin and compact with a wide viewing angle.

SUMMARY

In an aspect of this disclosure, there is provided a light guide including a light-guide member that includes an incidence portion through which image light emitted from an image display element enters the light-guide member; an exit portion through which the image light exits the light-guide member to an outside; a retroreflection portion to reverse a direction of travel of the image light guided through the light-guide member; and an extraction portion to guide the image light reversed by the retroreflection portion to the exit portion. The retroreflection portion has a plurality of surfaces.

In another aspect of this disclosure, there is provided a virtual display device including a virtual display optical system that includes the light guide as described above to guide and emit the image light.

In still another aspect of this disclosure, there is provided a light guide including a light-guide member that includes an incidence portion through which image light emitted from an image display element enters the light-guide member; an exit portion through which the image light exits the light-guide member to an outside; a retroreflection portion; and an extraction portion. The retroreflection portion has a plurality of surfaces to reverse a direction of travel of the image light guided through the light-guide member. The extraction portion extracts and guides the image light reversed by the retroreflection portion to the exit portion. The extraction portion includes a plurality of first surfaces, a plurality of second surfaces, and a plurality of third surfaces that are disposed one by one in recited order toward the incidence portion to extract and guide the image light from the plurality of first surface to the exit portion. Each of the plurality of first surfaces is inclined relative to the exit portion at an angle $\theta a$. Each of the plurality of second surfaces is parallel with the exit portion. Each of the third surfaces is inclined relative to the exit portion at an angle $\theta c$ in an opposite direction of an inclination of each of the first surfaces.

In further aspect of this disclosure, there is provided a light guide unit including a first light guide and a second light guide. Each of the first light guide and the second light guide includes a light-guide member and an optical member integrated with the light-guide member. The light-guide member includes an incidence portion through which image light emitted from an image display element enters the light-guide member; an exit portion through which the image light exits the light-guide member to an outside of the light-guide member; a reflective portion inclined relative to the incidence portion, to guide the image light having entered through incidence portion into a corresponding light guide of the first light guide and the second light guide; and an extraction portion. The extraction portion includes a plurality of first surfaces and a plurality of second surfaces that are alternately disposed to extract and guide the image light from the plurality of the first surfaces to the exit portion. Each of the first surfaces is inclined relative to the exit portion. Each of the plurality of second surfaces is parallel with the exit portion. The optical member includes a parallel plane that is parallel with the exit portion of the light-guide member of the corresponding light guide of the first light guide and the second light guide; and an inclined portion that is inclined relative to the parallel plane and opposed to the extraction portion. The first light guide is disposed adjacent to the second light guide with an air layer interposed between a face of the first light guide opposed to the exit portion and the exit portion of the second light guide.

BRIEF DESCRIPTION OF THE DRAWINGS

The aforementioned and other aspects, features, and advantages of the present disclosure will be better understood by reference to the following detailed description when considered in connection with the accompanying drawings, wherein:

FIG. 44 is a ray diagram for describing unevenness of light rays of image light that is emitted from a part other than the center of an image display surface of an image display element and pass through the first light guide;

FIG. 45 is a ray diagram for describing an improved unevenness of light rays of image light that is emitted from a part other than the center of an image display surface of an image display element and pass through the light guide unit of FIG. 35; and FIG. 46 is a ray diagram for describing a virtual image display device according to an example including the light guide unit of FIG. 35.

Figure 1:
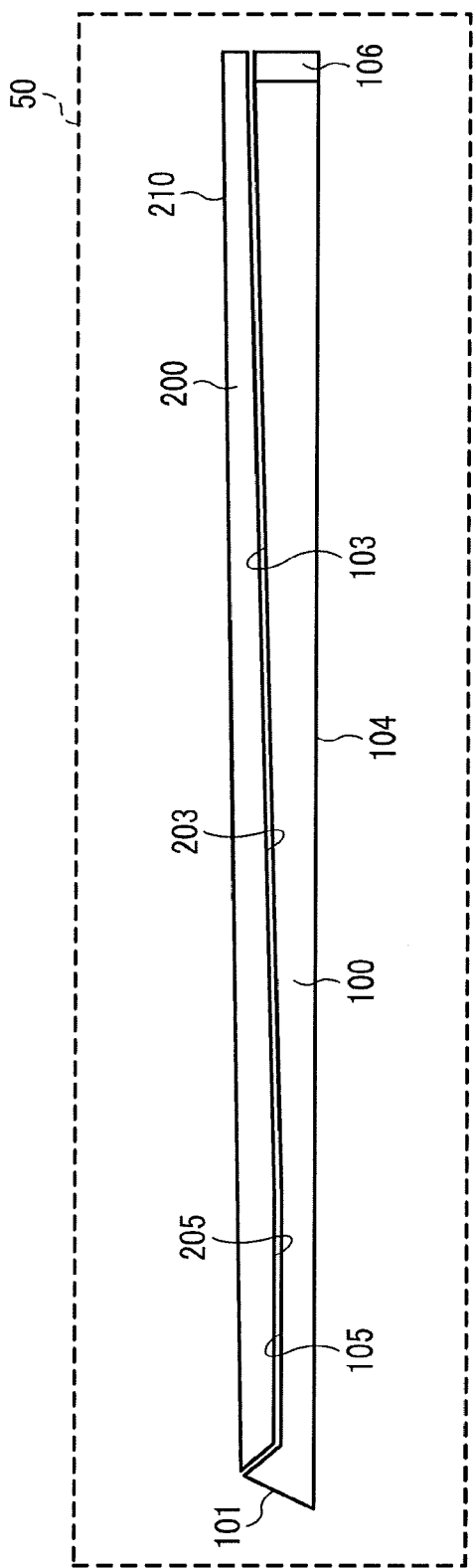
FIG. 1 is a plan view of a light guide according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

A description is provided of embodiments according to the present disclosure, referring to the drawings. The following embodiments of the present disclosure relate to a transmissive light guide and a virtual image display device including the light guide.

Figure 6:
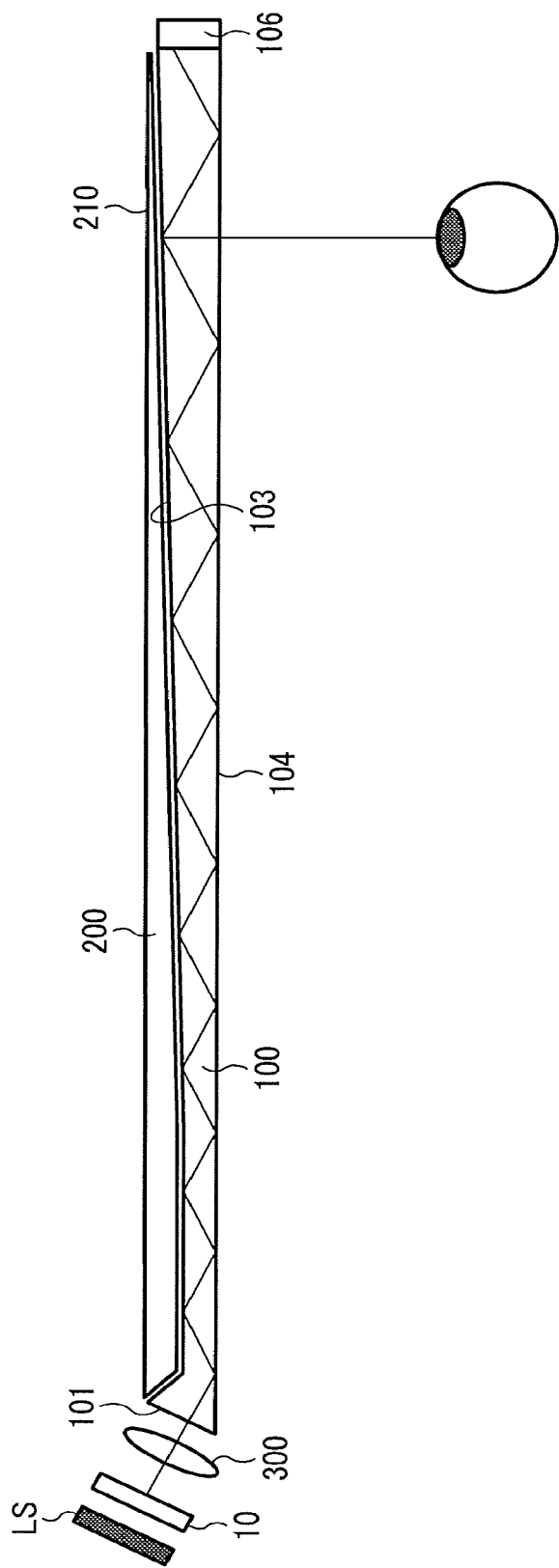
FIG. 6 is a plan view of a virtual image display device with the light guide of FIG. 15.

FIG. 1 illustrates a light guide 50 according to the present embodiment. FIG. 6 illustrates a virtual display device VD including a virtual image optical system VO with an optical path. As illustrated in FIG. 6, the optical path of the virtual image optical system VO is indicated by solid line. FIG. 6 also schematically illustrates eyes of a user as an observer of a virtual image. Hereinafter, a rear face of the light guide 50 refers to a face close to the observer (the bottom surface of the light guide 50 in FIGS. 1 and 6) and a front face of the light guide 50 refers to a face away from the observer (the upper surface of the light guide 50 in FIGS. 1 and 6).

Figure 2:
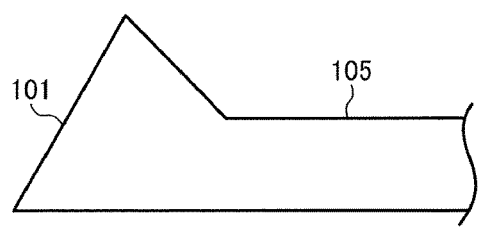
FIG. 2 is an enlarged view of an incidence portion of a light-guide member in the light guide according to an embodiment of the present disclosure.

A description is provided of the light guide 50, referring to FIGS. 1 and 2. The light guide 50 is an element to allow image light output from an image display element 10 to enter the light guide 50. The light guide 50 further guides the image light into the light guide 50 and emits the image light to display a virtual image. The light guide 50 according to the present embodiment includes a light-guide member 100 and an optical member 200 which are integrated into the light-guide member 100 to form a substantially prismatic shape as a whole, representing an asymmetric trapezoidal shape in a plan view.

According to the present embodiment, the light-guide member 100 of the light guide 50 captures and guide the image light coming from the image display element 10, outputting the image light to the outside of the light guide 50 to display a virtual image. The light-guide member 100 includes an incidence portion 101, a front face, a rear face, an exit portion 104, and allows the image light to enter the incident portion 101. Each of the front face and the rear face reflects and guides the image light having entered the incidence portion 101 into the light-guide member 100. The exit portion 104 emits the image light to the outside of the guide light 50. The light-guide member 100 according to the embodiments of the present disclosure includes a retroreflection portion 106 and the extraction portion 103. The retroreflection portion 106 reverses a direction of travel of image light that has entered the light-guide member through the incidence portion 101. The extraction portion 103 guides the image light, of which the direction of travel has been reversed by the retroreflection portion 106, to the exit portion 104, and extracts an image from the image light.

In the light-guide member 100 according to the present embodiment, the extraction portion 103 is disposed on the front face of the light-guide member 100 and the exit portion 104 is disposed on the rear face of the light-guide member 100. According to the present embodiment, the extraction portion 103 reflects the guided image light toward the exit portion 104. The exit portion 104 emits the image light reflected from the extraction portion 103 toward the eyes of the observer of a virtual image.

A region except for the extraction portion 103 on the front face of the light-guide member 100 is a total reflection plane 105 that totally reflects and guides the image light having entered the light-guide member 100. In the light-guide member 100 according to the present embodiment, each of the total reflection plane 105 and the rear face of the light-guide member 100 has a planar surface. The total reflection plane 105 is parallel with the rear face.

The extraction portion 103 has a shape in which the thickness of the light-guide member 100 increases toward the retroreflection portion 106 which is to be described in detail later. The retroreflection portion 106 is formed on an edge face of the light-guide member 100 that is the other side of the incidence portion 101.

FIG. 2 is an enlarged view of the incidence portion 101 of the light-guide member 100. The incidence portion 101 is continuous from the rear face of the light-guide member 100, and projects from the front face of the light-guide member 100 to provide a larger area for image light to enter.

Figure 3:
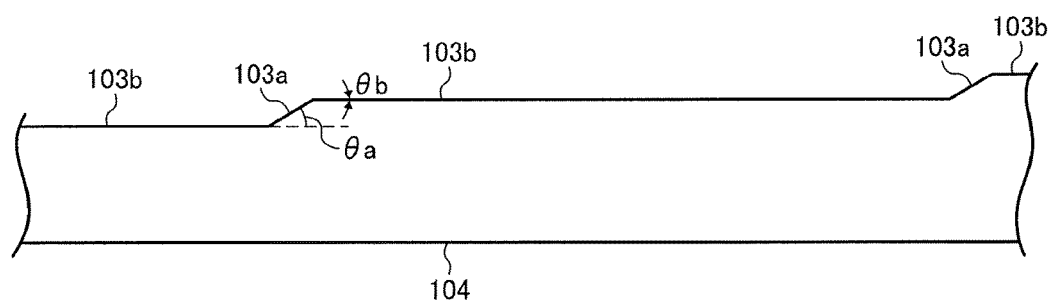
FIG. 3 is an enlarged view of an extraction portion of the light-guide member of FIG. 1 in the light guide according to an embodiment of the present disclosure.

FIG. 3 is an enlarged view of the extraction portion 103 of the light-guide member 100. FIG. 3 represents a reference plane parallel with the exit portion 104 indicated by dotted line. As illustrated in FIG. 3, in the extraction portion 103 according to the present embodiment, each first surface 103a and the exit portion 104 form the angle θa as described above. Each second surface 103b and the exit portion 104 form an angle θb. A plurality of first surfaces 103a and second surfaces 103b alternate to form a stepwise shape.

According to the present embodiment, the first surface 103a of the extraction portion 103 serves to guide image light having entered the light-guide member 100 and having been reflected by the retroreflection portion 106 to the exit portion 104 and emit the image light from the exit portion 104. The first surface 103a is a planar surface inclined relative to the exit portion 104. The first surface 103a, which is inclined relative to the exit portion 104 at a predetermined inclination angle, faces the retroreflection portion 106.

Preferably, the angle θa of inclination of the first surface 103a relative to the exit portion 104 falls within the range of from 20 through 40 degrees.

According to the present embodiment of this disclosure, the second surface 103b serves to reflect and guide the incident image light to the retroreflection portion 106, and also serves as a reflection surface to reflect the image light of which the direction of travel has been reversed by the retroreflection portion 106. The second surface 103b is parallel with the exit portion 104. That is, the angle θb is 0 degree. The second surface 103b also serves as a transparent surface to allow light externally coming through the front face and the rear face of the light guide 50 to pass through the light guide 50 to obtain the see-through characteristics.

With the second surface 103b inclined relative to the exit portion 104 to form an angle θb of not 0 degree, the image light that passes through the light-guide member 100 and is reflected by the second surface 103b does not coincide with the image light that passes through the light-guide member 100 and is reflected by the exit portion 104 because of the difference in reflection angle. In this case, the incidence angle θin defied by the light rays having entered through the incidence portion 101 and the normal relative to the incidence portion 101 is not equal to the exit angle θout defined by the light rays exiting through the exit portion 104 and the normal relative to the exit portion 104. Further, in such a case, the image light passes through the first surface 103a and exits the exit portion 104 to the outside in different directions, generating an unsuccessful virtual image. Thus, the second surface 103b according to the present embodiment of this disclosure is parallel with the exit portion 104, that is, the angle θb is 0 degree.

As illustrated in FIG. 3, it is preferable that the height of the second surface 103b gradually increases with a closer distance to the retroreflection portion 106. In other words, the distance (i.e., thickness of the light-guide member 100) between the second surface 103b and the exit portion 104 increases toward the retroreflection portion 106.

In such a light-guide member 100 according to the present embodiment, the height of the second surface 103b gradually decreases in a direction of travel of image light reversed by the retroreflection portion 106. Thus, the space in which the image light is totally reflected decreases. With such a configuration, the amount of light rays that are reflected by the extraction portion 103 gradually increases, thereby increasing the amount of light rays that come from the exit portion 104 and enter the eyes of an observer, thus successfully allowing the observation of an virtual image with less unevenness of brightness.

Figure 4:
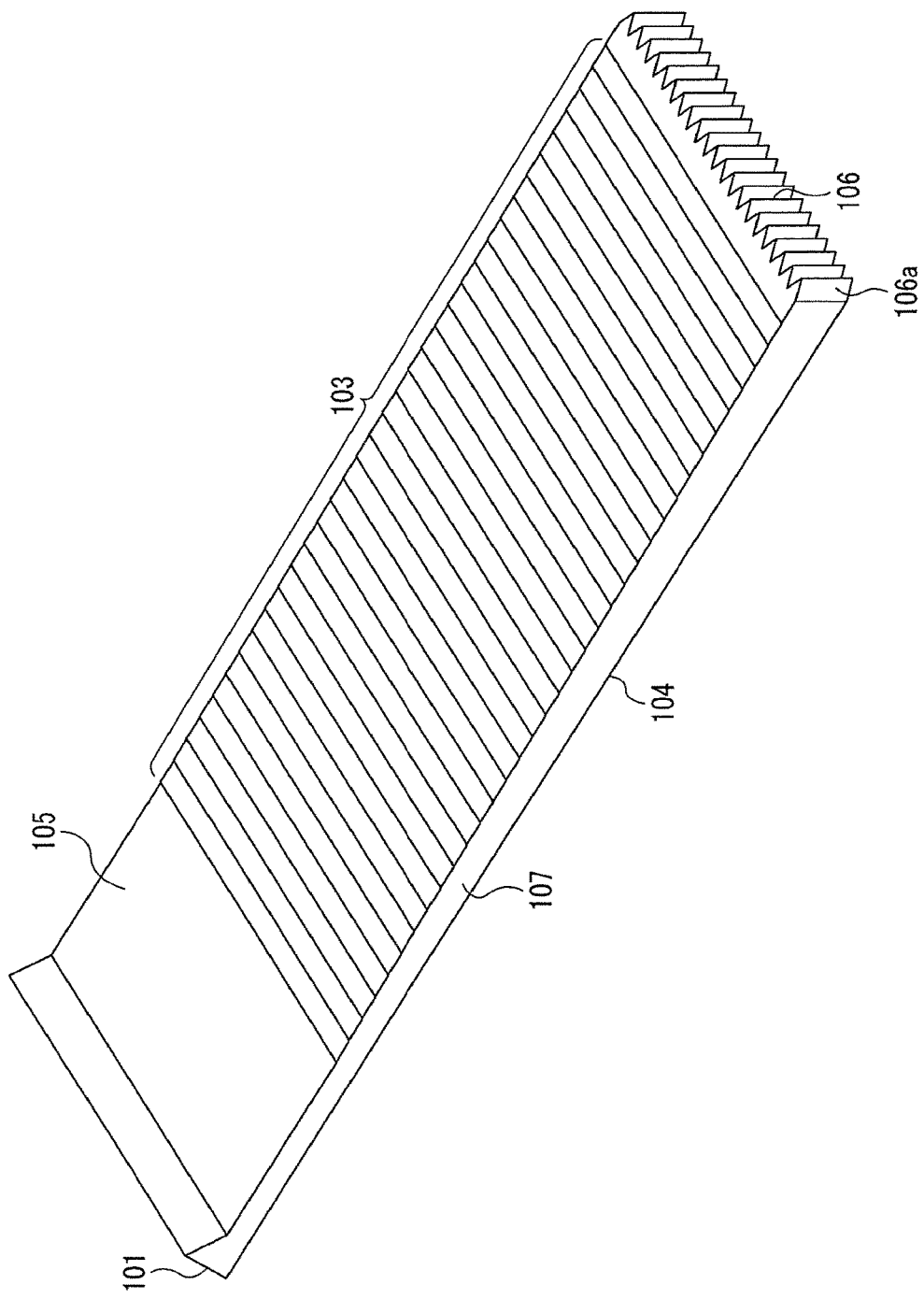
FIG. 4 is a perspective view of the light-guide member of the light guide of FIG. 1.
Figure 5:
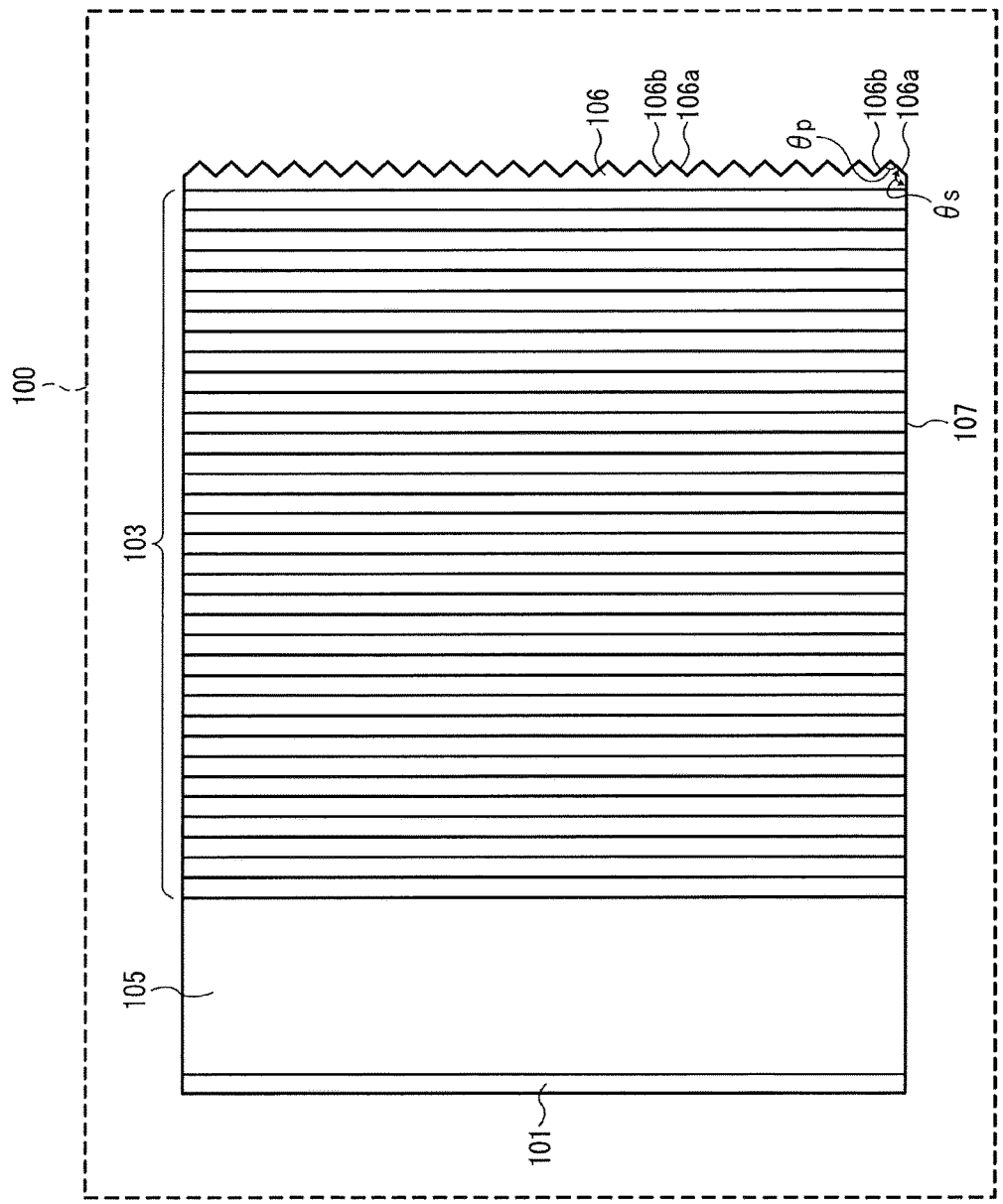
FIG. 5 is a front view of the light-guide member of the light guide to describe the configuration of a retroreflective portion.

Next, a detailed description is given of the retroreflection portion 106 disposed on the light-guide member 100, referring to the plan view, the perspective view and the front view of FIGS. 1, 4 and 5, respectively.

As illustrated in FIG. 1, the retroreflection portion 106 is disposed on the lateral end face of the light-guide member 100 that is a vertical surface to the exit portion 104. More specifically, the retroreflection portion 106 is disposed on the opposite end face of the incidence portion 101. The retroreflection portion 106 includes a plurality of surfaces, as illustrated in FIGS. 4 and 5. In other words, the opposite end face of the incidence portion 101 is not planar and includes the plurality of surfaces that constitutes the retroreflection portion 106.

As illustrated in FIG. 5, a plurality of first inclined surfaces 106a and a plurality of second inclined surfaces 106b alternate to form the retroreflection portion 106. Each first inclined surface 106a forms an angle θs relative to a side face 107 of the light-guide member 100 that is continuous to the incidence portion 101. Each second inclined surface 106b forms an angle θp relative to each first inclined surface 106a. Each first inclined surface 106a (hereinafter, referred to simply as the first inclined surface 106a) and each second inclined surface 106b (hereinafter, referred to simply as the second inclined surface 106b) constitute one prism. In other words, a plurality of prisms is disposed in a row on the opposite end face of the incidence portion 101 to constitute the retroreflection portion 106. The first inclined surface 106a and the second inclined surface 106b each is a plane surface having substantially the same shape and area.

In the present embodiment, the angle θs formed by the side face 107 and the first inclined surface 106a is 135 degrees. The angle θp formed by the first inclined surface 106a and the second inclined surface 106b is an apex angle of each prism that is 90 degrees in the present embodiment. Thus, a plurality of prisms, each having an apex angle of 90 degrees, constitutes the retroreflection portion 106.

The retroreflection portion 106, i.e., the plurality of first inclined surfaces 106a and second inclined surfaces 106b, is preferably applied with coating having a high reflectivity to successfully reflect image light that reaches the retroreflection portion 106. The reflectivity of such a coating is preferably greater than or equal to 70%.

In the present embodiment, on the opposite end face of the incidence portion 101 that is one of the side faces vertical to the exit portion 104 is disposed the retroreflection portion 106.

Preferably, the light-guide member 100 of the light guide 50 is made of high light-transmissive material to obtain the see-through characteristics. More preferably, the light-guide member 100 is made of resin to subject the above-described extraction portion 103 to machining.

Any coating may be applied to the extraction portion 103. For example, mirror coating, such as aluminum, silver, and dielectric coating, may be applied to the extraction portion 103. Preferably, coating having a reflectivity of approximately 10% is applied to the first surface 103a of the extraction portion 103 to prevent the loss of the guided image light as much as possible.

The width w of the second surface 103b of the extraction portion 103 of the light-guide member 100 satisfies the following condition: 0.5 mm<w<3.0 mm. The second surface 103b has a width w in the longitudinal direction of the light-guide member 100 that is a direction along the direction of travel of the image light.

Hereinafter, a description is provided of the conditions for the width w of the second surface 103b.

As described above, the width of field of view that allows a virtual image to be sighted is referred to as "eye box". The distance from the exit portion 104 to the eye balls of a user (observer) to allow the user to sight a virtual image is referred to as "eye relief". The width w of the second surface 103b is defined by the following expression when the symbol "φ" is the diameter of the eye box, the symbol "L" is the eye relief, the symbol "tk" is the thickness of the light guide 50, and the symbol "n" is the number of the second surface 103b that is parallel with the exit portion 104, within the extraction portion 103:

$$w=\{2\tan\theta b(L+Tk)-tk/\tan\theta a+\varphi\}/(n-1).$$

In this case, with an increase in the width of the eye box, the range of field of view increases. Thus, increasing the diameter φ of the eye box is preferable. However, increasing the diameter φ of the eye box increases the thickness tk of the light guide 50, thereby making it difficult to design the light guide 50.

The diameter of an eye is approximately 5 mm in general. The position of the light guide 50 is adjusted as appropriate according to the diameter of the eye, which varies between individuals. The light guide 50 preferably has an eye relief L of greater than or equal to 15 mm to be applied to a virtual image display device in a pair of eyeglasses.

With an eye relief L of 20 mm and an eye box ranging from 5 mm through 10 mm, for example, the width w of the second surface 103b satisfies the following condition: 0.5 mm<w<3.0 mm.

With the width w of the second surface 103b below 0.5 mm, the width of the first surface 103a is reduced. However, reducing the width of the first surface 103a easily generates diffraction phenomenon of the incident image light, making it difficult to produce the light guide 50. In such a case, the thickness of the light guide 50 is increased to secure the eye box ranging from 5 mm through 10 mm at a position of an eye relief of 20 mm without reducing the width of the first surface 103a. However, the increase in thickness of the light guide 50 increases the weight of the light guide 50.

By contrast, with the width w of the second surface 103b above 3.0 mm, the density of the light rays of the incident image light reflected by the first surface 103a and exiting through the exit portion 104, resulting in a reduction in amount of light at the position of the eyes. Thus, it is desirable for the width w of the second surface 103b of the extraction portion 103 to satisfy the condition: 0.5 mm<w<3.0 mm.

The values of the width w of the second surface 103b differ between the respective second surfaces 103b. Specifically, with a shorter distance from the incidence portion 101 to a second surface 103b, the density of light rays of image light decreases. Accordingly, with a shorter distance from the incidence portion 101 to a second surface 103b, the width w of the second surface 103b preferably decreases. With such a configuration, the unevenness of light quantity is eliminated or reduced because the number of the first surface 103a per unit length increases with a shorter distance from the incidence portion 101.

In the same manner as the second surface 103b does, the value of the width of the first surfaces 103a of the extraction portion 103 differs with the first surfaces 103a to reduce the unevenness of light quantity. In this case, the width of the first surface 103a refers to the length of the first surface 103a in the longitudinal direction of the light-guide member 100 that is the direction of travel of the incident image light. Specifically, with a shorter distance from the incidence portion 101 to a first surface 103a, the width of the first surface 103a increases. With such a configuration, the unevenness of light quantity is eliminated or reduced because the area of the first surface 103a increases with a shorter distance from the incidence portion 101.

Preferably, the thickness of the light guide 50 ranges from 1 mm through 8 mm. With the thickness of the light guide 50 below 1 mm, forming the shape of the extraction portion 103 of the light-guide member 100 is difficult. With the thickness of the light guide 50 above 8 mm, the structural components increases in weight although a wide viewing angle is obtained.

Next, a configuration of the optical member 200 according to an embodiment of the present disclosure is described with reference to FIG. 1. The optical member 200 has a tapered shape in a plan view as described in FIG. 1. The optical member 200 according to the present embodiment is opposed to the front of the light-guide member 100, i.e., the extraction portion 103 and the total reflection plane 105 of the light-guide member 100. Such a configuration ensures light transmissivity of the extraction portion 103 and the exit portion 104, i.e., see-through characteristics.

The optical member 200 includes a front face 210 (second face) that is parallel with the exit portion 104 of the light guide member, and a rear face (first face) that is inclined relative to the front face 210 as a whole. The rear face of the optical member 200 includes an inclined portion 203 and a planar portion 205. The inclined portion 203 is inclined relative to the front face 210 as a whole that is opposed to the extraction portion 103 of the light-guide member 100. The planar portion 205 is parallel with the front face 210 that is opposed to the total reflection plane 105 of the light-guide member 100. The inclined portion 203 is formed such that the optical member 200 decreases in thickness toward the retroreflection portion 106 of the light-guide member 100. The inclined portion 203 will be described later in detail.

Figure 40A:
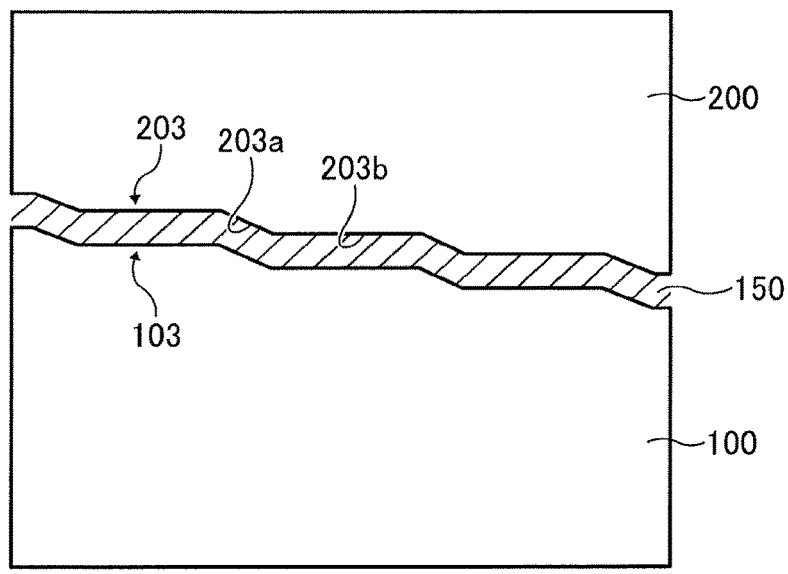
FIG. 40A is an enlarged view of the light-guide member and the optical member of FIGS. 39A and 39B bonded to each other with adhesion.
Figure 40B:
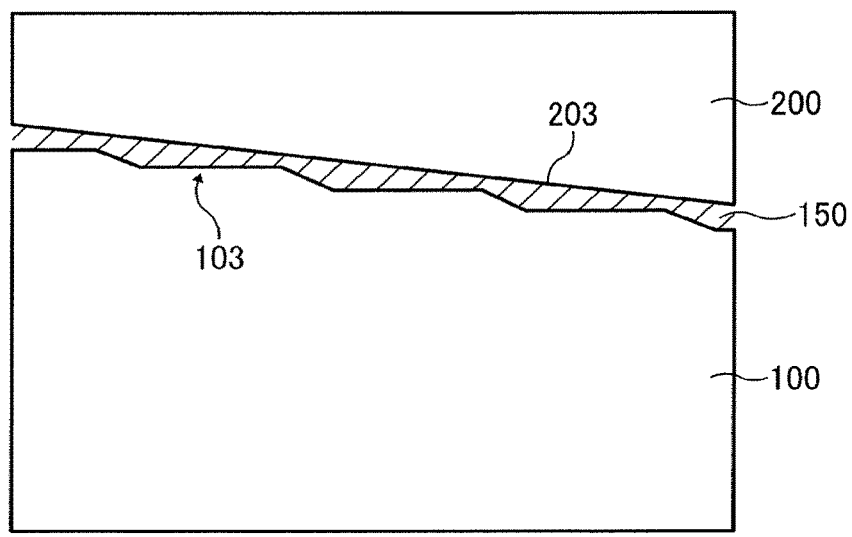
FIG. 40B is an enlarged view of the light-guide member of FIGS. 39A and 39B and an optical member of another example configuration which are bonded to each other with adhesion.

The following describes the virtual display device VD including the light guide 50 according to the present embodiment, referring to FIGS. 40A and 40B.

The virtual display device VD according to the present embodiment includes the image display element 10, a collimator optical system 300, and the light guide 50. The image display element 10 outputs image light of a display image to the collimator optical system 300. The collimator optical system 300 collimates the image light and the collimated image light enters the light guide 50. The image display element 10, the collimator optical system 300, and the light guide 50 constitute the virtual image optical system VO. FIG. 6 indicates an optical path of image light that is emitted from the center of the image display surface of the image display element 10. In the virtual image optical system VO according to the present embodiment, the collimator optical system 300 is disposed adjacent to the incidence portion 101 of the light-guide member 100, and serves to convert image light displayed on the image display element 10, i.e., image information of a displayed image, into angle information.

The image display element 10 outputs image light corresponding to a display image, the image light that passes through the light guide 50 to be displayed as a virtual image. Examples of the image display element 10 include, but not limited to, an organic light emitting diode (OLED) and a liquid crystal display element. Alternatively, other various display types are also applicable. For example, a digital micro-mirror device (DMD) is applicable as the image display element 10. Alternatively, in some embodiment, a thin film transistor (TFT) or a liquid crystal on silicon (LCOS) is applicable as the image display element 10. Alternatively, in some embodiment, a micro electro mechanical system (MEMS) is applicable as the image display element 10.

The image display element 10 of FIG. 3 according to the present embodiment is the LCOS or the DMD in which a light source is employed together. In FIG. 3, a light source LS is employed to illuminate the image display element 10. Examples of the light source LS include a light emitting diode (LED), a semiconductor laser (laser diode (LD)), and a discharge lamp.

According to the present embodiment, the collimator optical system 300, which includes a plurality of optical lenses and a stop aperture, enlarges the image light output from the image display element 10 and outputs the enlarged parallel light to the light guide 50.

In the virtual display device VD according to the present embodiment, the image light emitted from the image display element 10 illuminated with a light source LS passes through the collimator optical system 300, and the collimator optical system 300 enlarges and collimates the image light. The image light enters the light guide 50, as parallel light. Specifically, the image light enlarged and collimated by the collimator optical system 300 enters the light guide 50 through the incidence portion 101 of the light-guide member 100. The image light is guided into the light-guide member 100. The guided image light-guide member is totally reflected by the front face and the rear face in the interior of the light-guide member 100, and advances toward the retroreflection portion 106. The image light that has reached the retroreflection portion 106 is reflected by a plurality of prisms of the above-described first inclined surfaces 106a and second inclined surfaces 106b, thereby reversing the direction of travel to advance toward the incidence portion 101. When the image light having been reversed reaches the first surface 103a of the extraction portion 103, the image light is reflected by the first surface 103a and is guided to the exit portion 104. Then, the image light exits from the exit portion 104 toward the eyes of a user (observer), as image information. The user (observer) looks forward through the exit portion 104 of the light-guide member 100 and the optical member 200 to visually identify a virtual image of the image light.

Figure 7:
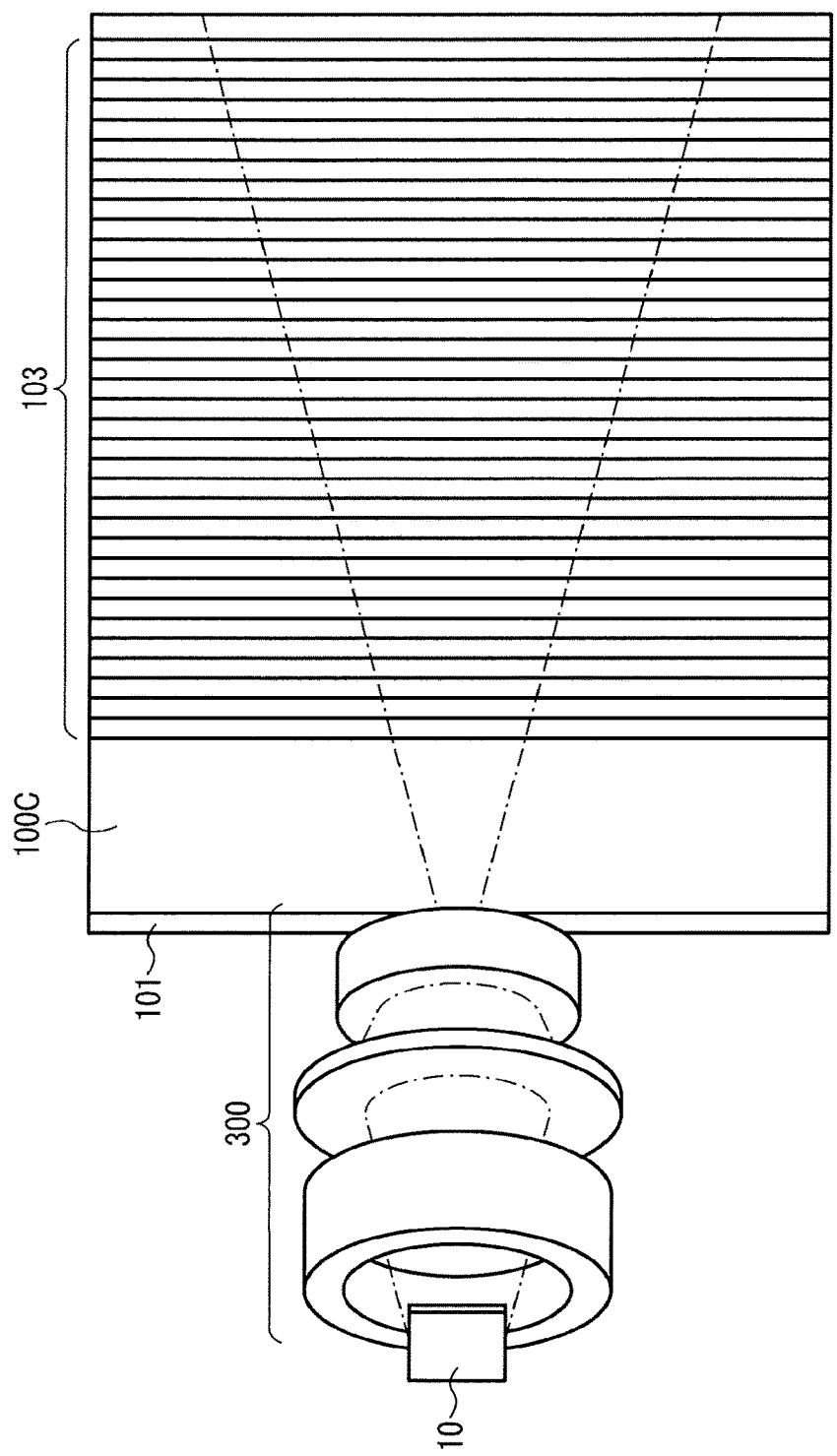
FIG. 7 is an illustration of the dispersion of image light within the light-guide member without the retroreflective portion a comparative example.

Next, a detailed description is given of the manners in which guided image light travels through the light-guide member 100, referring to the drawings. FIG. 7 is an illustration of image light that enters and passes through the light-guide member 100C without the retroreflection portion 106 according to a comparative example. The light-guide member 100C according to the comparative example differs from the light-guide member 100 according to the above-described embodiment in that the light-guide member 100C does not include the retroreflection portion 106, and that the first surface 103a of the extraction portion 103 is inclined in the opposite direction of that of the above-described embodiment, i.e., the direction opposed to that of the incidence portion 101.

As illustrated in FIG. 7, image light emitted from the image display element 10 passes through the collimator optical system 300 to be a collimated light, and the collimated light (the image light having passed through the collimator optical system 300) enters the light-guide member 100C through the incidence portion 101 and travels through the light-guide member 100C. The image light having entered the incidence portion 101 is totally reflected within the light-guide member 100C to diverge while traveling as diverging light through the light-guide member 100C, as illustrated in FIG. 7. That is, the image having entered the incidence portion 101 diverges, traveling through the light-guide member 100C. The degree of divergence of the image light increases in the wide-angle direction. In the comparative example, image light passes through the light-guide member 100C, while diverging in the vertical viewing direction.

In the light-guide member 100C according to the comparative example, the image light that is extracted from the first surface 103a of the extraction portion 103 is diverging light. Accordingly, the image light that exits from the exit portion 104 and comes into the eyes of an observer is light that diverges in the vertical viewing angle. With such image light, peripheral image light with a greater divergence angle does not come into the eyes of the observer so that a virtual image to be observed partially lacks.

Figure 8:
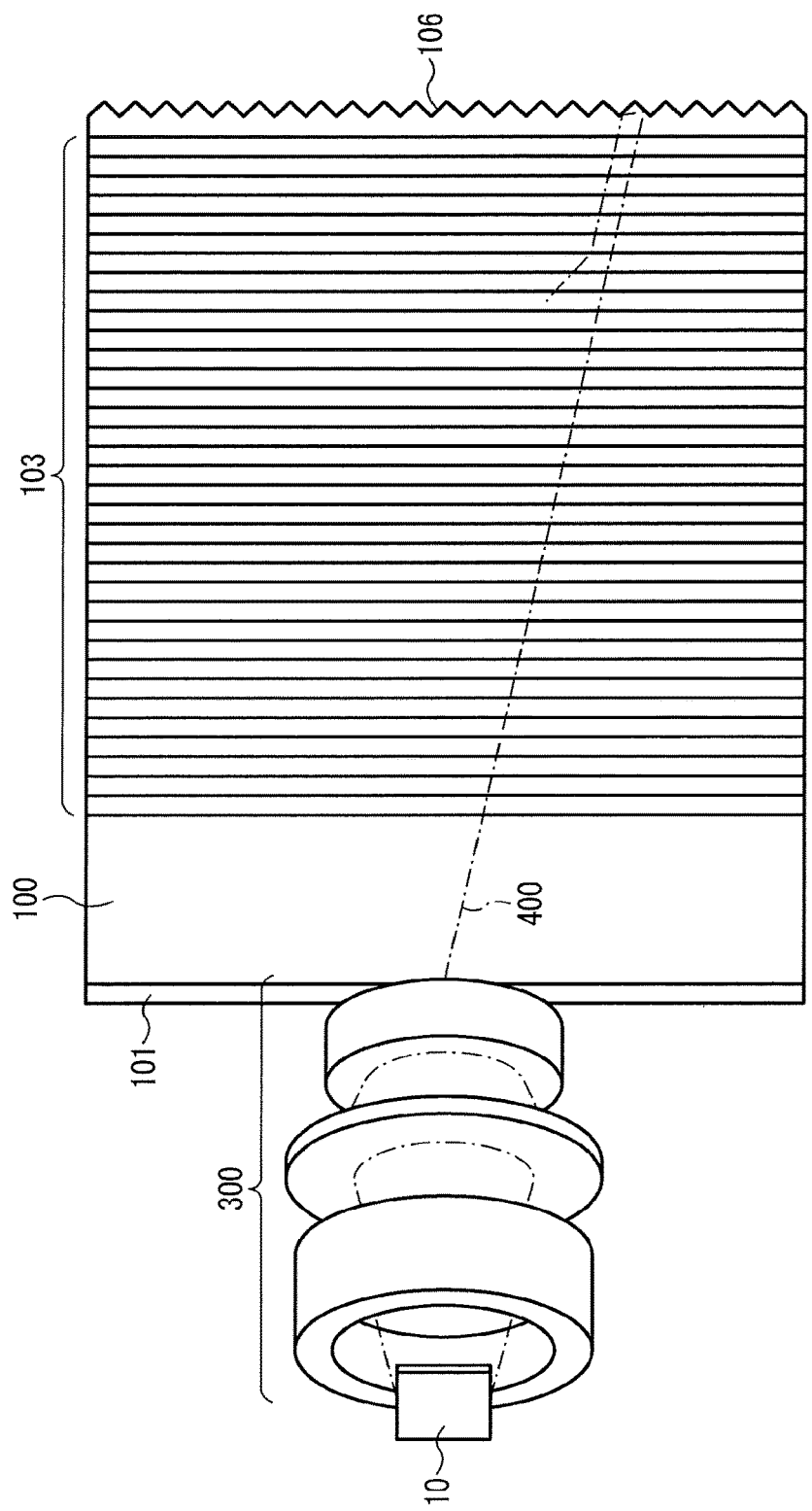
FIG. 8 is an illustration of image light that is emitted from an edge of an image display element and is guided through the light-guide member of the light guide of FIG. 1.
Figure 9:
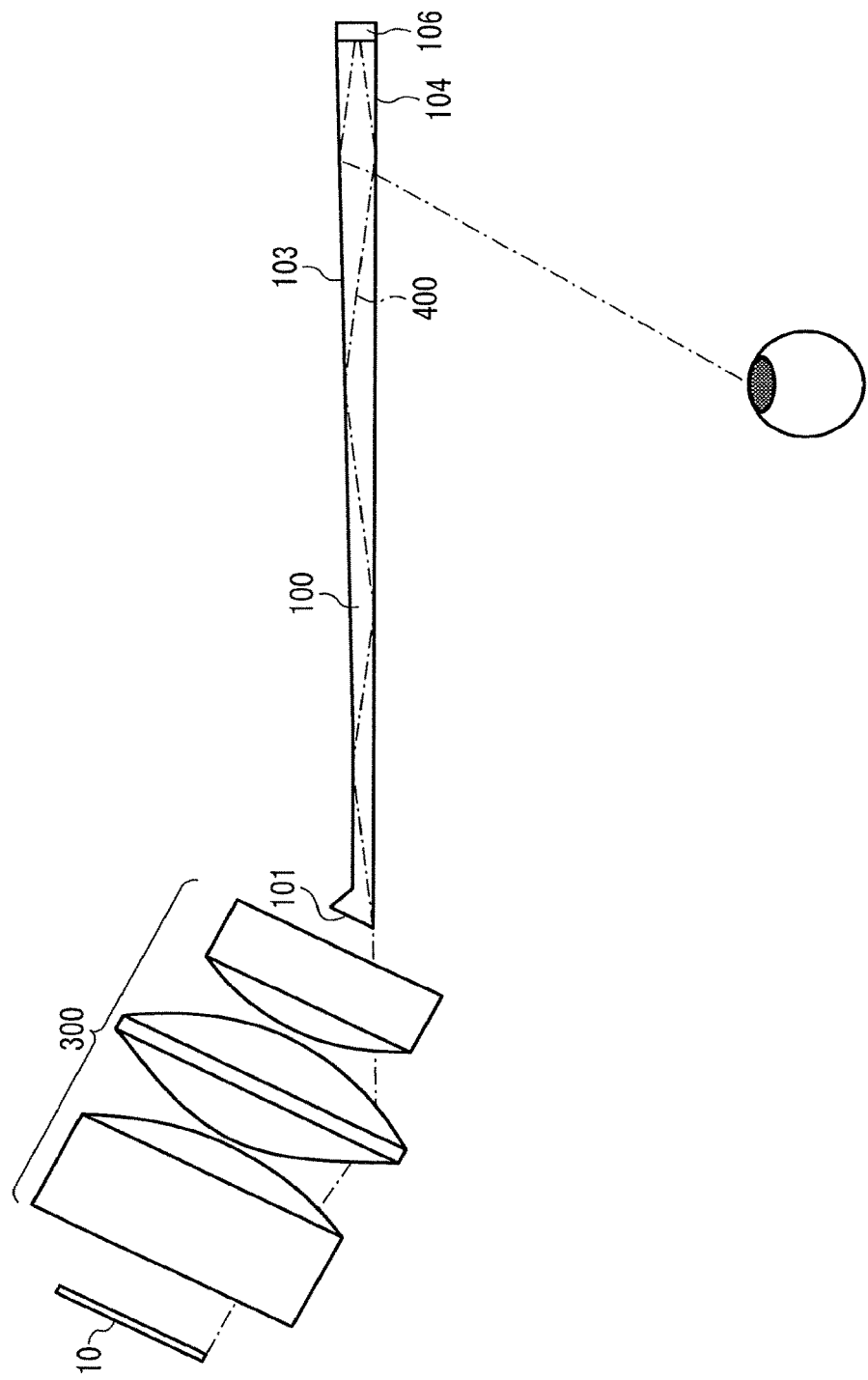
FIG. 9 is a planar view of the light-guide member through which the image light of FIG. 22 is guided.

Each of FIGS. 8 and 9 is an illustration of image light that passes through the light-guide member 100 of the light guide 50 according to the present embodiment. FIG. 8 is a front view of the light guide 50, and FIG. 9 is a side view of the light guide 50 according to the present example embodiment. In FIGS. 8 and 9, only a light ray 400 is represented that is emitted from the edge of the image display element 10 for the purposes of simplification.

As illustrated in FIG. 7, image light emitted from the image display element 10 passes through the collimator optical system 300 to be a collimated light, and the collimated light (the image light having passed through the collimator optical system 300) enters the light-guide member 100C through the incidence portion 101 and travels through the light-guide member 100C. The image light having entered the incidence portion 101 is totally reflected within the light-guide member 100 to diverge while traveling through the light-guide member 100. That is, the image light having entered the incidence portion 101 travels through the light-guide member 100 as divergent light in the same manner as the comparative example of FIG. 7 does until the image light reaches the retroreflection portion 106.

Subsequently, the image light is reflected by the retroreflection portion 106, and the direction of travel of the image light, i.e., the direction in which the image light is guided, is reversed. In the present embodiment, the image light is reflected by both the first inclined surface 106a and the second inclined surface 106b that constitute the retroreflection portion 106. Accordingly, the incident light and the exit light become parallel with each other as viewed from the planar direction, thereby traveling through the light-guide member 100 as converging light. The image light is then reflected by the first surface 103a of the extraction portion 103, and the reflected image light exits from the exit portion 104 as converging light to advance toward the eyes of the observer. The light guide 50 according to the present embodiment allows the emission of image light as converging light to reach the eyes of an observer, thus achieving a virtual image display device that allows a successful observation of a virtual image without any deficiency even at a wide angle.

Optical Member

Figure 10:
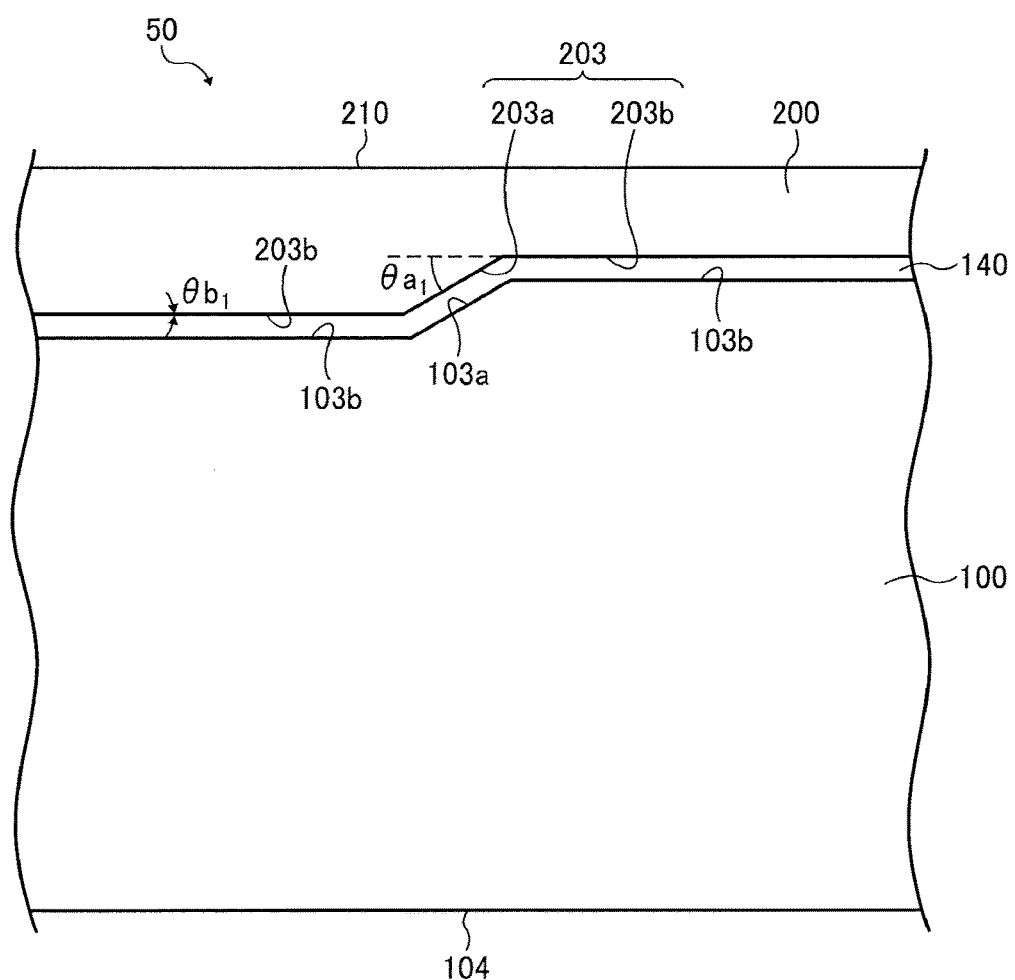
FIG. 10 is an enlarged view of an interface between the extraction portion of the light-guide member and an optical member according to an embodiment of the present disclosure.

Next, a description is provided of configuration and arrangement of an inclined portion 203 of an optical member 200 relative to a light-guide member 100 according to an embodiment of the present disclosure. FIG. 10 is an enlarged view of boundary surfaces between the light-guide member 100 and the optical member 200. In FIG. 10, a virtual plane parallel with the second front face 210 of the optical member 200 is indicated by dotted line.

As illustrated in FIG. 10, the inclined portion 203 of the optical member 200 is disposed adjacent to the extraction portion 103 of the light-guide member 100 with an air gap 140 that is an air layer interposed between the inclined portion 203 and the extraction portion 103. According to the present embodiment of this disclosure, the edge of the extraction portion 103 of the light-guide member 100 and the edge of the inclined portion 203 of the optical member 200 are bonded to each other with a microball adhesive. This allows the air gap 140 to be provided at a uniform interval between the extraction portion 103 and the inclined portion 203, thereby increasing the see-through characteristics of the light guide 50.

In the inclined portion 203 of the optical member 200, a third surface 203a and a fourth plane 203b alternate. The third surface 203a is inclined relative the second front face 201 by an angle θa1. The fourth plane 203b is inclined relative to the second front face 201 by an angle θb1. The third surface 203a is opposed to the first surface 103a. Each fourth plane 203b is opposed to each second surface 103b.

The second front face 210 is parallel with the exit portion 104 of the light-guide member 100. The fourth plane 203b is parallel with the second front face 210, forming an angle θb1 of 0 degree between the fourth plane 203b and the second front face 210. The fourth plane 203b is also parallel with the exit portion 104 of the light-guide member 100 and with the second surface 103b. In this case, each of the angles θb and θb1 is 0 degree. Such a configuration increases the see-through characteristics of the light guide 50. It is to be noted that when the fourth plane 203b is not parallel with the second front face 210, the exit portion 104 of the light-guide member 100, and the second surface 103b, the see-through characteristics deteriorates due to the prism effect.

Preferably, the angle θa1 of inclination of the third surface 203a relative to the second front face 210 is equal to the angle θa, that is, the angle of inclination of the extraction portion 103 relative to the exit portion 104. With such a configuration, the third surface 203a of the optical member 200 is made parallel with the first surface 103a of the light-guide member 100, thereby increasing the see-through characteristics of the light guide 50.

To obtain the most advantageous effects of the see-through characteristics of the light guide 50, any deviation between the first surface 103a and the third surface 203a opposed to the first surface 103a is eliminated or reduced when the first surface 103a of the light-guide member 100 shifts in the direction of the normal line of the exit portion 104 (upward in FIG. 6). To eliminate such a deviation, the optical member 200 may include an adjuster to adjust the air gap 140 that is a space between the light-guide member 100 and the optical member 200.

The light-guide member 100 and the optical member 200 are made of a common material to secure the see-through characteristics of the light guide 50 in some embodiments.

The air gap 140 between the extraction portion 103 of the light-guide member 100 and the inclined portion 203 of the optical member 200 may include gas or liquid. With the air gap 140 including air, the see-through characteristics of the light guide 50 increases.

In the embodiments illustrated in FIGS. 1 through 10, a description is given of the example in which the incidence portion 101 is disposed on the left of an observer of a virtual image, allowing light image to enter the light-guide member 100 from the left as seen from the observer. When the incidence portion 101 is disposed on the opposite side, i.e., on the right of the observer, allowing the image light to enter the light-guide member 100 from the right side as seen from the observer, the same advantageous effects are obtained as described above.

FIGS. 6 and 9 represent one eye of an observer of a virtual image. However, no limitation is intended thereby. The light guide 50 allows an observer to view an emitted image with both eyes. Alternatively, in some embodiments, a compact light guide 50 is provided as a monocular light guide.

In the above-described embodiments, the cases in which the light guide 50 is applied to the spectacle HMD are described. In some embodiments, the light guide 50 may be applied to other types of HMDs. Alternatively, in some embodiments, the light guide 50 may be applied to a head up display (HUD). The light guide 50 is suitable for displaying a virtual image of an original image formed by the light rays optically modulated by a micro device.

Thus, the configurations according to the above-described embodiments provide a thin light guide for use in a virtual image display device that sufficiently obtains a wide viewing angle of greater than 40 degrees, particularly a viewing angle in the vertical direction.

Examples of Virtual Image Display Device

Figure 11:
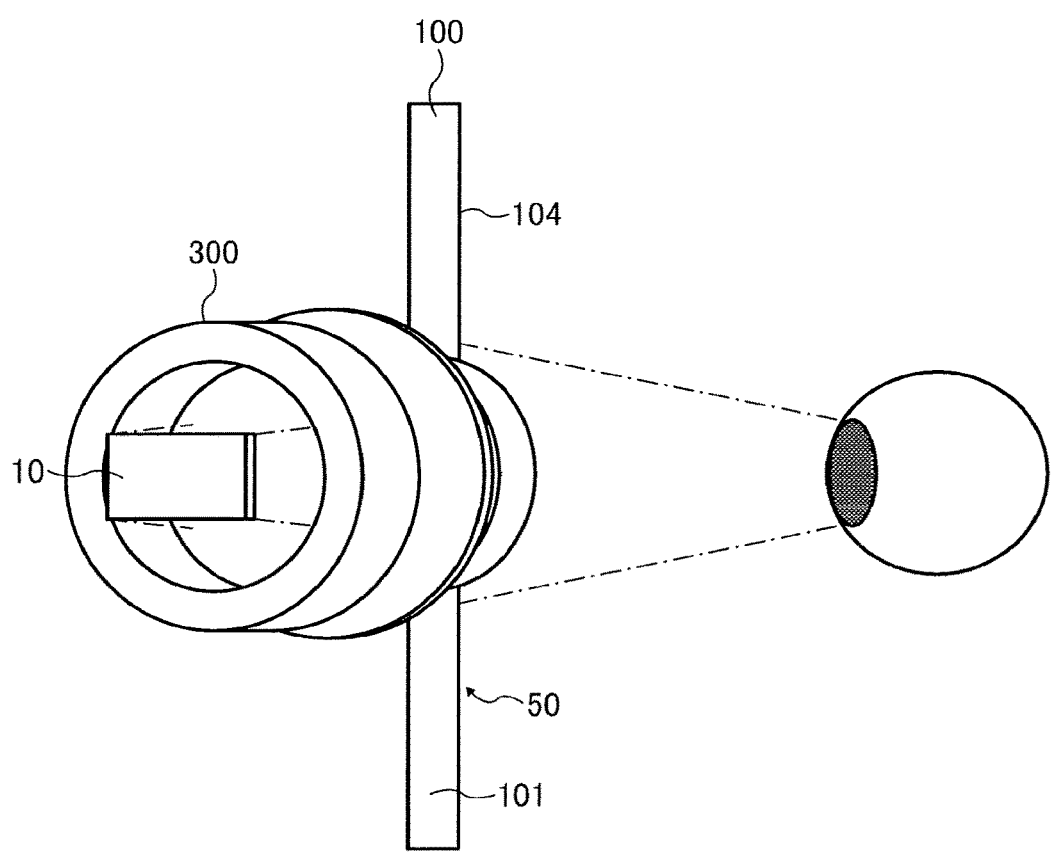
FIG. 11 is a side view of a virtual image display device with the light-guide member of FIG. 4, illustrating emitted image light as viewed from a horizontal direction according to an example embodiment of the present disclosure, and emitted.
Figure 12:
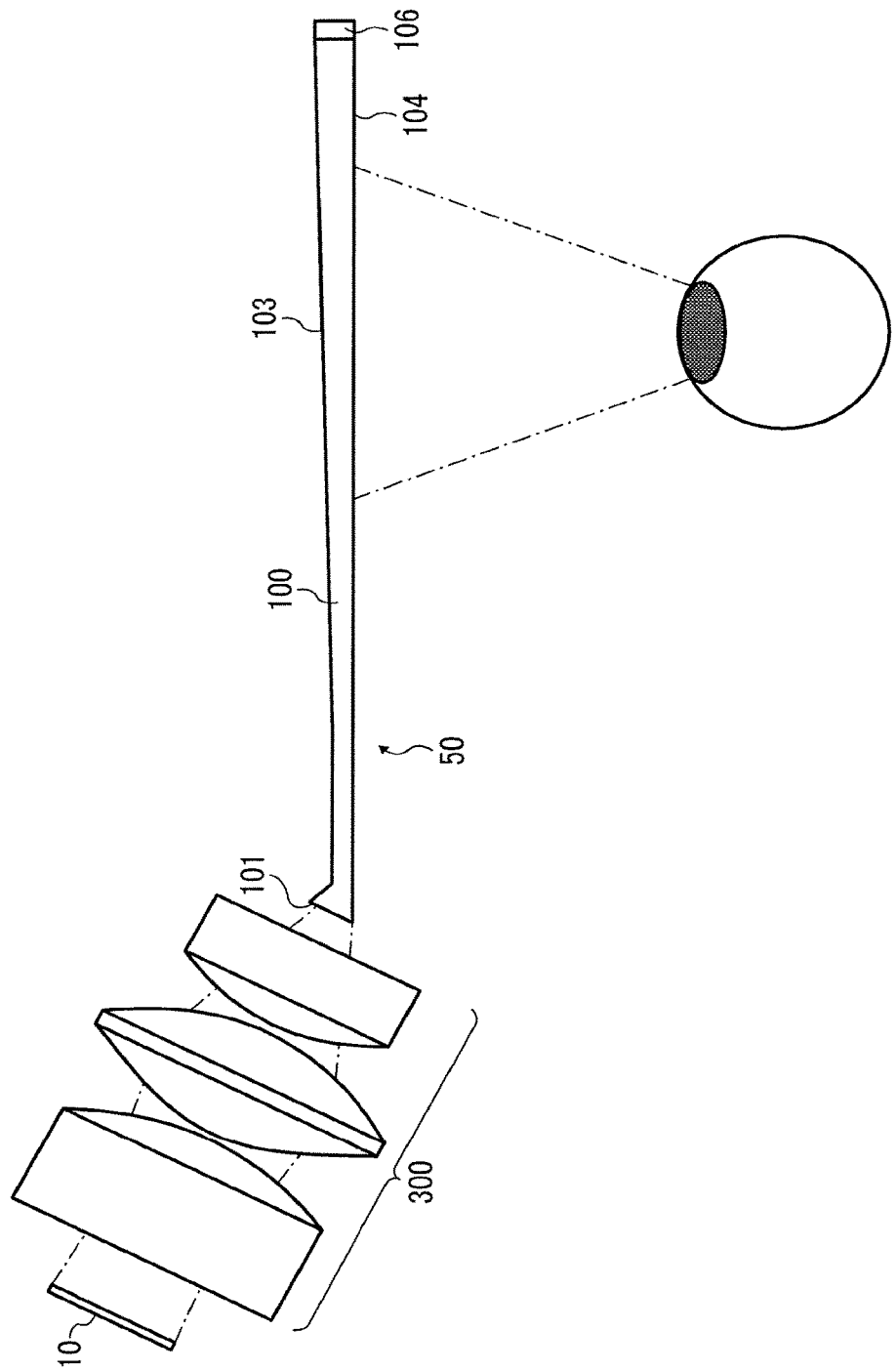
FIG. 12 is a plan view of the emission of image light of FIG. 11 as viewed from a horizontal direction.
Figure 13:
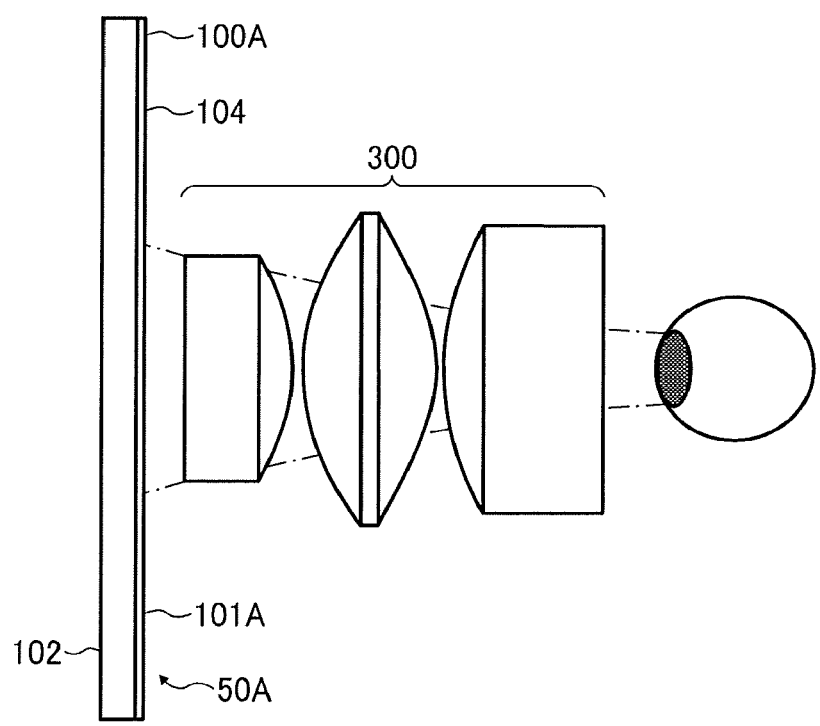
FIG. 13 is a side view of a virtual image display device with the light-guide member according to a variation of an embodiment of the present disclosure, illustrating the emission of image light as viewed from a horizontal direction.
Figure 14:
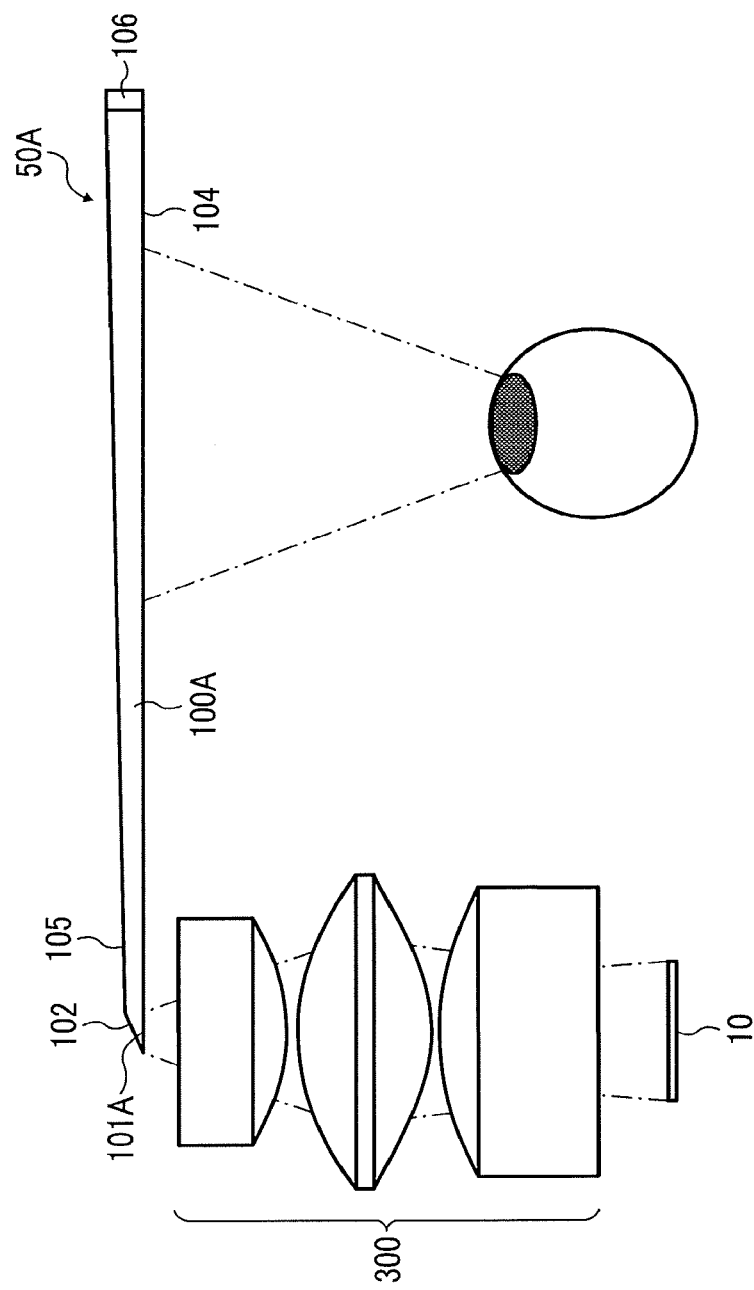
FIG. 14 is a plan view of the emission of image light of FIG. 13 as viewed from a horizontal direction.

The following describes Examples 1 and 2 of a virtual image display device, referring to FIGS. 11 through 14. FIGS. 11 and 12 illustrate a virtual display device VD including the above-described light guide 50, according to Example 1. FIGS. 13 and 14 illustrate another virtual display device VD including a light guide 50A as a variation according to Example 2.

In Examples 1 and 2, the light guide 50 (50A) includes a collimator lens with a focal length of 7.5 mm, and is made of plastic with a refractive index (Nd) of 1.53. In the light guide 50 (50A), the first surface has an angle θa of 3.15 degrees. Further, the light guide 50 (50A) emits image light having an eye relief of greater than or equal to 15 mm, and an eye box of greater than or equal to 5 mm.

Example 1

In Example 1 depicted in FIGS. 11 and 12, the light guide 50 is produced to have the following size.

Thickness of the light guide: a thinnest part is 1 mm, a thickest part is 1.9 mm, a longitudinal length is 46 mm, and a width is 33 mm.

The light guide 50 according to Example 1 has a horizontal viewing angle of 50 degrees and a vertical viewing angle of 27 degrees.

Example 2

In a light guide 50A as illustrated in FIGS. 13 and 14 according to Example 2, image light enters the light guide 50A from the back side. The configuration of the light guide 50A according to Example 2 differs from the light guide 50 according to the above-described embodiments and Example 1 in the following points:

The light guide 50A according to Example 2 includes a light-guide member 100A that includes an incidence portion 101A on the same plane (i.e., the rear face) on which an exit portion 104 is disposed. Accordingly, the light guide 50A according to Example 2 has a different optical path of an optical system 300 than those of the above-described embodiments and Example 1. Further, in the light guide 50A according to Example 2, collimator lenses are disposed on the side of the rear face. The light-guide member 100A according to Example 2 includes a reflective portion 102 to reflect and guide image light having entered the incidence portion 101A, into the light-guide member 100A. The reflective portion 102 is a plane that is continuous to the incidence portion 101A and the front face 105. The reflective portion 102 is inclined relative to the incidence portion 101A at a predetermined angle.

The light guide 50A according to Example 2 is produced to have the same size as that of Example 1. More specifically, the light guide 50A according to Example 2 has a thinnest part of 1 mm, a thickest part of 1.9 mm, a longitudinal length of 46 mm, and a width of 33 mm. The light guide 50A according to Example 2 also has a horizontal viewing angle of 50 degrees and a vertical viewing angle of 27 degrees.

The configurations according to the embodiments and Examples described above provide a thin light guide for use in a virtual image display device that sufficiently obtains a wide viewing angle, particularly a viewing angle in vertical direction.

A description is provided of embodiments according to the present disclosure, referring to the drawings. The following embodiments of the present disclosure relate to a transmissive light guide and a virtual image display device including the light guide.

Figure 15:
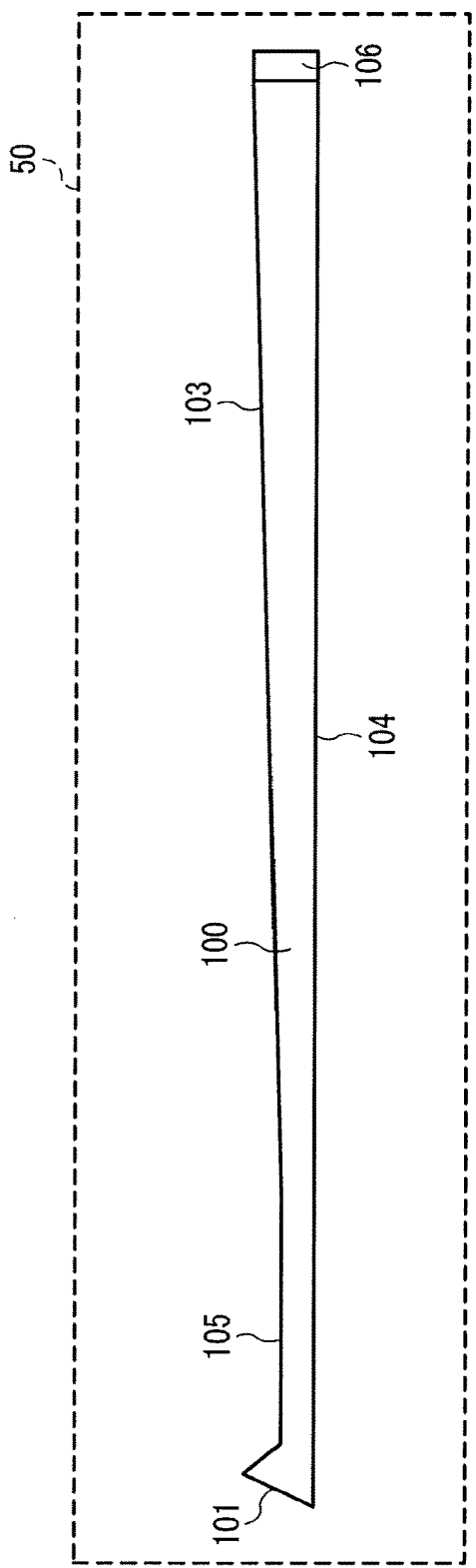
FIG. 15 is a plan view of a light guide according to an embodiment of the present disclosure.
Figure 20:
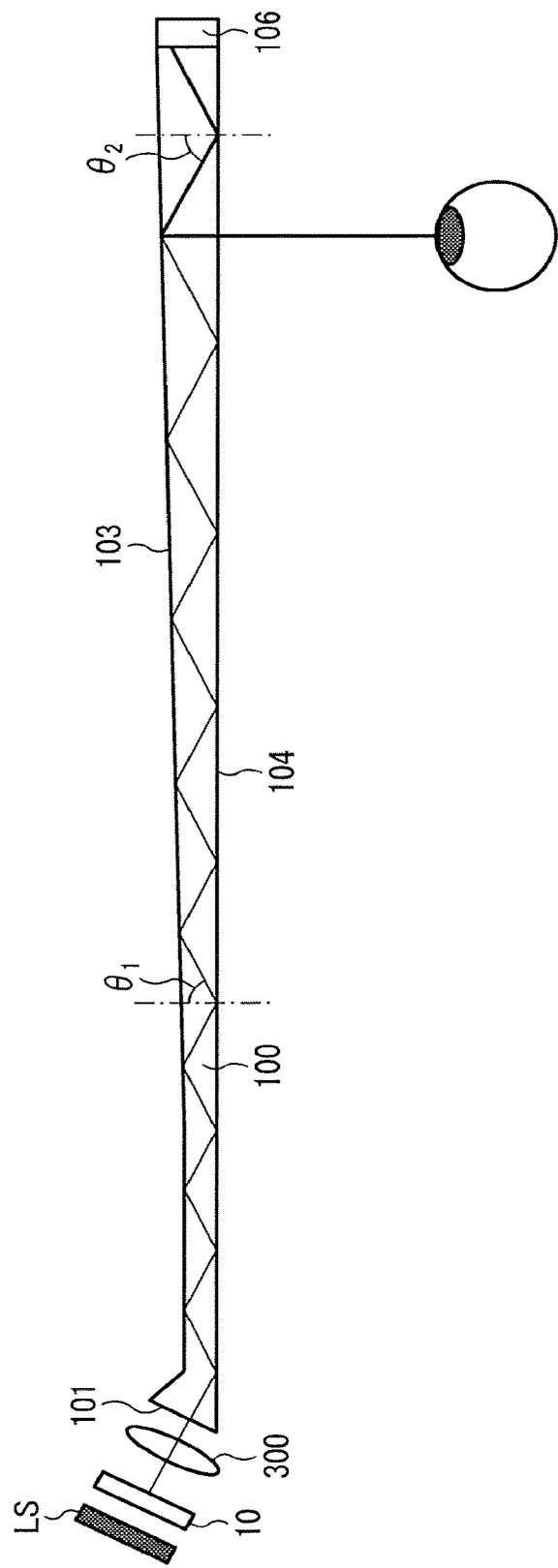
FIG. 20 is a plan view of a virtual image display device with the light guide of FIG. 15.

FIG. 15 illustrates a light guide 50 according to the present embodiment. FIG. 20 illustrates a virtual display device VD including a virtual image optical system VO with an optical path. As illustrated in FIG. 20, the optical path of the virtual image optical system VO is indicated by solid line. FIG. 20 also schematically illustrates eyes of a user as an observer of a virtual image. Hereinafter, a rear face of the light guide 50 refers to a face close to the observer (the bottom surface of the light guide 50 in FIGS. 15 and 20) and a front face of the light guide 50 refers to a face away from the observer (the upper surface of the light guide 50 in FIGS. 15 and 20).

The light guide 50 is an element to allow image light output from an image display element 10 to enter the light guide 50. The light guide 50 further guides the image light into the light guide 50 and emits the image light to display a virtual image. The light guide 50 according to the present embodiment includes a light-guide member 100 that has substantially a wedge shape in a planar view.

According to the present embodiment, the light-guide member 100 of the light guide 50 captures and guide the image light coming from the image display element 10, outputting the image light to the outside of the light guide 50 to display a virtual image. The light-guide member 100 includes an incidence portion 101, a reflective portion 102, an extraction portion 103, an exit portion 104, and a front face 105. The incident portion 101 allows the image light to enter the incident portion 101. The reflective portion 102 reflects and guides the image light having entered the incidence portion 101 into the light-guide member 100. The extraction portion 103 extracts the guided image light and the exit portion 104 emits the image light to the outside of the guide light 50. The light-guide member 100 according to the embodiments of the present disclosure includes a retroreflection portion 106 and the extraction portion 103. The retroreflection portion 106 reverses a direction of travel of image light that has entered the light-guide member through the incidence portion 101. The extraction portion 103 guides the image light, of which the direction of travel has been reversed by the retroreflection portion 106, to the exit portion 104, and extracts an image from the image light.

In the light-guide member 100 according to the present embodiment, the extraction portion 103 is disposed on the front face of the light-guide member 100 and the exit portion 104 is disposed on the rear face of the light-guide member 100. According to the present embodiment, the extraction portion 103 reflects the guided image light toward the exit portion 104. The exit portion 104 emits the image light reflected from the extraction portion 103 toward the eyes of the observer of a virtual image.

A region except for the extraction portion 103 on the front face of the light-guide member 100 is a total reflection plane 105 that totally reflects and guides the image light having entered the light-guide member 100. In the light-guide member 100 according to the present embodiment, each of the total reflection plane 105 and the rear face of the light-guide member 100 has a planar surface. The total reflection plane 105 is parallel with the rear face.

The extraction portion 103 has a shape in which the thickness of the light-guide member 100 increases toward the retroreflection portion 106 to be described in detail later. The retroreflection portion 106 is formed on an edge face of the light-guide member 100 that is the other side of the incidence portion 101.

Figure 16:
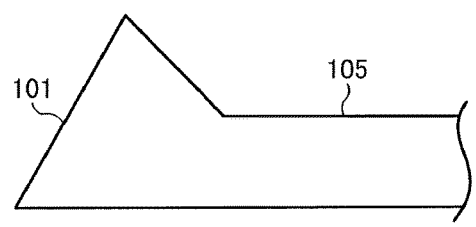
FIG. 16 is an enlarged view of an incidence portion in the light guide of FIG. 15 according to an embodiment of the present disclosure.

FIG. 16 is an enlarged view of the incidence portion 101 of the light-guide member 100. The incidence portion 101 is continuous from the rear face of the light-guide member 100, and projects from the front face of the light-guide member 100 to provide a larger area for image light to enter.

Figure 17:
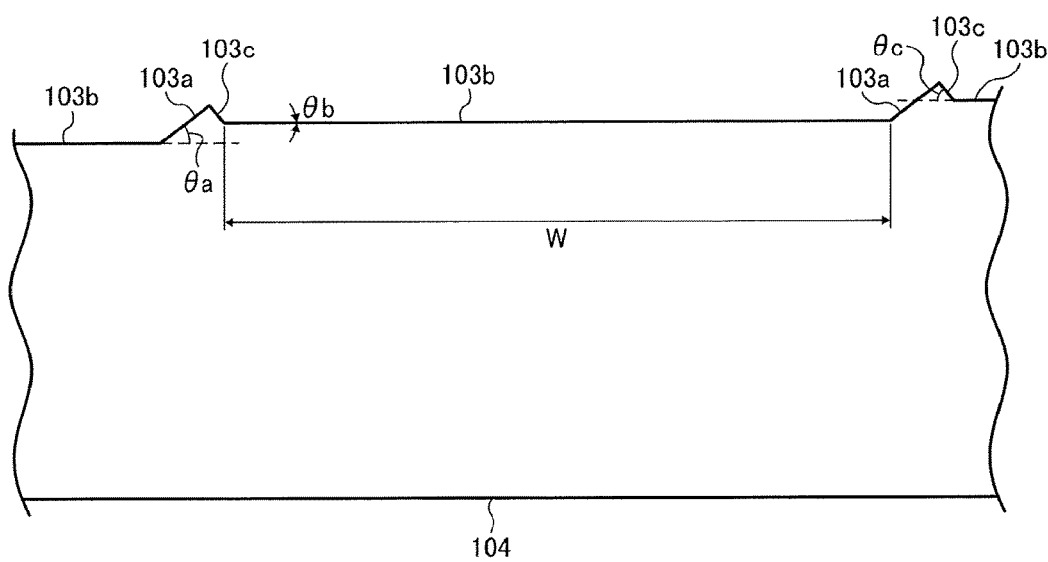
FIG. 17 is an enlarged view of an extraction portion of the light guide of FIG. 15 according to an embodiment of the present disclosure.

FIG. 17 is an enlarged view of the extraction portion 103 of the light-guide member 100. FIG. 17 represents a reference plane parallel with the exit portion 104 indicated by a dotted line.

As illustrated in FIG. 17, the extraction portion 103 according to the present embodiment has substantially a stepwise shape in which the first surface 103a, the second surface 103b, and a third surface 103c are repeatedly disposed in the recited order in a direction toward the incidence portion 101. The first surface 103a of the extraction portion 103 is a plane surface that is inclined relative to the exit portion 104 at an angle θa, and faces the retroreflection portion 106. The second surface 103b is continuous from the bottom end of the first surface 103a and to the bottom end of the third surface 103c. In this case, the first surface 103a is adjacent to the second surface 103b on the retroreflection-portion side (the right side in FIG. 17) of the second surface 103b. The third surface 103c is adjacent to the second surface 103b on the incidence-portion side of the second surface 103b. Thus, the second surface 103b according to the present embodiment is parallel with the exit portion 104. The second surface 103b and the exit portion 104 form an angle θb of 0 degree.

The third surface 103c is a plane surface that is inclined from the upper end of the first surface 103a to the exit portion 104 in an opposite direction of the inclination of the first surface 103a. The inclination angle of the third surface 103c relative to the exit portion 104 is an angle θc. The bottom end of the third surface 103c is continuous to the second surface 103b that is adjacent to the bottom end on the side of the retroreflection portion 106. In the present embodiment, the third surface 103c is opposed to the incidence portion 101. That is, the third surface 103c is inclined in an opposite direction of the first surface 103a. The third surface 103c has a smaller area than the first surface 103a does, and rises from an end of the second surface 103b to the upper end of the first surface 103a.

According to the present embodiment, the first surface 103a of the extraction portion 103 serves to guide image light having entered the light-guide member 100 and having been reflected by the retroreflection portion 106 to the exit portion 104 and emit the image light from the exit portion 104. The first surface 103a is inclined relative to the exit portion 104 in the same direction as the direction in which the incidence portion 101 is inclined relative to the exit portion 104. In other words, the incidence portion 101 and the first surface 103a, which are inclined relative to the exit portion 104 at a predetermined inclination angle, face the retroreflection portion 106.

Preferably, the angle θa of inclination of the first surface 103a relative to the exit portion 104 falls within the range of from 20 through 35 degrees, and more preferably from 20 through 30 degrees according to the refractive index of material for the light-guide member 100.

According to the present embodiment of this disclosure, the second surface 103b serves to reflect and guide the incident image light to the retroreflection portion 106, and also serves as a reflection surface to reflect the image light of which the direction of travel has been reversed by the retroreflection portion 106. The second surface 103b also serves as a transparent surface to allow light externally coming through the front face and the rear face of the light guide 50 to pass through the light guide 50 to secure the see-through characteristics.

With the second surface 103b inclined relative to the exit portion 104 to form the angle θb which is not 0 degree, the image light passing through the light-guide member 100 and reflected by the second surface 103b does not coincide the image light passing through the light-guide member 100 and reflected by the exit portion 104 due to the difference in reflection angle. In this case, the incidence angle θin defied by the light rays having enters through the incidence portion 101 and the normal relative to the incidence portion 101 is not equal to the exit angle θout defined by the light rays exiting through the exit portion 104 and the normal relative to the exit portion 104. Further, in such a case, the image light passes through the first surface 103a and exits the exit portion 104 to the outside in different directions, generating an unsuccessful virtual image. Thus, the second surface 103b according to the present embodiment of this disclosure is parallel with the exit portion 104, that is, the angle θb is 0 degree.

As illustrated in FIG. 3, it is preferable that the height of the second surface 103b gradually increases with a closer distance to the retroreflection portion 106. In other words, the distance (i.e., thickness of the light-guide member 100) between the second surface 103b and the exit portion 104 increases toward the retroreflection portion 106.

In such a light-guide member 100 according to the present embodiment, the second surface 103b gradually decreases in height from the exit portion 104 in a direction of travel of image light having been reversed by the retroreflection portion 106. Thus, the space in which the image light is totally reflected decreases. With such a configuration, the amount of light rays that are reflected by the extraction portion 103 gradually increases, thereby increasing the amount of light rays that come from the exit portion 104 and enter the eyes of an observer, thus successfully allowing the observation of an virtual image with less unevenness of brightness.

The third surface 103c serves to prevent the occurrence of stray light, and a detailed description thereof is given later.

Next, a detailed description is given of the retroreflection portion 106 disposed on the light-guide member 100, referring to the plan view, the perspective view and the front view of FIGS. 1, 4 and 5, respectively.

Figure 18:
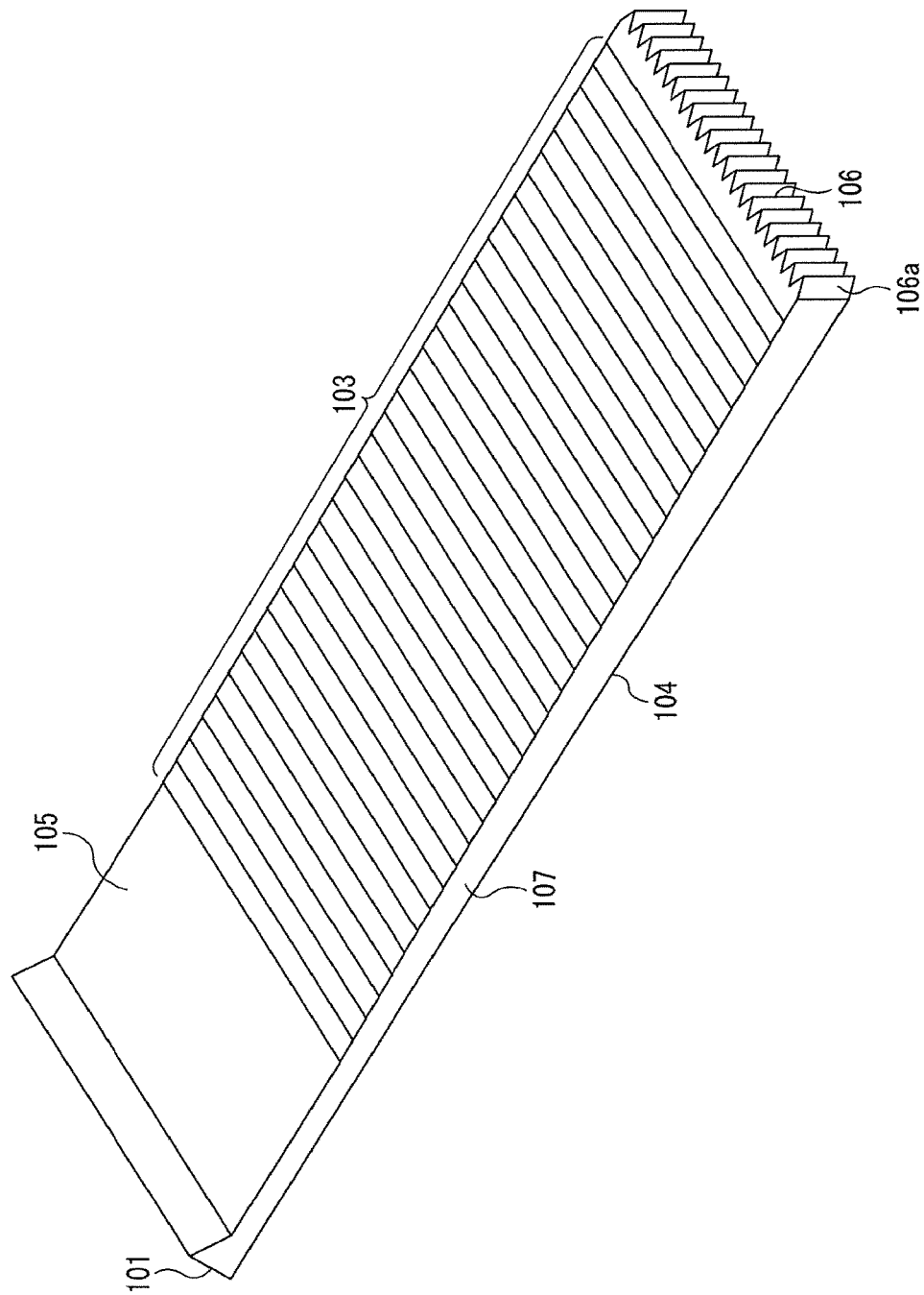
FIG. 18 is a perspective view of the light guide of FIG. 15.
Figure 19:
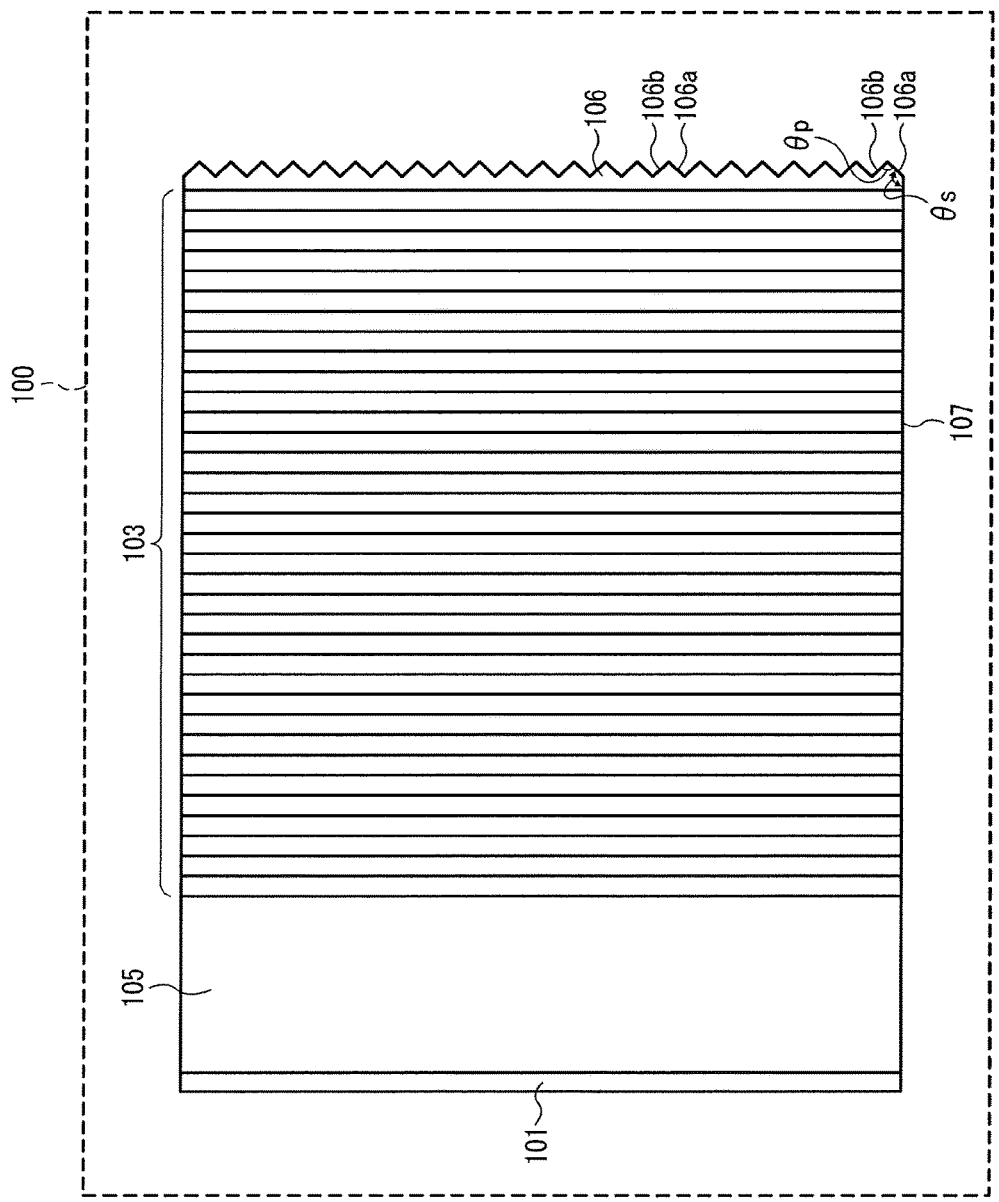
FIG. 19 is a front view of the light-guide member of the light guide to describe the configuration of a retroreflective portion.

As illustrated in FIG. 15, the retroreflection portion 106 is disposed on the lateral end face of the light-guide member 100 that is a vertical surface to the exit portion 104. More specifically, the retroreflection portion 106 is disposed on the opposite end face of the incidence portion 101. The retroreflection portion 106 includes a plurality of surfaces, as illustrated in FIGS. 18 and 19. In other words, the opposite end face of the incidence portion 101 is not planar and includes the plurality of surfaces that constitutes the retroreflection portion 106.

As illustrated in FIG. 19, a plurality of first inclined surfaces 106a and a plurality of second inclined surfaces 106b alternate to form the retroreflection portion 106. Each first inclined surface 106a forms an angle θs relative to a side face 107 of the light-guide member 100 that is continuous to the incidence portion 101. Each second inclined surface 106b forms an angle θp relative to each first inclined surface 106a. Each first inclined surface 106a (hereinafter, referred to simply as the first inclined surface 106a) and each second inclined surface 106b (hereinafter, referred to simply as the second inclined surface 106b) constitute one prism. In other words, a plurality of prisms is disposed in a row on the opposite end face of the incidence portion 101 to constitute the retroreflection portion 106. The first inclined surface 106a and the second inclined surface 106b each is a plane surface having substantially the same shape and area.

In the present embodiment, the angle θs formed by the side face 107 and the first inclined surface 106a is 135 degrees. The angle θp formed by the first inclined surface 106a and the second inclined surface 106b is an apex angle of each prism that is 90 degrees in the present embodiment. Thus, a plurality of prisms, each having an apex angle of 90 degrees, constitutes the retroreflection portion 106.

The retroreflection portion 106, i.e., the plurality of first inclined surfaces 106a and second inclined surfaces 106b, are preferably applied with coating having a high reflectivity to successfully reflect image light that reaches the retroreflection portion 106. The reflectivity of such a coating is preferably greater than or equal to 70%.

In the present embodiment, on the opposite end face of the incidence portion 101 is disposed the retroreflection portion 106. Alternatively, as another example, a retroreflection portion may be disposed on the side face 107 that is vertical to the exit portion 104. Alternatively, a reflective portion may be disposed on another side face 108 that is opposed to the side face 107.

Preferably, the light-guide member 100 of the light guide 50 is made of high light-transmissive material to ensure the see-through characteristics. More preferably, the light-guide member 100 is made of resin so that the above-described extraction portion 103 is subjected to machining.

Any coating may be applied to the extraction portion 103. For example, mirror coating, such as aluminum, silver, and dielectric coating, may be applied to the extraction portion 103. Preferably, coating having a reflectivity of approximately 10% is applied to the first surface 103a of the extraction portion 103 to prevent the loss of the guided image light as much as possible.

The width w (refer to FIG. 17) of the second surface 103b of the extraction portion 103 of the light-guide member 100 satisfies the following condition: 0.5 mm<w<3.0 mm. The second surface 103b has a width w in the longitudinal direction of the light-guide member 100 that is a direction along the direction of travel of the image light.

Hereinafter, a description is provided of the conditions for the width w of the second surface 103b.

As described above, the width of field of view that allows a virtual image to be sighted is referred to as "eye box". The distance from the exit portion 104 to the eye balls of a user (observer) to allow the user to sight a virtual image is referred to as "eye relief". The width w of the second surface 103b is defined by the following expression when the symbol "φ" is the diameter of the eye box, the symbol "L" is the eye relief, the symbol "tk" is the thickness of the light guide 50, and the symbol "n" is the number of the second surface 103b, which is parallel with the exit portion 104, within the extraction portion 103:

In this case, with an increase in the width of the eye box, the range of field of view increases. Thus, increasing the diameter φ of the eye box is preferable. However, increasing the diameter φ of the eye box increases the thickness tk of the light guide 50, thereby making it difficult to design the light guide 50.

The diameter of an eye is approximately 5 mm in general. The position of the light guide 50 is adjusted as appropriate according to the diameter of the eye, which varies between individuals. The light guide 50 preferably has an eye relief L of greater than or equal to 15 mm to be applied to a virtual image display device in a pair of eyeglasses.

With an eye relief L of 20 mm and an eye box ranging from 5 mm through 10 mm, for example, the width w of the second surface 103b satisfies the following condition: 0.5 mm<w<3.0 mm.

With the width w of the second surface 103b below 0.5 mm, the width of the first surface 103a is reduced. However, reducing the width of the first surface 103a easily generates diffraction phenomenon of the incident image light, making it difficult to produce the light guide 50. In such a case, the thickness of the light guide 50 is increased to secure the eye box ranging from 5 mm through 10 mm at a position of an eye relief of 20 mm without reducing the width of the first surface 103a. However, the increase in thickness of the light guide 50 increases the weight of the light guide 50.

By contrast, with the width w of the second surface 103b above 3.0 mm, the density of the light rays of the incident image light reflected by the first surface 103a and exiting through the exit portion 104, resulting in a reduction in amount of light at the position of the eyes. Thus, it is desirable for the width w of the second surface 103b of the extraction portion 103 to satisfy the condition: 0.5 mm<w<3.0 mm.

The values of the width w of the second surface 103b differ between the respective second surfaces 103b. Specifically, with a shorter distance from the incidence portion 101 to a second surface 103b, the density of light rays of image light decreases. Accordingly, with a shorter distance from the incidence portion 101 to a second surface 103b, the width w of the second surface 103b preferably decreases. With such a configuration, the unevenness of light quantity is eliminated or reduced because the number of the first surface 103a per unit length increases with a shorter distance from the incidence portion 101.

In the same manner as the second surface 103b does, the value of the width of the first surfaces 103a of the extraction portion 103 differs with the first surfaces 103a to reduce the uneven amount of light. In this case, the width of the first surface 103a refers to the length of the first surface 103a in the longitudinal direction of the light-guide member 100, which is the direction of travel of the incident image light. Specifically, with a shorter distance from the incidence portion 101 to a first surface 103a, the width of the first surface 103a increases. With such a configuration, the unevenness of light quantity is eliminated or reduced because the area of the first surface 103a increases with a shorter distance from the incidence portion 101.

Preferably, the thickness of the light guide 50 ranges from 1 mm through 8 mm. With the thickness of the light guide 50 below 1 mm, forming the shape of the extraction portion 103 of the light-guide member 100 is difficult. With the thickness of the light guide 50 above 8 mm, the structural components increases in weight although a wide viewing angle is obtained.

The following describes the virtual display device VD including the light guide 50 according to the present embodiment, referring to FIG. 20.

The virtual display device VD according to the present embodiment of FIG. 20 includes the image display element 10, a collimator optical system 300, and the light guide 50. The image display element 10 outputs image light of a display image to the collimator optical system 300. The collimator optical system 300 collimates the image light and the collimated image light enters the light guide 50. The image display element 10, the collimator optical system 300, and the light guide 50 constitute the virtual image optical system VO. FIG. 20 indicates an optical path of image light that is emitted from the center of the image display surface of the image display element 10. FIG. 20 represents the normal line with respect to the exit portion 104 by a dot-and-dash line and reflection angles θ1 and θ2 with reference to the normal line. The definition of the angles θ1 and θ2 are described below.

In the virtual image optical system VO according to the present embodiment, the collimator optical system 300 is disposed adjacent to the incidence portion 101 of the light-guide member 100, and serves to convert image light displayed on the image display element 10, i.e., image information of a displayed image, into angle information.

The image display element 10 outputs image light corresponding to a display image, the image light which passes through the light guide 50 to be displayed as a virtual image. Examples of the image display element 10 include, but not limited to, an organic light emitting diode (OLED) and a liquid crystal display element. Alternatively, other various display types are also applicable. For example, a digital micro-mirror device (DMD) is applicable as the image display element 10. Alternatively, in some embodiment, a thin film transistor (TFT) or a liquid crystal on silicon (LCOS) is applicable as the image display element 10. Alternatively, in some embodiment, a micro electro mechanical system (MEMS) is applicable as the image display element 10.

The image display element 10 of FIG. 20 according to the present embodiment is the LCOS or the DMD, in which a light source is employed together. In FIG. 20, a light source LS is employed to illuminate the image display element 10. Examples of the light source LS include a light emitting diode (LED), a semiconductor laser (laser diode (LD)), and a discharge lamp.

According to the present embodiment, the collimator optical system 300, which includes a plurality of optical lenses and a stop aperture, enlarges the image light output from the image display element 10 and outputs the enlarged parallel light to the light guide 50.

In the virtual display device VD according to the present embodiment, the image light emitted from the image display element 10 illuminated with a light source LS passes through the collimator optical system 300, and the collimator optical system 300 enlarges and collimates the image light. The image light enters the light guide 50, as parallel light. Specifically, the image light enlarged and collimated by the collimator optical system 300 enters the light guide 50 through the incidence portion 101 of the light-guide member 100. The image light is guided into the light-guide member 100. The guided image light is totally reflected by the front face and the rear face in the interior of the light-guide member 100 at an angle θ1, and advances toward the retroreflection portion 106. The image light that has reached the retroreflection portion 106 is reflected by a plurality of prisms of the above-described first inclined surfaces 106a and second inclined surfaces 106b, thereby reversing the direction of travel to advance toward the incidence portion 101. The reversed image light is totally reflected by the front face and the rear face of the light-guide member 100 at an angle θ2, and advances toward the incidence portion 101. When the image light having been reversed reaches the first surface 103a of the extraction portion 103, the image light is reflected by the first surface 103a and is guided to the exit portion 104. Then, the image light exits from the exit portion 104 toward the eyes of a user (observer), as image information. The user (observer) looks forward through the exit portion 104 of the light-guide member 100 to visually identify a virtual image of the image light.

Figure 21:
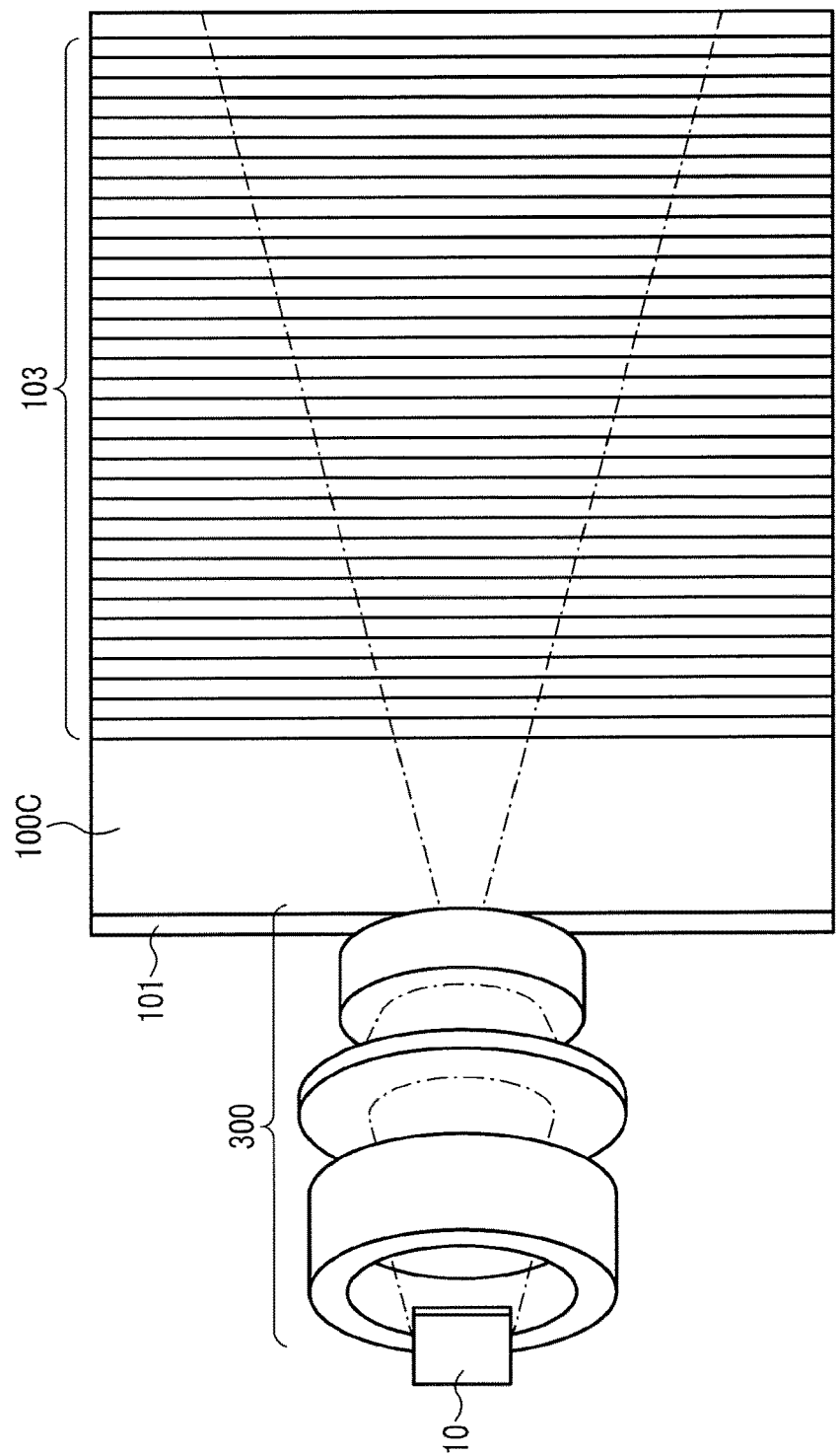
FIG. 21 is an illustration of the dispersion of image light within the light-guide member without the retroreflective portion a comparative example.
Figure 22:
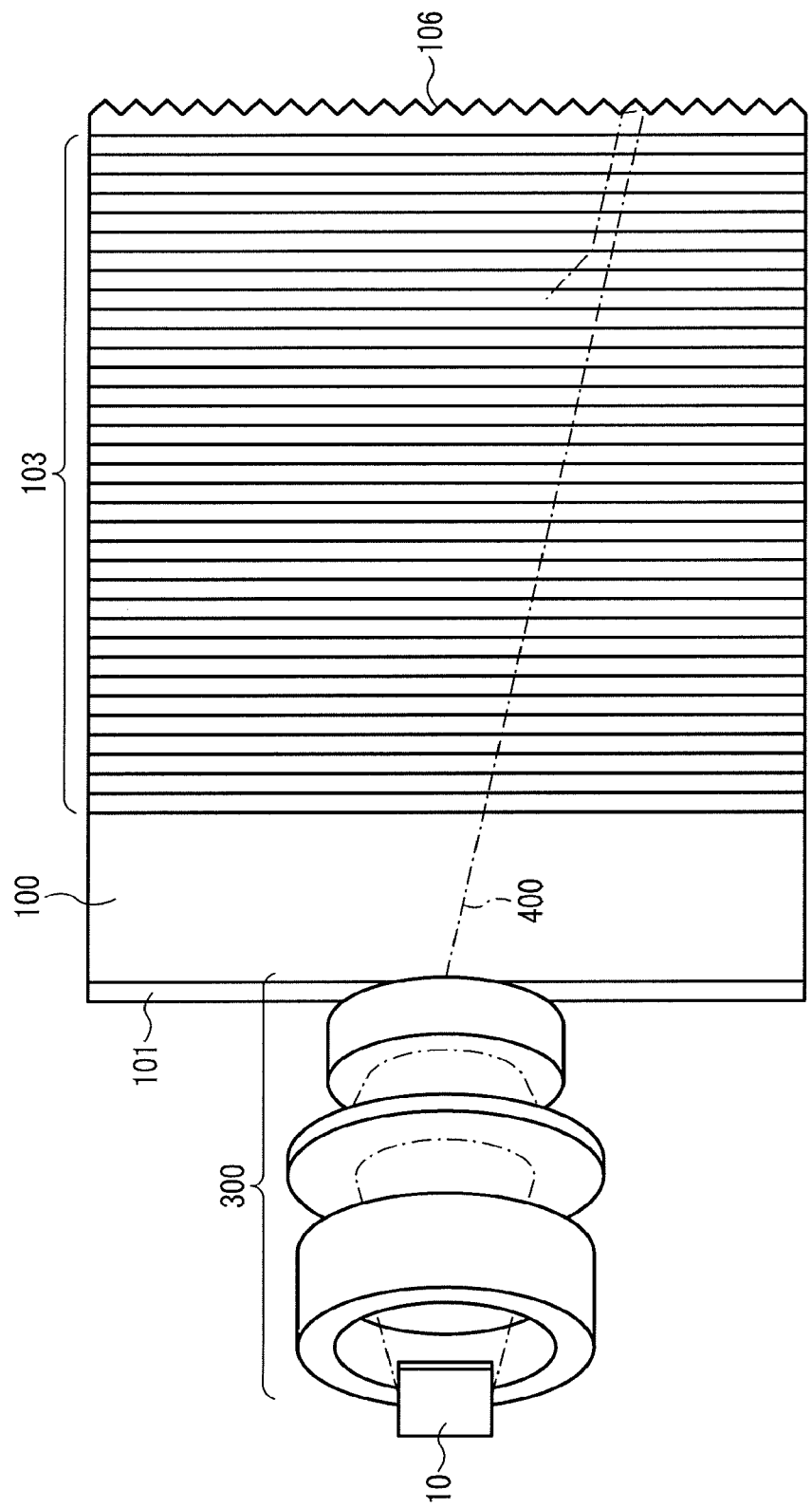
FIG. 22 is an illustration of image light that is emitted from an edge of an image display element and is guided through the light-guide member of FIG. 15.
Figure 23:
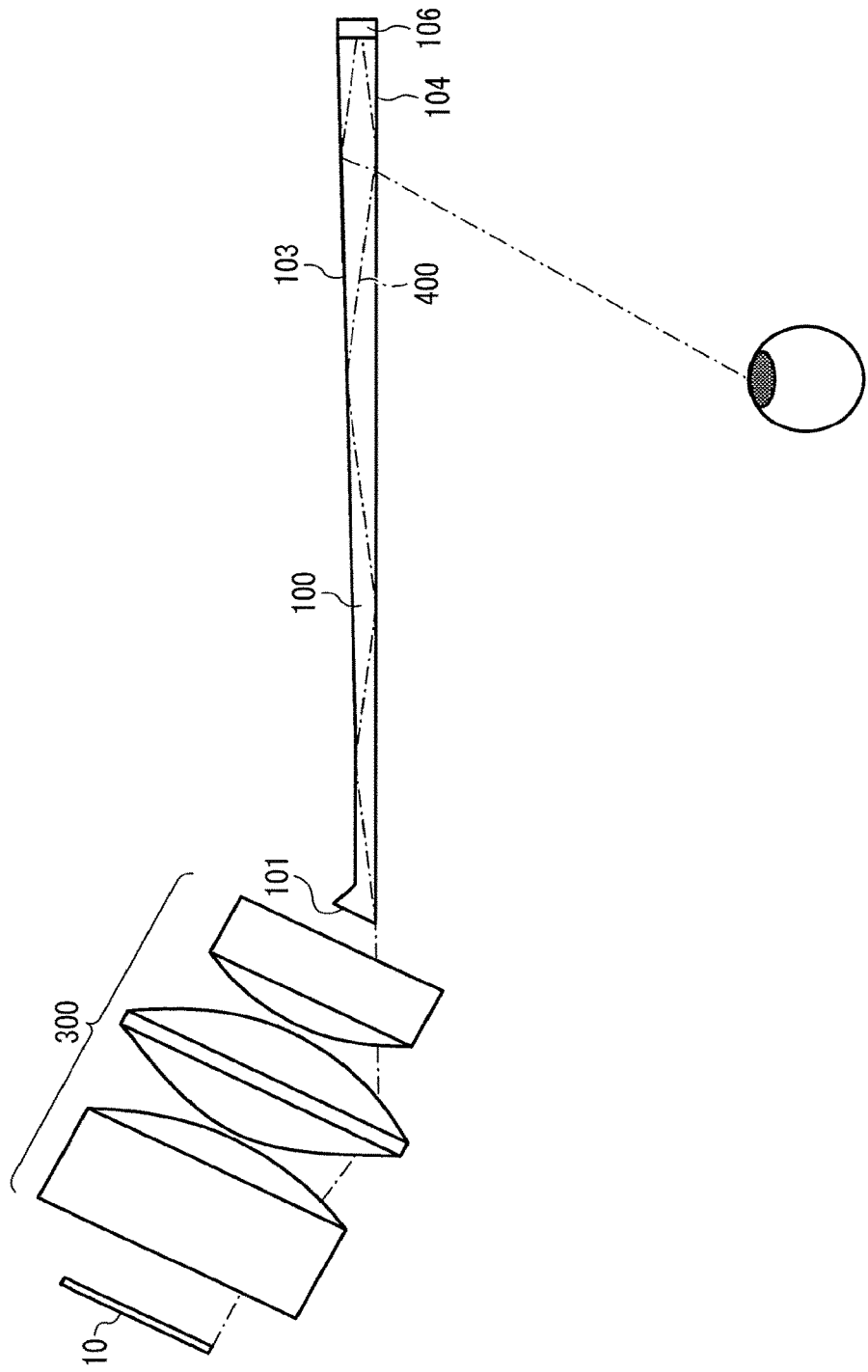
FIG. 23 is a planar view of the light-guide member through which the image light of FIG. 22 is guided.

Next, a detailed description is given of the manners in which guided image light travels through the light-guide member 100, referring to the drawings. FIG. 21 is an illustration of image light that enters and passes through the light-guide member 100C without the retroreflection portion 106 according to a comparative example. The light-guide member 100C according to the comparative example differs from the light-guide member 100 according to the above-described embodiment in that the light-guide member 100C does not include the retroreflection portion 106, and that the first surface 103a of the extraction portion 103 is inclined in the opposite direction of that of the above-described embodiment, i.e., the direction opposed to that of the incidence portion 101.

As illustrated in FIG. 21, image light emitted from the image display element 10 passes through the collimator optical system 300 to be a collimated light, and the collimated light (the image light having passed through the collimator optical system 300) enters the light-guide member 100C through the incidence portion 101 and travels through the light-guide member 100C. The image light having entered the incidence portion 101 is totally reflected within the light-guide member 100C to diverge while traveling through the light-guide member 100C, as illustrated in FIG. 21. That is, the image having entered the incidence portion 101 diverges, traveling through the light-guide member 100C. The degree of divergence of the image light increases in the wide-angle direction. In the comparative example, image light passes through the light-guide member 100C, while diverging in the vertical viewing direction.

In the light-guide member 100C according to the comparative example, the image light that is extracted from the first surface 103a of the extraction portion 103 is diverging light. Accordingly, the image light that exits from the exit portion 104 and comes into the eyes of an observer is light that diverges in the vertical viewing angle. With such image light, peripheral image light with a greater divergence angle does not come into the eyes of the observer so that a virtual image to be observed partially lacks.

Figure 42:
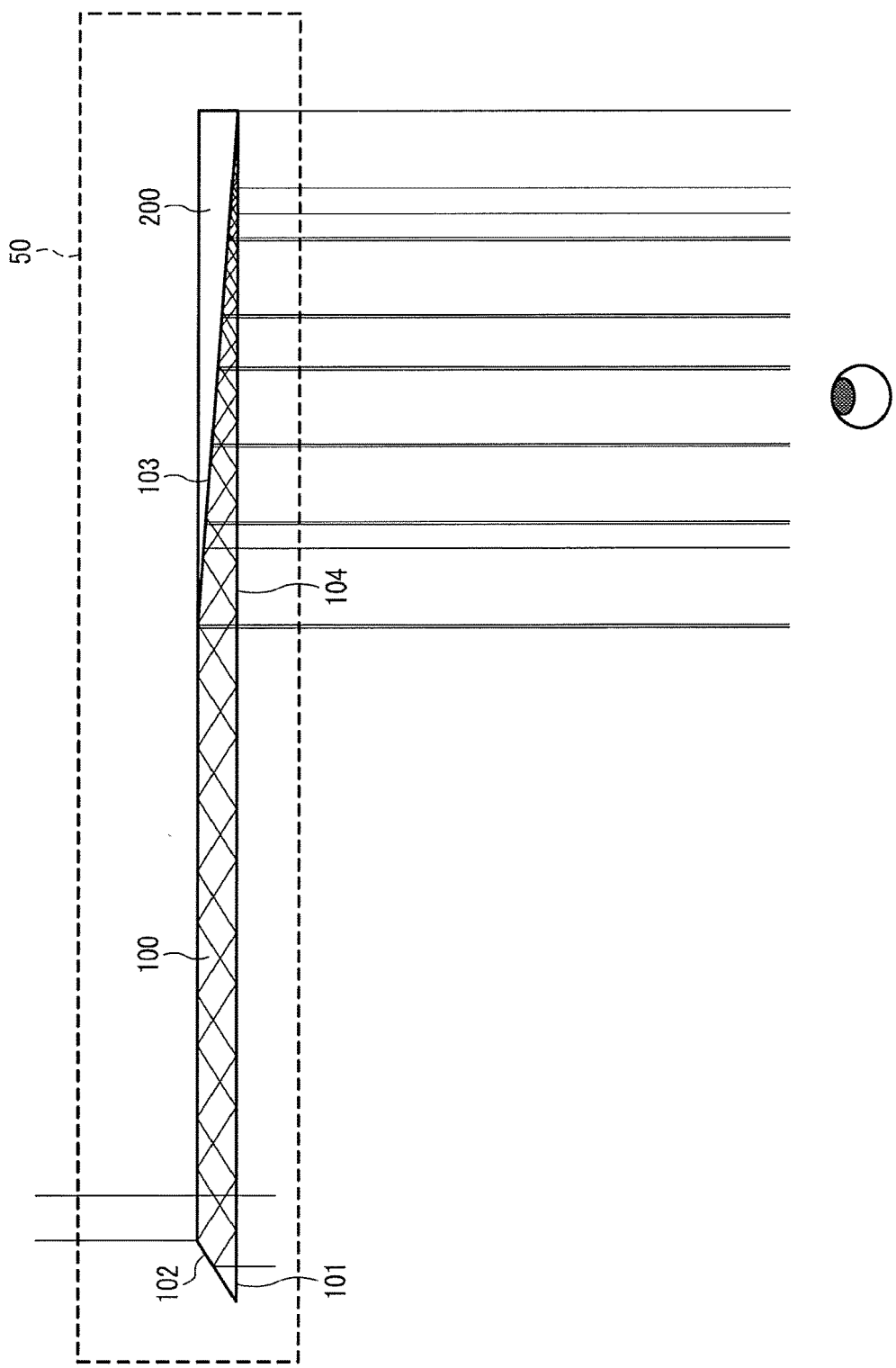
FIG. 42 is a ray diagram for describing unevenness of light rays of image light that is emitted from the center of an image display surface of an image display element and pass through a first light guide.
Figure 43:
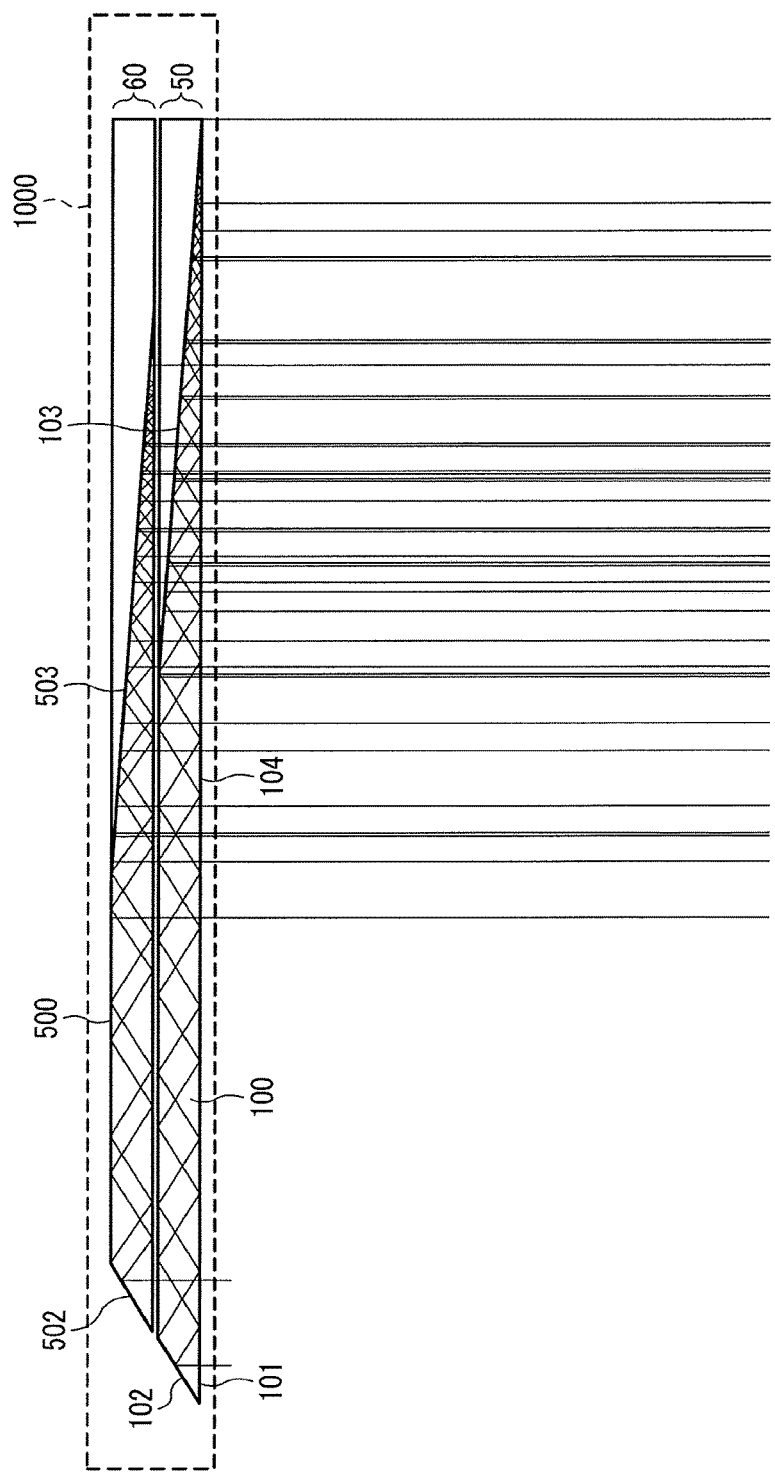
FIG. 43 is a ray diagram for describing an improved unevenness of light rays of image light that is emitted from the center of an image display surface of an image display element and pass through the light guide unit of FIG. 35.

Each of FIGS. 42 and 43 is an illustration of image light that passes through the light-guide member 100 of the light guide 50 according to the present embodiment. FIG. 42 is a front view (front face) of the light guide 50, and FIG. 43 is a side view (from above) of the light guide 50 according to the present example embodiment. In FIGS. 42 and 43, only a light ray 400 is represented that is emitted from the edge of the image display element 10 for the purposes of simplification.

As illustrated in FIG. 21, image light emitted from the image display element 10 passes through the collimator optical system 300 to be a collimated light, and the collimated light (the image light having passed through the collimator optical system 300) enters the light-guide member 100C through the incidence portion 101 and travels through the light-guide member 100C. The image light having entered the incidence portion 101 is totally reflected within the light-guide member 100 to diverge while traveling through the light-guide member 100. That is, the image light having entered the incidence portion 101 travels through the light-guide member 100 as divergent light in the same manner as the comparative example of FIG. 21 does until the image light reaches the retroreflection portion 106.

Subsequently, the image light is reflected by the retroreflection portion 106, and the direction of travel of the image light, i.e., the direction in which the image light is guided, is reversed. In the present embodiment, the image light is reflected by both the first inclined surface 106a and the second inclined surface 106b that constitute the retroreflection portion 106. Accordingly, the incident light and the exit light become parallel with each other as viewed from the planar direction, thereby traveling through the light-guide member 100 as converging light. The image light is then reflected by the first surface 103a of the extraction portion 103, and the reflected image light exits from the exit portion 104 as converging light to advance toward the eyes of the observer. The light guide 50 according to the present embodiment allows the emission of image light as converging light to reach the eyes of an observer, thus achieving a virtual image display device that allows a successful observation of a virtual image without any deficiency even at a wide angle.

Next, a detailed description is given of the conditions for preventing the occurrence of stray light and for eliminating stray light, referring to FIGS. 24 through 34.

Figure 24:
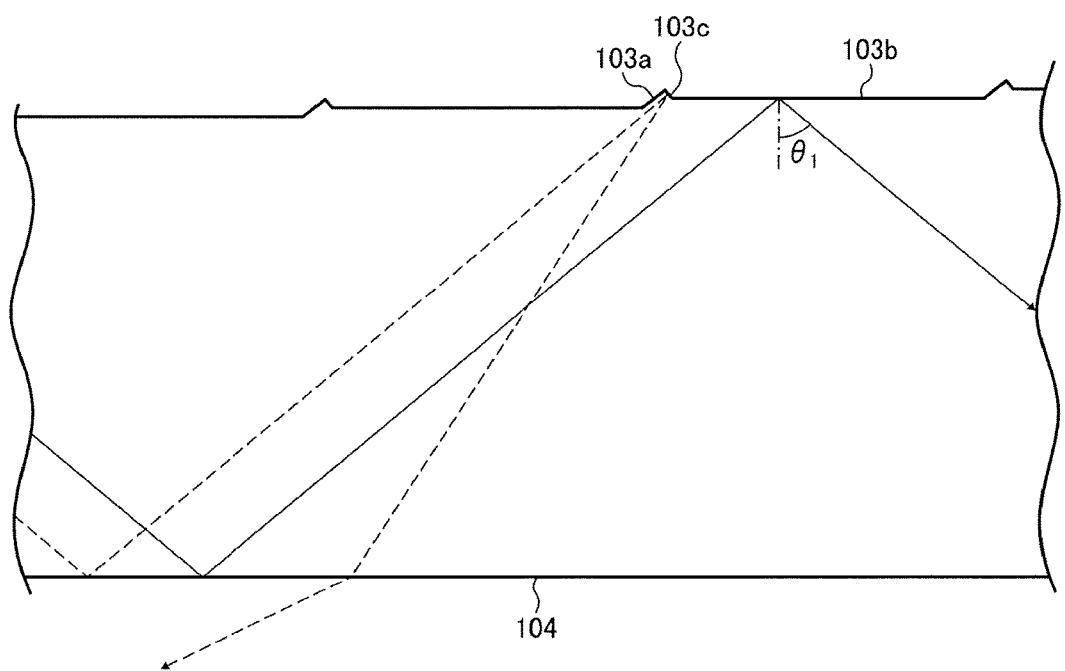
FIG. 24 is an enlarged view of image light that is reflected within the light-guide member before reaching the retroreflection portion.
Figure 25:
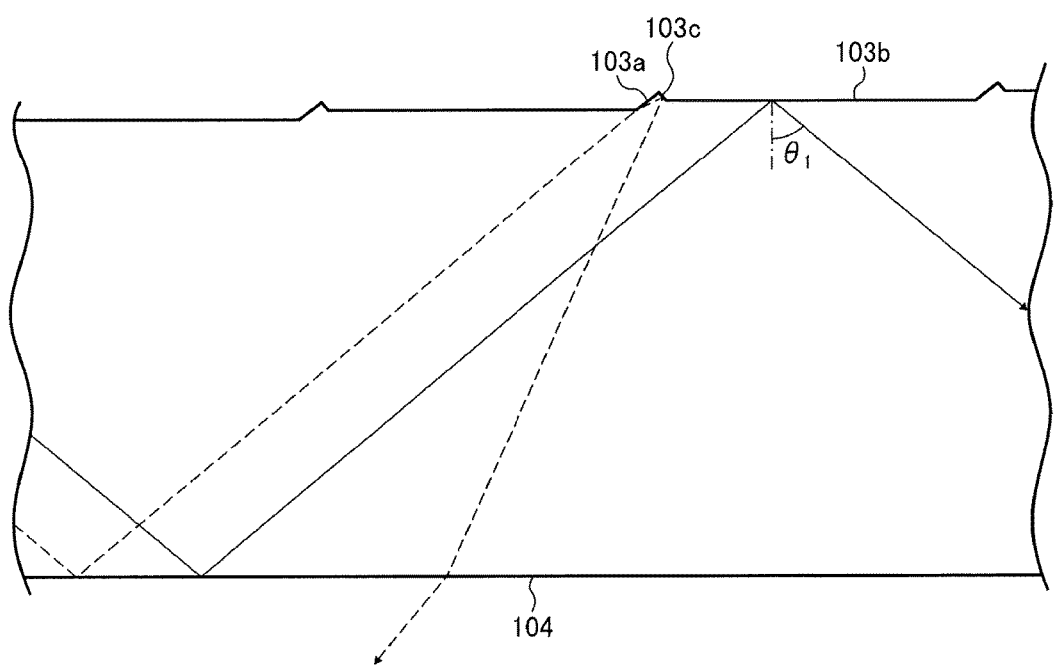
FIG. 25 is an enlarged view of image light that is reflected within the light-guide member before reaching the retroreflection portion.

First, a description is given of a case in which image light advancing toward the retroreflection portion 106 becomes stray light, referring to FIGS. 24 and 25. In FIGS. 24 and 25, regular light having hit the second surface 103b of the extraction portion 103 is represented by a solid line, and image light that might cause stray light is represented by a dotted line. FIGS. 24 and 25 represent the normal line with respect to the second surface 103b as indicated by a dot-and-dash line, and also represent the reflection angle θ1 with reference to the normal line.

FIG. 24 is an illustration of a case in which a light ray of the image light advancing forward the retroreflection portion 106 hits the third surface 103c of the extraction portion 103 and becomes stray light. As described above, image light having passed through the collimator optical system 300 enters the light-guide member 100 through the incidence portion 101, and is totally reflected by the front face and the rear face of the light-guide member 100, traveling through the light-guide member 100 toward the retroreflection portion 106. In this case, to make the image light totally reflected by the front face of the light-guide member 100, the image light preferably hits the above-described total reflection plane 105 or the second surface 103b of the extraction portion 103.

In FIG. 24, a part of the image light traveling through the light-guide member 100 is represented by a dotted line that hits the third surface 103c instead of the second surface 103b. As illustrated in FIG. 24, the light rays (image light) are totally reflected by the rear face and the second surface 103b of the light-guide member 100 in a repetitive manner, traveling through the light-guide member 100 toward the retroreflection portion 106, as the regular light. When the image light traveling through the light-guide member 100 strikes the third surface 103c, instead of the second surface 103b, the angle of the total reflection is not the angle θ1. Such image light goes out of the light-guide member 100 through the exit portion 104 before reaching the retroreflection portion 106 as illustrated in FIG. 24, which might generate stray light.

As indicated by a dotted line in FIG. 25, when the image light hits the third surface 103c immediately after striking the first surface 103a, the angle of the total reflection changes from the angle θ1. Such image light also goes out of the light-guide member 100 through the exit portion 104 before reaching the retroreflection portion 106, which might result in stray light.

Figure 26:
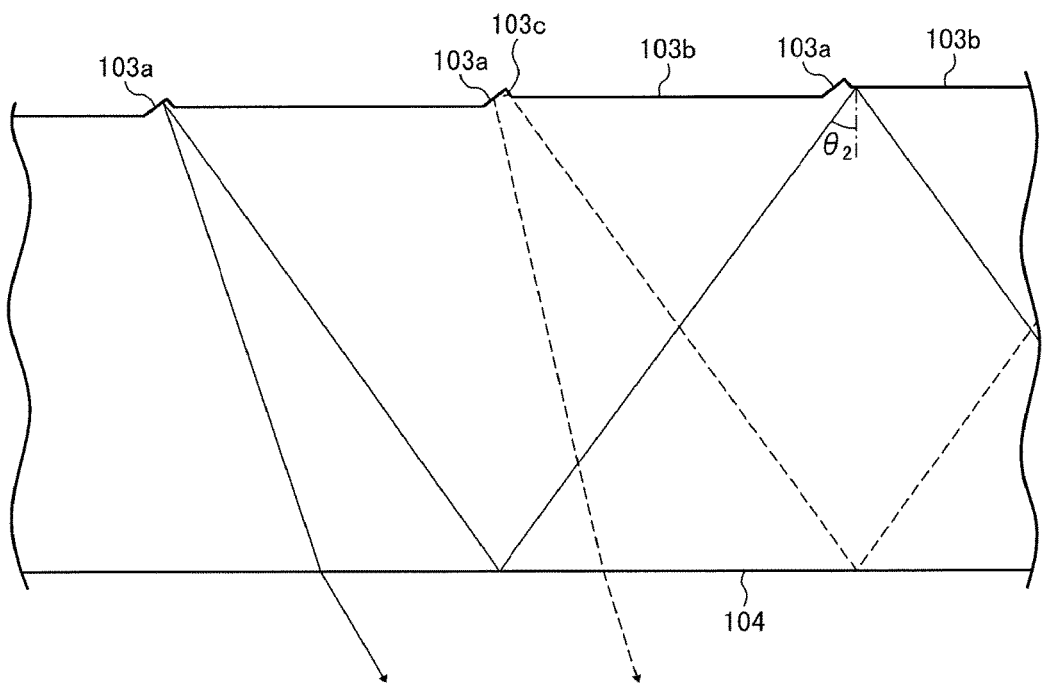
FIG. 26 is an enlarged view of image light that is reflected within the light-guide member after being reflected by the retroreflection portion.

FIG. 26 is an illustration of a case in which a part of the image light having been reflected by the retroreflection portion 106 hits the third surface 103c of the extraction portion 103 and becomes stray light. FIG. 26 represents the normal line with respect to the second surface 103b as indicated by a dot-and-dash line and the reflection angle θ2 with reference to the normal line.

As described above, the image light advancing forward the retroreflection portion 106 reaches and is reflected by the retroreflection portion 106, thereby reversing the direction of travel. The image light reversed by the retroreflection portion 106 is preferably reflected by the first surface 103a having the inclined angle θa in the extraction portion 103 to exit through the exit portion 104 and enter the eyes of a user. In FIG. 26, the solid line represents the regular light. FIG. 26 represents the case in which a part of the image light having been reflected by the retroreflection portion 106 is totally reflected by the second surface 103b and the exit portion 104 at the angle θ2 and is reflected by the first surface 103a so that the reflected image light exit through the exit portion 104. As indicated by the dotted line in FIG. 26, the image light having been reflected by the retroreflection portion 106 hits the third surface 103c before the first surface 103a, thereby changing the angle θ2. As a result, light-ray information, i.e., angles of image light, and position information cannot be stored so that the image light becomes stray light.

A description is given below of conditions for preventing the occurrence of the above-described stray light.

Figure 27:
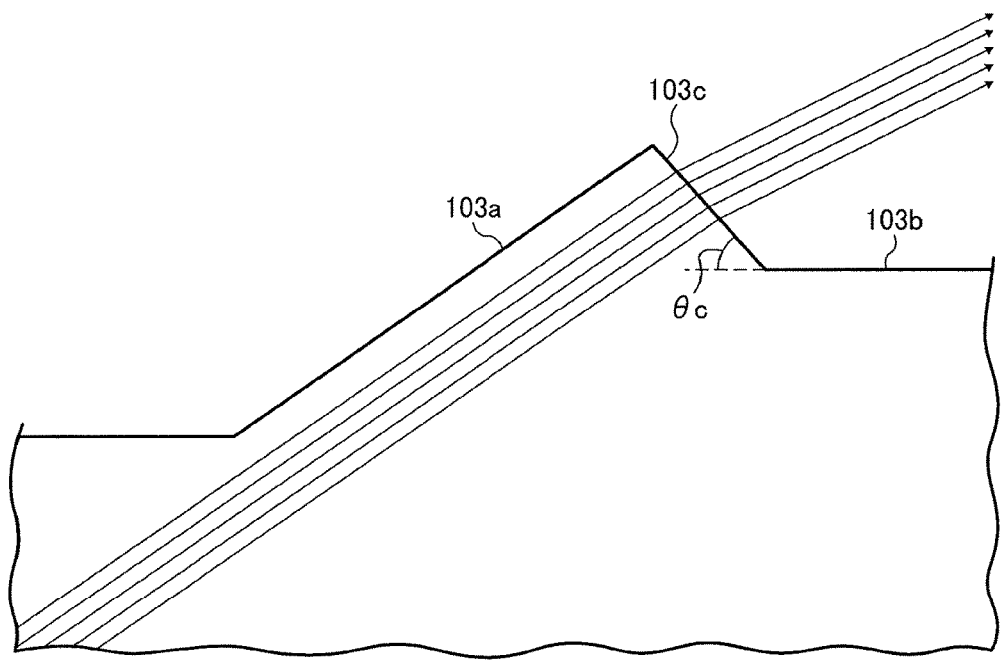
FIG. 27 is an illustration of a light guide and a virtual display device according to an embodiment and Example 3 of the present disclosure, and an enlarged plan view of image light that is reflected within the light-guide member before reaching the retroreflection portion.

FIG. 27 is an illustration of a case in which a light ray of the image light traveling toward the retroreflection portion 106 hits the third surface 103c of the extraction portion 103 and exits out of the light-guide member 100 without being reflected within the light-guide member 100. In FIG. 27, a plane that is parallel to the exit portion 104 is represented by a dotted line. As illustrated in FIG. 27, the image light traveling through the light-guide member 100 toward the retroreflection portion 106 hits the third surface 103c instead of the second surface 103b, and exits out of the light-guide member 100 according to the degree of the inclination of the third surface 103c. More specifically, with the third surface 103c having an inclination angle θc within a predetermined range, the third surface 103c serves as a transparent plane instead of a reflection plane, to allow all the light rays that hits the third surface 103c to be transmitted through the third surface 103c. Such a configuration successfully prevents the occurrence of stray light.

To allow the light rays of the image light traveling toward the retroreflection portion 106 that have impinged on the third surface 103c of the extraction portion 103 to exit the light-guide member 100 through the third surface 103c, the following conditional formulas (1) and (2) are preferably satisfied:

$$\theta a < 90 - \theta 1, \text{ and} \tag{1}$$

$$|90 - \theta c - \theta 1| < \sin^{-1}(1/n). \tag{2}$$

In conditional formulas (1) and (2), θa denotes the inclination angle of the first surface 103a relative to the exit portion 104, and θc denotes the inclination angle of the third surface 103c relative to the exit portion 104. Further, θ1 and |θ1| denote the reflection angle of a light ray relative to the exit portion 104 and the second surface 103b, and the light ray is guided to travel through the light-guide member 100 before reaching the retroreflection portion 106 to be reflected thereby (refer to FIGS. 20 and 24). Further, n is the reflective index of the light-guide member 100 in conditional formula (2). The above-described symbols refer to the same meanings in conditional formulas (3) and (4) to be descried below.

That is, the inclination angle θc is set to satisfy the above-described conditional formulas (1) and (2), thereby allowing some light rays of the image light traveling toward the retroreflection portion 106 that have hit the third surface 103c to exit the light-guide member 100 through the third surface 103c as illustrated in FIG. 27. Satisfying conditional formulas (1) and (2) allows preventing the occurrence of stray light caused by the image light that travels toward the retroreflection portion 106 striking on the third surface 103c.

Figure 28:
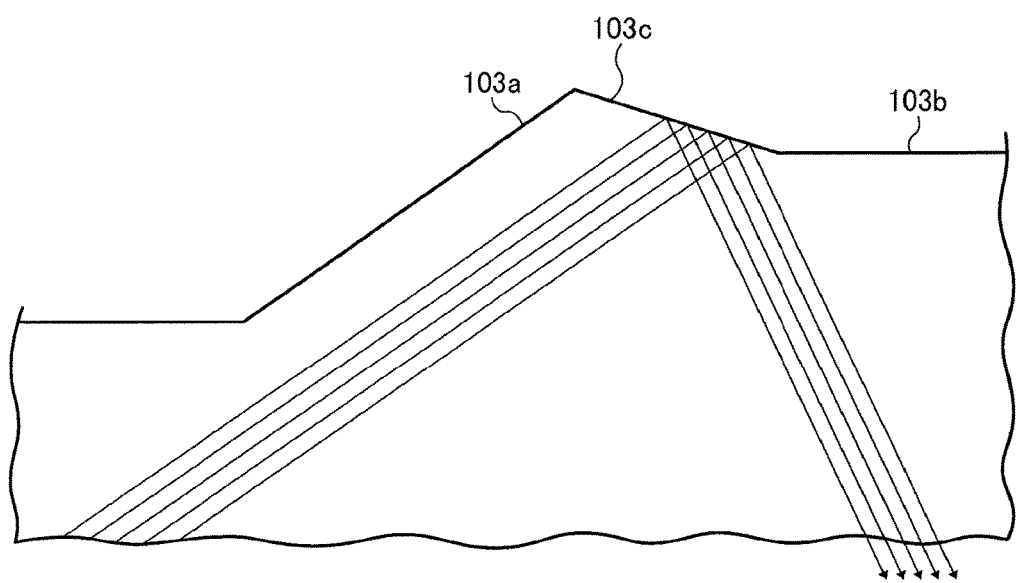
FIG. 28 is an illustration of a light guide and a virtual display device according to a comparative example of the present disclosure, and an enlarged plan view of image light that is reflected within the light-guide member before reaching the retroreflection portion.

FIG. 28 represents the optical paths of the image light when the inclination angle θc of the third surface 103c relative to the exit portion 104 satisfies conditional formula (1) and fails to satisfy conditional formula (2). FIG. 28 is an illustration of a case in which the inclination angle θc is relatively small, i.e., the third surface 103c is gently inclined. In this case, the light rays that have hit the third surface 103c of the extraction portion 103 travel forward with a different reflection angle relative to the incident upon 104 and the second surface 103b from the angle θ1. Thus, the light rays exit through the exit portion 104 before reaching, i.e., the retroreflection portion 106, thereby creating stray light that is locally strong in an image, resulting in degradation in image.

Figure 29:
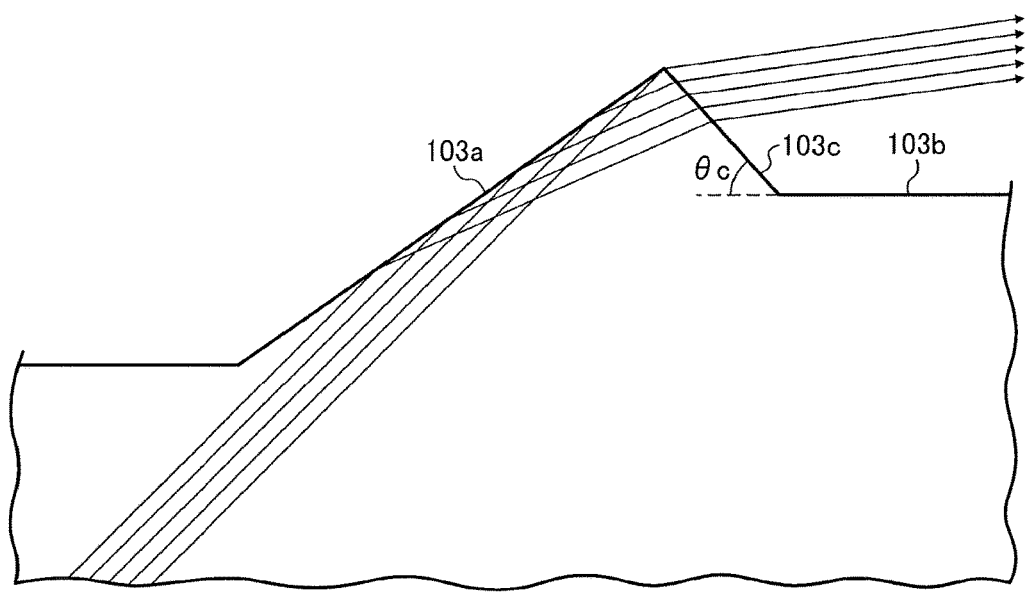
FIG. 29 is an illustration of a light guide and a virtual display device according to an embodiment and Example 4 of the present disclosure, and an enlarged plan view of image light that is reflected within the light-guide member before reaching the retroreflection portion.

FIG. 29 is an illustration of a case in which some light rays of image light traveling toward the retroreflection portion 106 hits the third surface 103c immediately after striking the first surface 103a of the extraction portion 103, so that the light rays go out of the light-guide member 100 instead of being reflected by the light-guide member 100. As illustrated in FIG. 29, even when the image light traveling through the light-guide member 100 toward the retroreflection portion 106 is reflected by the first surface 103a before striking the third surface 103c, the light guide exits out of the light-guide member 100 according to the degree of the inclination of the third surface 103c. More specifically, with the third surface 103c having an inclination angle θc within a predetermined range, the third surface 103c serves as a transparent plane relative to the light rays having hit the first surface 103a and the third surface 103c, to allow all the light rays that strike the third surface 103c to be transmitted through the third surface 103c. Such a configuration also successfully prevents the occurrence of stray light.

With conditional formula (1) and the following conditional formula (3) preferably satisfied, the light rays of the image light traveling toward the retroreflection portion 106 that is reflected by the first surface 103a before striking the third surface 103c successfully go out of the third surface 103c to the outside.

$$|180 - 2\theta c - \theta 1| < \sin^{-1}(1/n). \tag{3}$$

That is, the inclination angle θc is set to satisfy the above-described conditional formulas (1) and (3), thereby allowing some light rays of the image light traveling toward the retroreflection portion 106 that have hit the first surface 103a and the third surface 103c to exit the light-guide member 100 through the third surface 103c. Satisfying conditional formulas (1) and (3) allows preventing the occurrence of stray light caused by the image light that travels toward the retroreflection portion 106 striking on the third surface 103c.

Figure 30:
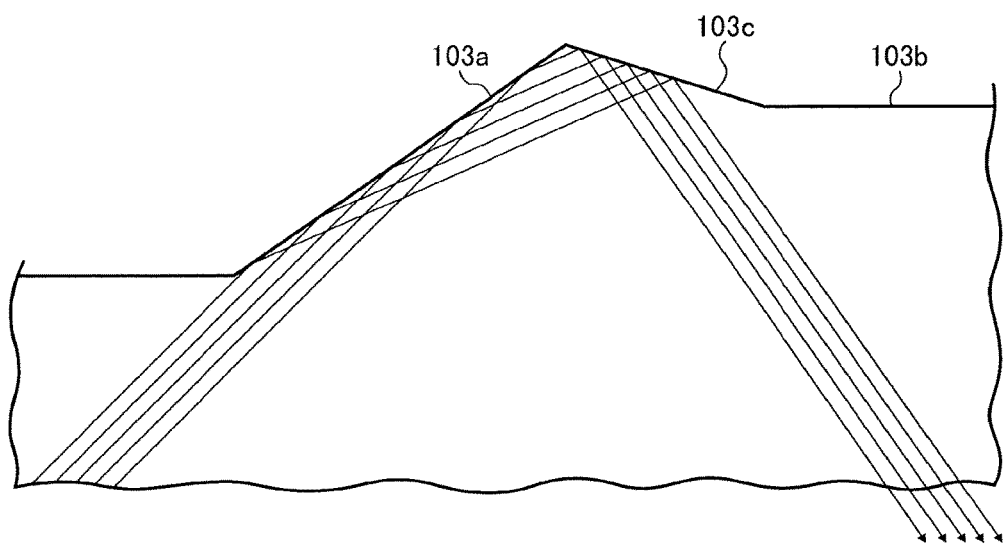
FIG. 30 is an illustration of a light guide and a virtual display device according to a comparative example of the present disclosure, and an enlarged plan view of image light that is reflected within the light-guide member before reaching the retroreflection portion.

FIG. 30 represents the optical paths of the image light when the inclination angle θc of the third surface 103c relative to the exit portion 104 satisfies conditional formula (1) and fails to satisfy conditional formula (3). FIG. 30 is an illustration of a case in which the inclination angle θc is relatively small, i.e., the third surface 103c is gently inclined. In this case, the light rays that have hit the first surface 103a and the third surface 103c of the extraction portion 103 travel forward with a different reflection angle relative to the incident upon 104 and the second surface 103b from the angle θ1. Thus, the light rays exit through the exit portion 104 before reaching, i.e., the retroreflection portion 106, thereby creating strong stray light that is locally strong in an image, resulting in degradation in image.

Figure 31:
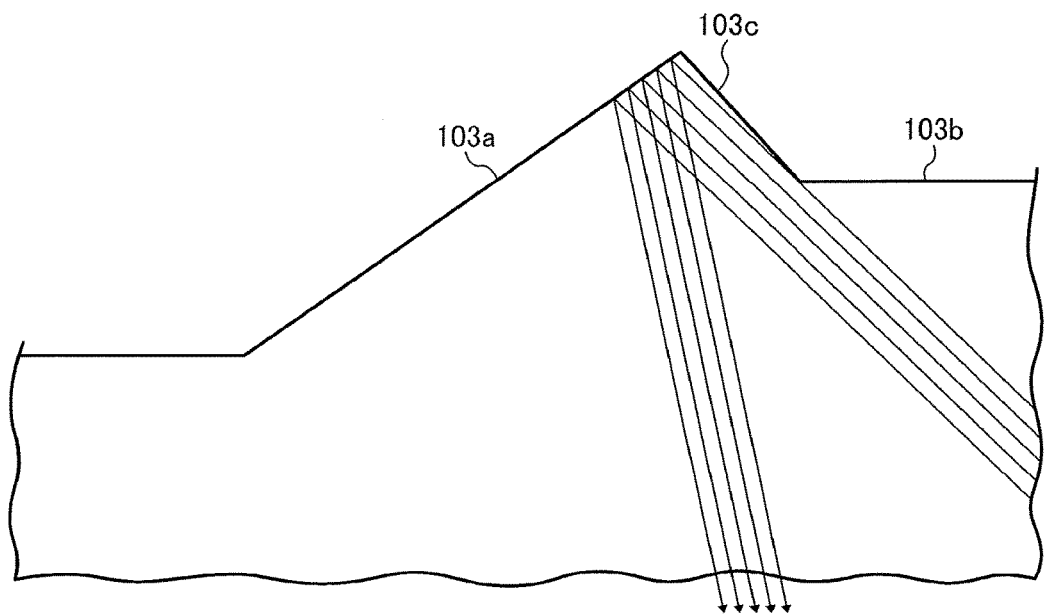
FIG. 31 is an illustration of a light guide and a virtual display device according to an embodiment and Example 5 of the present disclosure, and an enlarged plan view of image light that is reflected within the light-guide member after being reflected by the retroreflection portion.

FIG. 31 is an illustration of a case in which a part of the image light reversed by the retroreflection portion 106 hits the first surface 103a instead of the third surface 103c of the extraction portion 103. The following conditional formula (4) is preferably satisfied, thereby allowing the image light that has been reflected by the retroreflection portion 106 to strike the first surface 103a instead of the third surface 103c.

$$\theta c > 90 - \theta 2. \tag{4}$$

In conditional formula (4), θ2 denote the reflection angle of a light ray relative to the exit portion 104 and the second surface 103b, the light ray that is reflected by the retroreflection portion 106 and guided to travel through the light-guide member 100 (refer to FIGS. 20 and 26).

Thus, the inclination angle θc of the third surface 103c is preferably set to satisfy the following conditional formula (4), thereby allowing the image light that has been reflected by the retroreflection portion 106 to strike the first surface 103a instead of the third surface 103c. Satisfying conditional formulas (1) and (2) allows preventing the occurrence of stray light caused by the image light that travels toward the retroreflection portion 106 striking on the third surface 103c.

Figure 32:
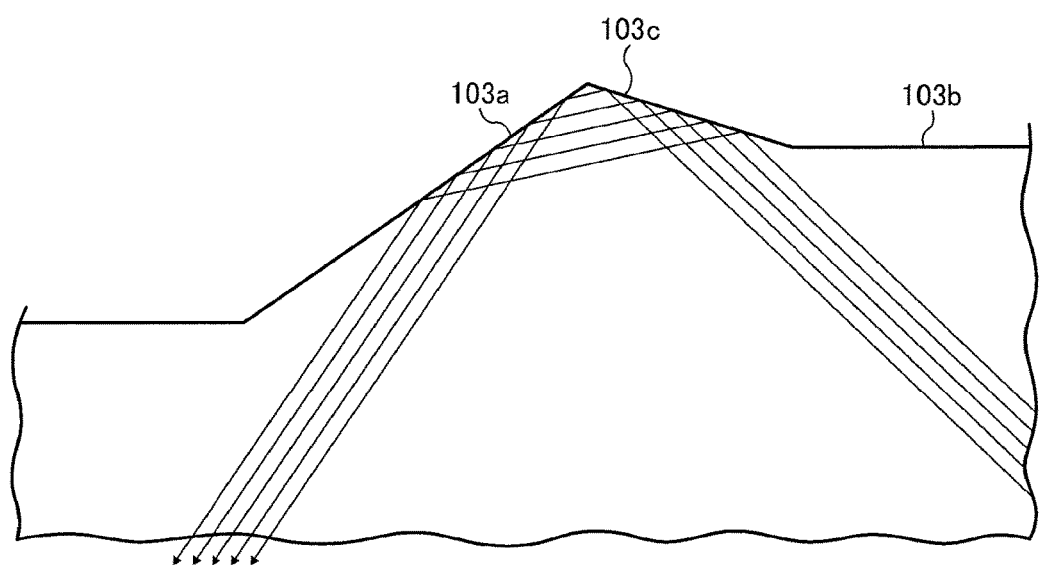
FIG. 32 is an illustration of a light guide and a virtual display device according to a comparative example of the present disclosure, and an enlarged plan view of image light that is reflected within the light-guide member after being reflected by the retroreflection portion.

FIG. 30 represents the optical paths of the image light when the inclination angle θc of the third surface 103c relative to the exit portion 104 fails to satisfy conditional formula (4). FIG. 32 is an illustration of a case in which the inclination angle θc is relatively small, i.e., the third surface 103c is gently inclined. In this case, the image light reversed by the retroreflection portion 106 strikes the third surface 103c of the extraction portion 103 to be totally reflected thereby, and the reflected image light is then totally reflected by the first surface 103a. This creates stray light that is locally strong.

Second Embodiment

Figure 33:
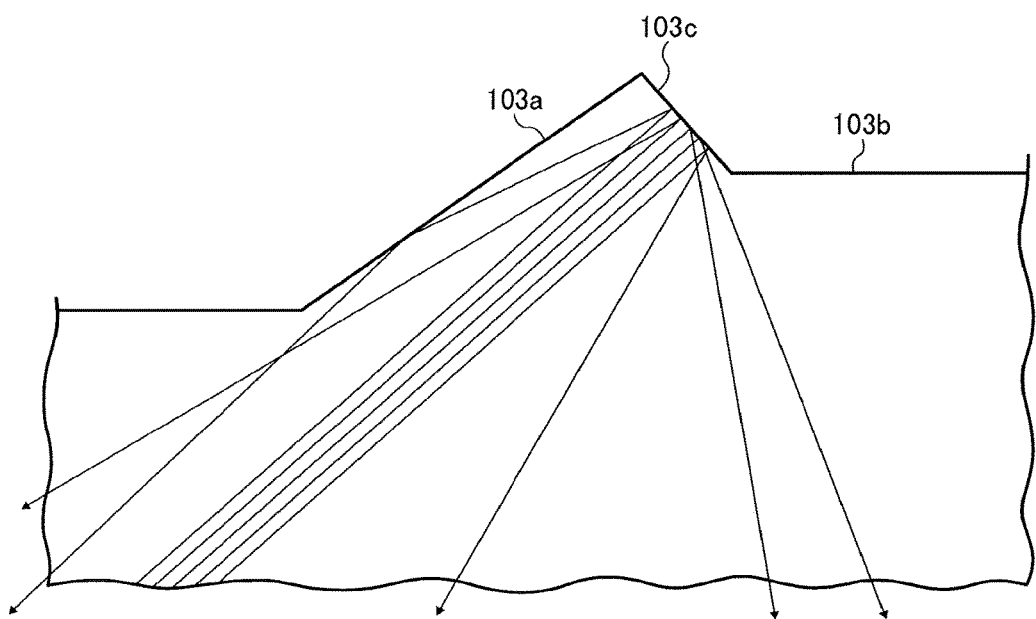
FIG. 33 is an illustration of a light guide and a virtual display device according to another embodiment and Example 5 of the present disclosure, and an enlarged plan view of image light that is reflected within the light-guide member before reaching the retroreflection portion.

In the above-described embodiment, the cases in which the third surface 103c of the extraction portion 103 is a smooth or mirror surface is described. In the second embodiment, the cases in which the third surface 103c of the extraction portion 103 is a scattering surface that scatters and reflects projected light thereon is described. FIG. 33 represents optical paths of image light that is scattered by the third surface 103c of the extraction portion 103 that is a scattering surface according to the second embodiment.

In the case as illustrated in FIGS. 24 through 26, the image light guided to pass through the light-guide member 100 hits the third surface 103c to be reflected toward the inside of the light-guide member 100 at the angle that is different from that of the normal light indicated by the solid line, resulting in stray light. More specifically, when the third surface 103c of the extraction portion 103 is a mirror surface, the angles of reflection of all the light rays that constitute the image light to strike the third surface 103c are equal to each other in accordance with the law of reflection. That is, according to the law of reflection, the angle of reflection of reflected light is equal to its angle of incidence. Accordingly, the image light hits the third surface 103c as a mirror surface and is reflected toward the inside of the light-guide member 100, thereby creating stray light that is locally strong in an image, resulting in degradation in image.

When the third surface 103c of the extraction portion 103 is a scattering surface, all the light rays of the image light that strikes the third surface 103c are scattered and reflected by the scattering surface, i.e., reflected to different directions at different angles, as illustrated in FIG. 33. In such a case, no stray light that is locally strong are created in an image, thus reducing degradation in image.

FIG. 33 is an illustration of a case in which image light traveling toward the retroreflection portion 106 directly strikes the third surface 103c as a scattering surface before reaching the retroreflection portion 106. With the third surface 103c as a scattering surface, when the image light traveling toward the retroreflection portion 106 hits the first surface 103a and the third surface 103c before reaching the retroreflection portion 106, the image light is scattered by the third surface 103c. Further, when the image light is reflected by the retroreflection portion 106 and hits the third surface 103c as a scattering surface, the image light is also scattered by the third surface 103c. That is, the third surface 103c being a scattering surface obtains the same effects in both of the above-described cases. Accordingly, the third surface 103c is a scattering surface, thereby allowing the light rays that impinge on the third surface 103c to be scattered and reflected by the third surface 103c, thus reducing degradation in image. The light rays are part of the image light that is guided to travel through the light-guide member 100.

In such a configuration in which the third surface 103c is a scattering surface, some of a plurality of third surfaces 103c in the extraction portion 103 may be scattering surfaces. Alternatively, all of the third surfaces 103c may be scattering surfaces.

Third Embodiment

Figure 34:
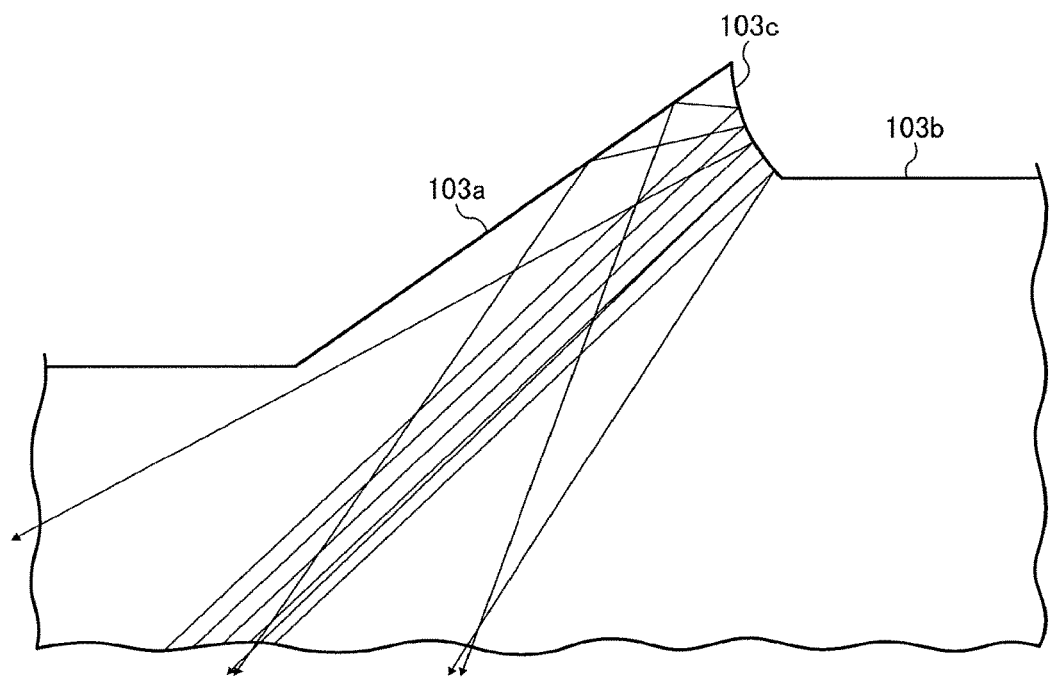
FIG. 34 is an illustration of a light guide and a virtual display device according to another embodiment and Example 6 of the present disclosure, and an enlarged plan view of image light that is reflected within the light-guide member before reaching the retroreflection portion.

FIG. 34 is a schematic view of the configuration of an extraction portion 103 with a third surface 103 having a curved surface according to the third embodiment, illustrating the optical paths of image light. The third surface 103c of the extraction portion 103 is a curved surface instead of a planar surface, thereby preventing all the light rays of the image light that strikes the third surface 103c from being reflected in the identical direction. This configuration prevents the occurrence of stray light that is locally strong in an image, thus successfully reducing the degradation in image.

The third surface 103c, which is curved, preferably has a concave surface facing outward of the light-guide member 100. In the present embodiment, the third surface 103c has a convex surface facing inward of the light-guide member 100. The light rays of image light that impinge on the third surface 103c according to the present embodiment scatter, thereby preventing the local occurrence of stray light. The third surface 103c, which is curved, preferably has a smaller curvature to increase the degree of scattering of light rays that impinge on the third surface 103c, which undesirably makes a trade-off between quality and ease of manufacture.

In the embodiment of FIG. 34, the cases in which the third surface 103c is spherical are described. When the third surface 103c is curved as another example, the curved surface of the third surface 103c may be aspherical or free-form surface.

In the above-described embodiments, a description is given of the example in which the incidence portion 101 is disposed on the left of an observer of a virtual image, allowing light image to enter the light-guide member 100 from the left as seen from the observer. When the incidence portion 101 is disposed on the opposite side, i.e., on the right of the observer, allowing the image light to enter the light-guide member 100 from the right side as seen from the observer, the same advantageous effects are obtained as described above.

FIGS. 20 and 21 represent one eye of an observer of a virtual image. However, no limitation is intended thereby. The light guide 50 allows an observer to view an emitted image with both eyes. Alternatively, in some embodiments, a compact light guide 50 is provided as a monocular light guide.

In the embodiments of the present disclosure described above, the light guide 50 is applied to the spectacle HMD. Alternatively, in some embodiments, the light guide 50 may be applied to other types of HMDs. Alternatively, in some embodiments, the light guide 50 may be applied to a head up display (HUD). The light guide 50 is suitable for displaying a virtual image of an original image formed by the light rays optically modulated by a micro device.

The configurations according to the above-described embodiments provide a thin light guide for use in a virtual image display device that sufficiently obtains a wide viewing angle, particularly a viewing angle in the vertical direction while preventing the occurrence of stray light.

Examples and Comparative Examples of Virtual Image Display Device

The following describes Examples and Comparative Examples of a virtual image display device, referring to FIGS. 27 through 34. In the following examples, a collimator lens has a focal length of 7.5 mm, and a light guide is made of plastic with a refractive index (Nd) of 1.53. In the light guide 50 (50A), the first surface has an angle θa of 3.15 degrees, those are the common conditions.

As the common conditions, the light guide 50 is produced to have the following size.

Thickness of the light guide: a thinnest part is 1 mm, a thickest part is 1.9 mm, a longitudinal length is 46 mm, and a width is 33 mm.

Further, all the light guides according to the following Examples emits image light having an eye relief of greater than or equal to 15 mm, and an eye box of greater than or equal to 5 mm, while obtaining a horizontal viewing angle of 50 degrees and a vertical viewing angle of 27 degrees.

In the following Examples, a light guide 50 is prepared that includes a third surface 103c with an angle θc of 45 degrees and satisfies the above-described conditional formula (2). However, in the following comparative examples, a light guide is prepared that includes a third surface 103c with an angle θc of 15 degrees and fails to satisfy the above-described conditional formula (2). In the following examples, the tests were performed under various conditions by using the prepared light guide that includes an image display device incorporating the image display element 10 and the collimator optical system 300.

Example 3

In Example 3, the test was performed with the position of the collimator optical system 300 adjusted to allow the image light traveling toward the retroreflection portion 106 to impinge on the third surface 103c not on the first surface 103a before reaching the retroreflection portion 106.

As a result, some light rays of the image light impinge on the third surface 103c, and all the light rays exit through the third surface 103c, thereby preventing the occurrence of stray light. The light guide according to Example 3 satisfies the above-described conditional formula (2) to successfully obtain a vertical viewing angle and eliminate or reduce stray light.

Comparative Example 1

In Comparative Example 1, the test was performed with the position of the collimator optical system 300 adjusted to allow the image light traveling toward the retroreflection portion 106 to impinge on the third surface 103c not on the first surface 103a before reaching the retroreflection portion 106, in the same manner as Example 3 does.

As a result, a part of image light traveling toward the retroreflection portion 106 is reflected from the third surface 103c toward the inside of the light guide, which causes the occurrence of stray light, as illustrated in FIG. 28. The light guide according to Comparative Example 1 obtains a vertical viewing angle, failing to eliminate or reduce the occurrence of stray light.

Example 4

In Example 4, the test was performed by using the same light guide as the above-described Example 3 does. In the light guide used in Example 4, the position of the collimator optical system 300 is adjusted and a different type of lens is used to allow a part of image light to impinge on the first surface 103a before reaching the retroreflection portion 106.

As a result, a part of the image light is reflected by the first surface 103a before reaching the retroreflection portion 106, and subsequently hits the third surface 103c to exit through the third surface 103c, as illustrated in FIG. 29. This successfully prevents the occurrence of stray light. The light guide according to Example 4 satisfies the above-described conditional formula (3) to successfully obtain a vertical viewing angle and eliminate or reduce stray light.

Comparative Example 2

In Comparative Example 2, the test was performed by using the same light guide as the above-described Comparative Example 1 does. In the light guide used in Comparative Example 2, the position of the collimator optical system 300 is adjusted and a different type of lens is used to allow a part of image light to impinge on the first surface 103a before reaching the retroreflection portion 106 in the same manner as Example 4 does.

As a result, a part of image light traveling toward the retroreflection portion 106 is reflected by the third surface 103c before reaching the retroreflection portion 106, and subsequently impinges on the third surface 103c to be reflected from the third surface 103c toward the inside of the light guide, as illustrated in FIG. 30. This causes the occurrence of stray light. The light guide according to Comparative Example 2 obtains a vertical viewing angle although stray light easily occurs.

Example 5

In Example 5, the test was performed using the same light guide as in Example 3, with the position of the collimator optical system 300 adjusted to allow the image light traveling toward the retroreflection portion 106 to impinge on the third surface 103c not on the first surface 103a before reaching the retroreflection portion 106.

As a result, some light rays of the image light reflected by the retroreflection portion 106 is reflected by the first surface 103a and guided to the exit portion 104 with a favorable angle, so that all the light rays exit through the exit portion to the outside as illustrated in FIG. 31. Thus, the occurrence of stray light is prevented. The light guide according to Example 5 satisfies the above-described conditional formula (4) to successfully eliminate or reduce stray light, and obtain a vertical viewing angle.

Comparative Example 3

In Comparative Example 3, the test was performed by using the same light guide as the above-described Comparative Example 1 does. The light guide used in Comparative Example 3 includes the collimator optical system 300 that is positioned in the same manner as Example 3 does.

As a result, a part of the image light reflected by the retroreflection portion 106 impinges on the third surface 103c, and then the image light reflected by the third surface 103c hits the first surface 103a. Subsequently, the image light reflected by the first surface 103a reaches the exit portion 104 at an unfavorable incident angle, so that the image light is totally reflected by the exit portion 104, i.e., the image light fails to exit through the exit portion 104 to the outside, resulting in the occurrence of stray light. The light guide according to Comparative Example 3 obtains a vertical viewing angle, failing to eliminate or reduce the occurrence of stray light.

Example 6

In Example 6, a light guide where the third surface 103c is rough, i.e., a scattering surface is used. In Example 6, the test was performed with the position of the collimator optical system 300 adjusted to allow the image light traveling toward the retroreflection portion 106 to impinge on the third surface 103c not on the first surface 103a before reaching the retroreflection portion 106, in the same manner as Example 3 does.

As a result, a part of image light traveling toward the retroreflection portion 106 is reflected from the third surface 103c toward the inside of the light guide, as illustrated in FIG. 33. In Example 6, a part of image light that has been scattered and reflected from the third surface 103c toward the inside of the light guide generates a slight amount of stray light as compared to Comparative Example 1 (refer to FIG. 28), and generates a successful virtual image that is visually identified by an observer. The light guide according to Example 6 successfully obtains a vertical viewing angle and eliminates or reduces stray light.

Example 7

In Example 7, a light guide where the third surface 103c is curved not planar, i.e., the third surface 103c has a concave surface facing outward of the light guide is used. In Example 7, the test was performed with the position of the collimator optical system 300 adjusted to allow the image light traveling toward the retroreflection portion 106 to impinge on the third surface 103c not on the first surface 103a before reaching the retroreflection portion 106, in the same manner as Example 3 does.

As a result, a part of image light traveling toward the retroreflection portion 106 is reflected from the third surface 103c toward the inside of the light guide, as illustrated in FIG. 34. In Example 7, a part of image light that has been diverged and reflected from the third surface 103c toward the inside of the light guide generates a slight amount of stray light as compared to Comparative Example 1 (refer to FIG. 28), and generates a successful virtual image that is visually identified. The light guide according to Example 7 successfully obtains a vertical viewing angle and eliminates or reduces stray light.

The configurations according to the embodiments and Examples described above provide a thin light guide for use in a virtual image display device that sufficiently obtains a wide viewing angle of greater than or equal to 40 degrees, particularly a viewing angle in the vertical direction while preventing the occurrence of stray light.

A description is provided of embodiments according to the present disclosure, referring to the drawings. The following embodiments of the present disclosure relate to a light guide unit including two transmissive light guides, a virtual image optical system including the light guide unit and a virtual display device VD including the virtual image optical system.

Figure 35:
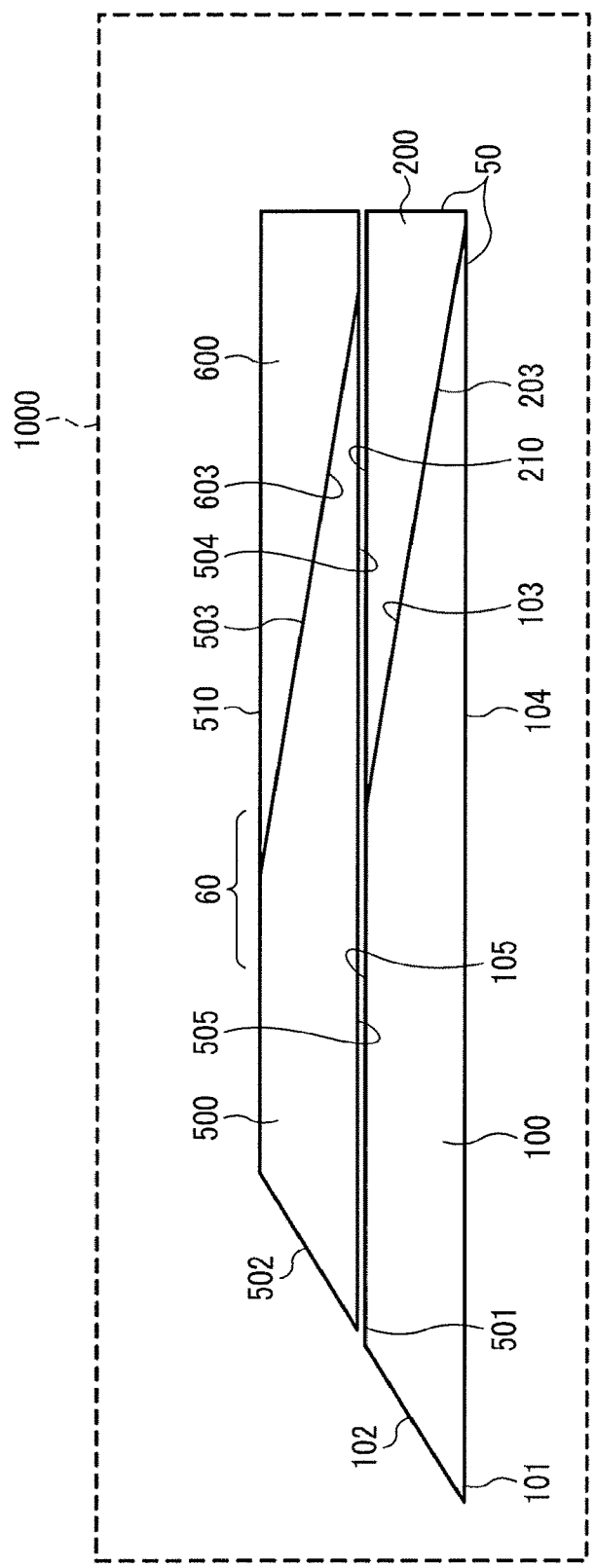
FIG. 35 is a plan view of a light guide unit according to an embodiment of the present disclosure.
Figure 36:
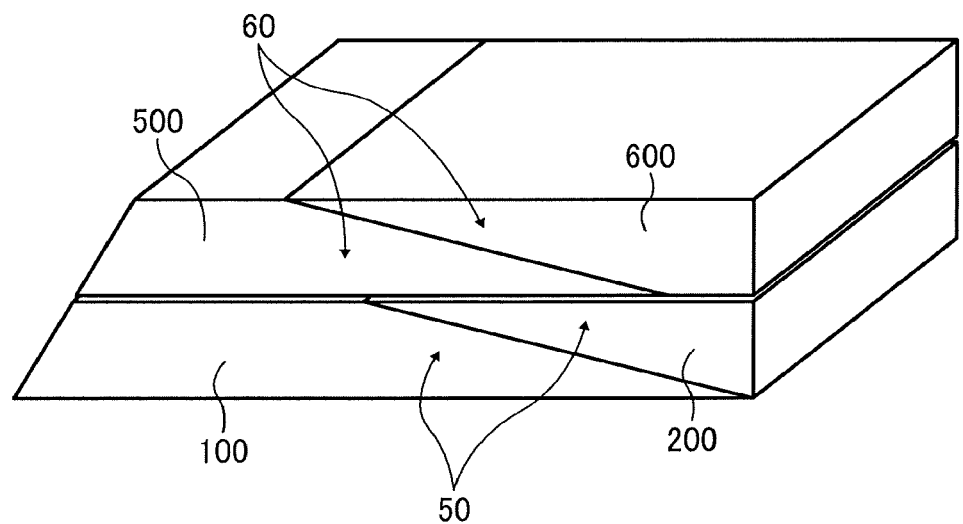
FIG. 36 is a perspective view of the light guide unit of FIG. 35.

As illustrated in FIGS. 35 and 36, a light guide unit 1000 for used in a virtual display device VD according to the present embodiment includes a first light guide 50 and a second light guide 60 which are disposed adjacent to each other to be integrated with each other. Hereinafter, rear faces of the light guides 50 and 60, respectively are closer to the observer (the lower sides of the light guides 50 and 60 in FIGS. 35 through 46) than front faces of the light guides 50 and 60 that are away from the observer (the upper surfaces of the light guides 50 and 60 in FIGS. 35 through 46).

In the light guide unit 1000 according to the present embodiment, the front face 105 of the first light guide 50 and the rear face 505 of the second light guide 60 are adjacent to each other. The front face 105 and the rear face 505 are bonded to each other with an air layer interposed between the front face 105 and the rear face 505 so that two light guides 50 and 60 are integrated with each other. In the light guide unit 1000 according to another embodiment in which the front face 105 of the first light guide 50 and the rear face 505 of the second light guide 60 are bonded to each other. The peripheral edges of the front face 105 and the rear face 505 are fixed to each other with adhesive between the peripheral edges.

The first light guide 50 includes a light-guide member 100 and an optical member 200. The light-guide member 100 guides image light that is emitted from a virtual image optical system including an image display element and an optical lens, into the interior of the light-guide member 100. The light-guide member 100 further emits the image light to the outside, i.e., toward the eyes of an observer, to display a virtual image. The optical member 200 is integrated with the light-guide member 100. The second light guide 60 also includes a light-guide member 500 and an optical member 600. The light-guide member 500 guides image light into the interior of the light-guide member 500, and emits the image light to the outside to display a virtual image. The optical member 600 is integrated with the light-guide member 500.

The light-guide member 100 and the optical member 200 of the first light guide 50 have an equivalent optical function for that of the light-guide member 500 and the optical member 600 of the second light guide 60. Thus, the same description of the light-guide member 100 and the optical member 200 of the first light guide 50 applies to the light-guide member 500 and the optical member 600 of the second light guide 60 unless otherwise specified.

The light-guide member 100 includes an incidence portion 101, a reflective portion 102, an extraction portion 103, and an exit portion 104. The incidence portion 101 allows image light coming from an optical system to enter the incidence portion 101. The reflective portion 102 reflects and guides the image light having entered the incidence portion 101 into the light-guide member 100. The extraction portion 103 extracts the guided image light and the exit portion 104 emits the image light to the outside. Similarly, the light-guide member 500 of the second light guide 60 includes an incidence portion 501, a reflective portion 502, an extraction portion 503, and an exit portion 504. The incidence portion 501 allows image light coming from an optical system to enter the incidence portion 501. The reflective portion 502 reflects and guides the image light having entered the incidence portion 501 into the light-guide member 500. The extraction portion 503 extracts the guided image light and the exit portion 504 emits the image light to the outside of the second light guide 60. The second light guide 60 differs from the first light guide 50 in that the second light guide 60 allows the image light emitted from the optical system to enter the second light guide 60 through the first light guide 50, and extracts the image light having been guided through the second light guide 60, allowing the image light to exit to the outside of the second light guide 60 through the first light guide 50.

The following describes the configuration of each part of the first light guide 50 and the differences between the first light guide 50 and the second light guide 60. In this case, the description of the second light guide 60 where each part has the same function as in the first light guide 50 is omitted.

The light-guide member 100 has a trapezoidal shape in a planar view. In the light-guide member 100 according to the present embodiment, the rear face of the first light guide 50 on which the incidence portion 101 and the exit portion 104 are disposed and the front face 105 that is opposed to the rear face are both planar surfaces. The front face 105 and the rear face are parallel with each other. The extraction portion 103 is inclined relative to the exit portion 104 and the rear face of the first light guide 50. The extraction portion 103 is continuous from the rear face to the front face 105 that is parallel with the rear face. The reflective portion 102 is a plane that is disposed on the side of the front face of the light-guide member 100 and is continuous to the rear face of the incidence portion 101 and the light-guide guide member 100. The reflective portion 102 is inclined relative to the incidence portion 101 and the rear face.

The incidence portion 101 and the exit portion 104 are disposed on the rear face of the light-guide member 100. That is, the incidence portion 101 and the exit portion 104 are disposed on the identical plane. The incidence portion 101 and the exit portion 104 constitute the rear face. Such a configuration increases the productivity of the light-guide member 100 and the light guide 50, allowing a simple structure of the light-guide member 100 and the light guide 50 as a whole.

With the light-guide member 100 of the first light guide 50, a part of image light emitted from the optical system to be described below enters the incidence portion 101, and is reflected by the reflective portion 102 to be guided into the light-guide member 100. The light-guide member 100 further serves to allow a part of the remaining image light to pass through the front face 105 and advance to the light-guide member 500 of the second light guide 60 (refer to FIG. 41). Accordingly, the bundle of light rays of image light that is emitted from the optical system is wider in the width direction (the horizontal direction in FIG. 35) than that of the reflective portion 102.

Preferably, the light-guide member 100 of the light guide 50 is made of high light-transmissive material to ensure the see-through characteristics. More preferably, the light-guide member 100 is made of resin so that the extraction portion 103 is subjected to machining.

Figure 37:
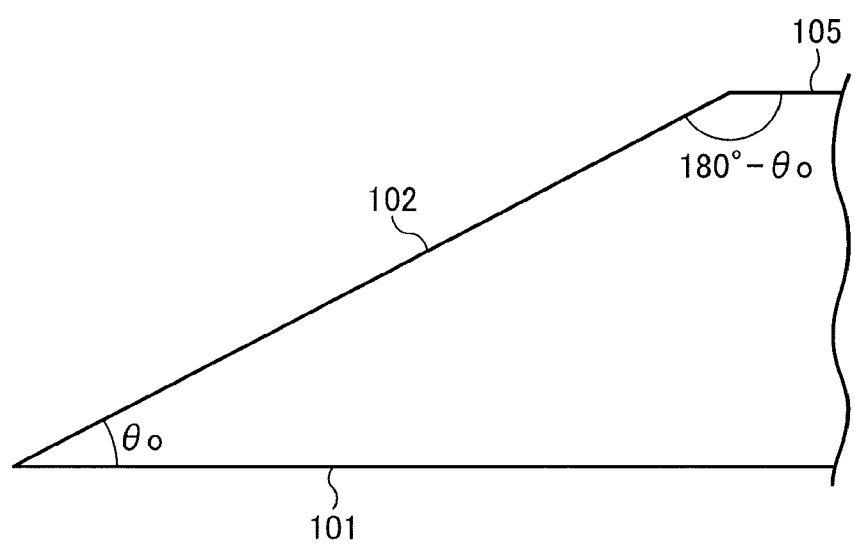
FIG. 37 is an enlarged view of an incidence portion and a reflective portion in each light guide of the light guide unit of FIG. 35 according to an embodiment of the present disclosure.

As illustrated in FIG. 37, the reflective portion 102 of the light-guide member 100 is inclined relative to the incidence portion 101 at an angle $\theta 0$ to reflect and guide the image light having entered the incident portion 101 into the light-guide member 100. With such an angle of $\theta 0$ degrees formed by the reflective portion 102 and the incidence portion 101, the reflective portion 102 totally reflects the image light having entered the incident portion 101. Preferably, the angle $\theta 0$ ranges from 15 through 75 degrees to successfully guide the image light into the light-guide member 100. As illustrated in FIG. 5, the extraction portion 103 includes a plurality of first surface 103a and a plurality of second surface 103b. Each of the first surfaces 103a and the exit portion 104 form an angle of $\theta a$ degrees. To obtain a suitable range of the angle $\theta a$, the angle $\theta 0$ preferably ranges from 20 through 35 degrees, and more preferably from 20 through 30 degrees.

Any coating may be applied to the reflective portion 102. Preferably, a mirror coating with a high reflective index, such as aluminum, silver, or dielectric material coating, is applied to the reflective portion 102 to guide the image data into the light-guide member 100 in some embodiments.

According to the present embodiment, the extraction portion 103 of the light-guide member 100 reflects the guided image light toward the exit portion 104. The exit portion 104 emits the image light reflected from the extraction portion 103 toward the eyes of the observer of a virtual image.

Figure 38:
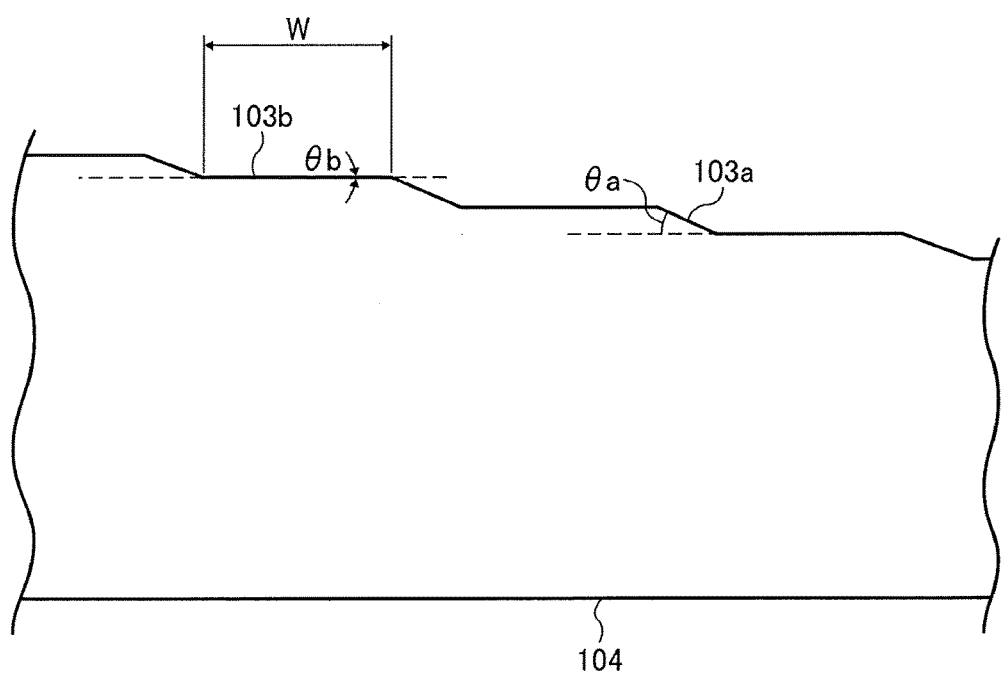
FIG. 38 is an enlarged plan view of an extraction portion and an exit portion of each light-guide member.

As illustrated in FIG. 38, in the extraction portion 103 according to the present embodiment, each of the first surfaces 103a (hereinafter, each of the first surface 103a is referred to simply as a "first surface 103a" and the same applies to the second surface 103b) and the exit portion 104 form the angle $\theta a$ as described above. Each of the second surface 103b and the exit portion 104 form an angle $\theta b$. The first surfaces 103a and the second surfaces 103b alternate to form a stepwise shape. FIG. 38 represents a reference plane parallel with the exit portion 104 indicated by dotted line and the lateral width w (herein after, referred to as "width") of the second surface 103b.

According to the present embodiment, the first surface 103a of the extraction portion 103 guides the light having entered and passes through the light-guide member 100 to the exit portion 104 so that the guided image light exit through the exit portion 104. The first surface 103a is a planar surface inclined relative to of the exit portion 104. The first surface 103a is inclined relative to the exit portion 104 in a direction opposite to the direction of inclination of the reflective portion 102 relative to the incidence portion 101. Preferably, the angle $\theta a$ of inclination of the first surface 103a relative to the exit portion 104 falls within the range of from 20 through 35 degrees, and more preferably from 20 through 30 degrees according to the refractive index of the material for the light-guide member 100. Even more preferably, the angle $\theta a$ is equal to the angle $\theta 0$ of inclination of the reflective portion 102 relative to the incidence portion 101. Such a configuration facilitates adjusting the arrangement of the collimator optical system 300.

According to the present embodiment of this disclosure, the second surface 103b serves as a reflection surface to reflect and guide the image light having entered the light-guide member 100 into the light-guide member 100. The second surface 103b is parallel with the exit portion 104. That is, the angle $\theta b$ is 0 degree. The second surface 103b also serves as a transparent surface to allow light externally coming through the front face and the rear face of the light guide 50 to pass through the light guide 50 to secure the see-through characteristics.

With the second surface 103b inclined relative to the exit portion 104 to form the angle $\theta b$ which is not 0 degree, the image light passing through the light-guide member 100 and reflected by the second surface 103b does not coincide the image light passing through the light-guide member 100 and reflected by the exit portion 104 due to the difference in reflection angle. In this case, the incidence angle θin defied by the light rays having enters through the incidence portion 101 and the normal relative to the incidence portion 101 is not equal to the exit angle θout defined by the light rays exiting through the exit portion 104 and the normal relative to the exit portion 104. Further, in such a case, the image light passes through the first surface 103a and exits the exit portion 104 to the outside in different directions, generating an unsuccessful virtual image. Thus, the second surface 103b according to the present embodiment of this disclosure is parallel with the exit portion 104, that is, the angle θb is 0 degree.

The width w of the second surface 103b of the extraction portion 103 of the light-guide member 100 satisfies the following condition: 0.5 mm<w<3.0 mm.

Hereinafter, a description is provided of the conditions for the width w of the second surface 103b.

As described above, the width of field of view that allows a virtual image to be sighted is referred to as "eye box". The distance from the exit portion 104 to the eye balls of a user (observer) to allow the user to sight a virtual image is referred to as "eye relief". The width w of the second surface 103b is defined by the following expression when the symbol "φ" is the diameter of the eye box, the symbol "L" is the eye relief, the symbol "tk" is the thickness of the light guide 50, and the symbol "n" is the number of the second surface 103b, which is parallel with the exit portion 104, within the extraction portion 103:

$$w=\{2 \tan \theta b(L+Tk)-tk/\tan \theta a+\varphi\}/(n-1).$$

In this case, with an increase in the width of the eye box, the range of field of view increases. Thus, increasing the diameter φ of the eye box is preferable. However, increasing the diameter φ of the eye box increases the thickness tk of the light guide 50, thereby making it difficult to design the light guide 50.

The diameter of an eye is approximately 5 mm in general. The position of the light guide 50 is adjusted as appropriate according to the diameter of the eye, which varies between individuals. The light guide 50 preferably has an eye relief L of greater than or equal to 15 mm to be applied to a virtual image display device in a pair of eyeglasses.

With an eye relief L of 20 mm and an eye box ranging from 5 mm through 10 mm, for example, the width w of the second surface 103b satisfies the following condition: 0.5 mm<w<3.0 mm.

With the width w of the second surface 103b below 0.5 mm, the width of the first surface 103a is reduced. However, reducing the width of the first surface 103a easily generates diffraction phenomenon of the incident image light, making it difficult to produce the light guide 50.

By contrast, with the width w of the second surface 103b above 3.0 mm, the density of the light rays of the incident image light reflected by the first surface 103a and exiting through the exit portion 104, resulting in a reduction in amount of light at the position of the eyes. Thus, it is desirable for the width w of the second surface 103b of the extraction portion 103 to satisfy the condition: 0.5 mm<w<3.0 mm.

The values of the width w of the second surface 103b differ between the respective second surfaces 103b. This successfully reduces the unevenness of light quantity.

Next, a description is provided of configuration and arrangement of an optical member 200 relative to a light-guide member 100 according to an embodiment of the present disclosure. The optical member 200 according to the present embodiment has a triangle shape in a plane view and is opposed to the extraction portion 103 of the light-guide member 100. Such a configuration ensures light transmissivity of the extraction portion 103 and the exit portion 104, i.e., see-through characteristics. The optical member 200 of the first light guide 50 serves to allow the image coming from the light-guide member 500 of the second light guide 60 to pass through the optical member 200 and advance to the light-guide member 100 of the light guide 50.

The optical member 200 according to the present embodiment includes a front face 210 as a parallel plane and an inclined portion 203. The front face 210 is parallel with the exit portion 104 of the rear face. The inclined portion 203 is inclined relative to the front face 210, facing the extraction portion 103 of the light-guide member 100. The inclined portion 203 of the optical member 200 is disposed close to the extraction portion 103 of the light-guide member 100. In the present embodiment, the inclined portion 203 has a shape that fits into the shape of the extraction portion 103 of the light-guide member 100 as illustrated in FIGS. 39A and 39B.

Figure 39A:
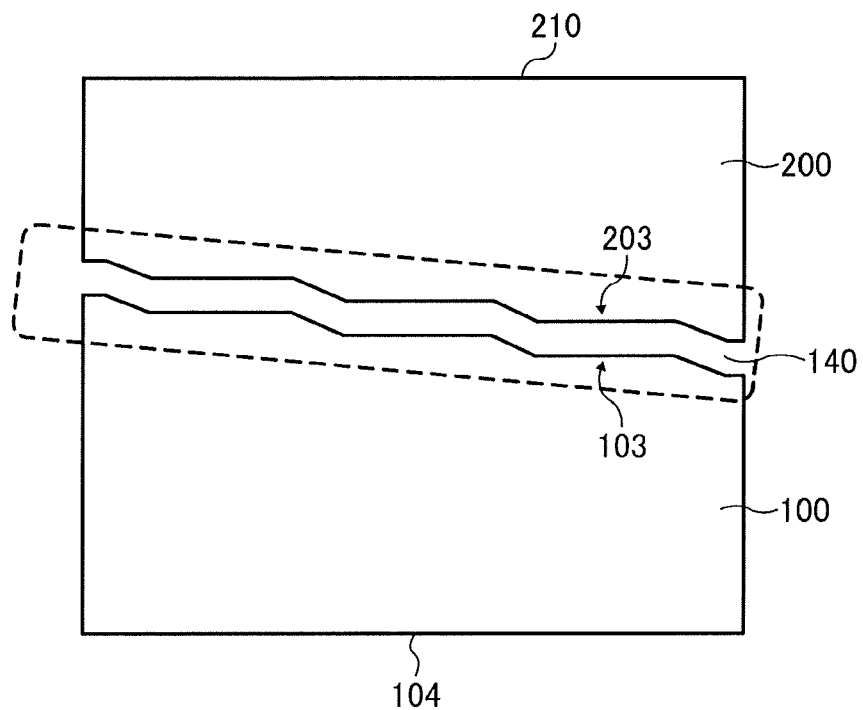
FIG. 39A is a schematic illustration of configurations of a light-guide member and an optical member according to an embodiment of the present disclosure.
Figure 39B:
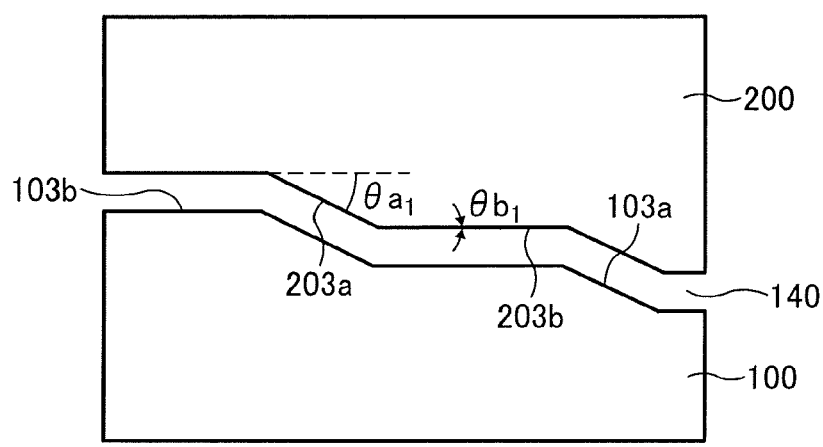
FIG. 39B is an enlarged view of a portion of an extraction portion of the light-guide member and the optical member of FIG. 39A.

FIGS. 39A and 39B each is an enlarged view of a boundary surface of the light-guide member 100 and the optical member 200. Referring to FIGS. 39A and 39B, the optical member 200 is disposed adjacent to the extraction portion 103 of the light-guide member 100 via an air gap 140 that is an air layer. In the examples of FIGS. 40A and 40B, the inclined portion 203 of the optical member 200 is bonded to the light-guide member 100 of the extraction portion 103 with the adhesive 150.

A description is provided of a configuration according to the present embodiment of the present disclosure, referring to FIGS. 39A and 39B. FIG. 39B represents a virtual plane parallel with the exit portion 104 indicated by dotted line. In the inclined portion 203 of the optical member 200, a third surface 203a and a fourth plane 203b alternate (refer to FIG. 39B). The third surface 203a is inclined relative the second front face 201 by an angle θa1. The fourth plane 203b is inclined relative to the second front face 201 by an angle θb1. The third surface 203a is opposed to the first surface 103a. Each fourth plane 203b is opposed to each second surface 103b.

The front face 210 is parallel with the exit portion 104 of the light-guide member 100. The fourth plane 203b is parallel with the front face 210, forming an angle θb1 of 0 degree between the fourth plane 203b and the front face 210. The fourth plane 203b is also parallel with the exit portion 104 of the light-guide member 100 and with the second surface 103b. In this case, each of the angles θb and θb1 is 0 degree. Such a configuration increases the see-through characteristics of the light guide 50. It is to be noted that when the fourth plane 203b is not parallel with the front face 210, the exit portion 104 of the light-guide member 100, and the second surface 103b, the see-through characteristics deteriorates due to the prism effect.

Preferably, the angle θa1 of inclination of the third surface 203a relative to the front face 210 is equal to the angle θa, that is, the angle of inclination of the extraction portion 103 relative to the exit portion 104. With such a configuration, the third surface 203a of the optical member 200 is made parallel with the first surface 103a of the light-guide member 100, thereby increasing the see-through characteristics of the light guide 50 (60).

To obtain the most advantageous effects of the see-through characteristics of the light guide 50 (60), any deviation between the first surface 103a and the third surface 203a opposed to the first surface 103a is eliminated or reduced when the first surface 103a of the light-guide member 100 shifts in the direction of the normal line of the exit portion 104 (upward in FIGS. 39A and 39B). Some deviation occurs during assembly. The light guide 50 still maintains the see-through characteristics with a deviation of 10 μm. To eliminate or minimize such a deviation, the optical member 200 may include an adjuster to adjust the air gap 140 which is a space between the light-guide member 100 and the optical member 200.

The light-guide member 100 and the optical member 200 are made of a common material to secure the see-through characteristics of the light guide 50 (60) in some embodiments.

In the case in which the light-guide member 100 and the optical member 200 are bonded to each other with air gap 140 as illustrated in FIGS. 39A and 39B, the first surface 103a of the extraction portion 103 is preferably applied with coating with a reflectivity of approximately 100%. Such a configuration allows the observation of a favorable image with less amount of light loss.

Next, a description is provided of a configuration in which the light-guide member 100 is bonded to the optical member 200 with the adhesive 150 according to an embodiment of the present disclosure. FIG. 44A illustrates an example in which the light-guide member 100 and the optical member 200 of FIGS. 39A and 39B are bonded to each other with the adhesive 150. In the same manner as in FIGS. 39A and 39B, the light-guide member 100 is opposed to the optical member 200 such that the positions of the first surfaces 103a of the light-guide member 100 coincide with the positions of the corresponding third surfaces 203a of the optical member 200, respectively. Such a configuration allows the maintaining of the see-through characteristics of the light guide 50 (60).

In some embodiments, the adhesive 150 has a refractive index that is equal to the refractive index of the material of the light-guide member 100. When the refractive index of the light-guide member 100 is equal to the refractive index of the adhesive 150, coating such as a half mirror is applied to a bonding boundary between the light-guide member 100 and the adhesive 150. Such a configuration allows the total reflection at the light-guide member 100, thereby maintaining the see-through characteristics of the light guide 50 (60).

FIG. 40B represents an embodiment in which the light-guide member 100 and the optical member 200 are fixed to each other with the adhesive 150 between the light-guide member 100 and the optical member 200, in the same manner as in FIG. 40A. FIG. 40B differs from FIG. 40A in the inclined portion 203 of the optical member 200 that faces the extraction portion 103 of the light-guide member 100. That is, FIG. 40B represents the inclined portion 203 that has an even surface, i.e., surface without unevenness. Even with such an inclined portion 203 having an even surface, the adhesive having a refractive index equal to the refractive index of the light-guide member 100 allows maintaining high see-through characteristics.

In the cases in which the light-guide member 100 is bonded to the optical member 200 with the adhesive 150, the total reflection fails to occur on the second surface 103b of the extraction portion 103 so that light fails to propagate through the light-guide member 100. Accordingly, coating having a reflection-transmission property is preferably applied to the first surface 103a and the second surface 103b. With such a configuration, externally coming light is not refracted by the first surface 103a, which allows a successful visual recognition of an external view.

As an example of bonding the light-guide member 100 to the optical member 200, the light-guide member 100 and the optical member 200 are bonded to each other with air gap 140 in FIGS. 39A and 39B. By contrast, in FIGS. 40A and 40B, the light-guide member 100 and the optical member 200 are bonded to each other with the adhesive 150. Alternative, in some embodiments, the light-guide member 100 may be directly bonded to the optical member 200. In this case as well, the total reflection fails to occur on the second surface 103b of the extraction portion 103 so that light fails to propagate through the light-guide member 100. Accordingly, coating having a reflection-transmission property is preferably applied to both the first surface 103a and the second surface 103b, in the same manner as in the case of employing the adhesive 150. With such a configuration, externally coming light is not refracted by the first surface 103a, which allows a successful visual recognition of an external view.

Next, a description is given of the configuration of a second light guide 60 that differs from the first light guide 50. A light-guide member 500 of a second light guide 60 includes an incidence portion 501, a reflective portion 502, an extraction portion 503, and an exit portion 504. The incidence portion 501 allows image light coming from an optical system to enter the incidence portion 501. The reflective portion 502 reflects and guides the image light having entered the incidence portion 501 into the light-guide member 500. The extraction portion 503 extracts the guided image light and the exit portion 504 emits the image light to the outside of the second light guide 60.

The light-guide member 500 of the second light guide 60 has a trapezoidal shape in a planar view, in the same manner as the light-guide member 100 of the first light guide 50. In the present embodiment, the incidence portion 501 and the reflective portion 502 form an inclination angle θ0 in the light-guide member 500, in the same manner as in the light-guide member 100 of the first light guide 50 (refer to FIG. 37). As a variation of the present embodiment, the inclination angle θ0 formed by the reflective portion 502 and the incidence portion 501 may be a different angle than that of the first light guide 50.

Figure 41:
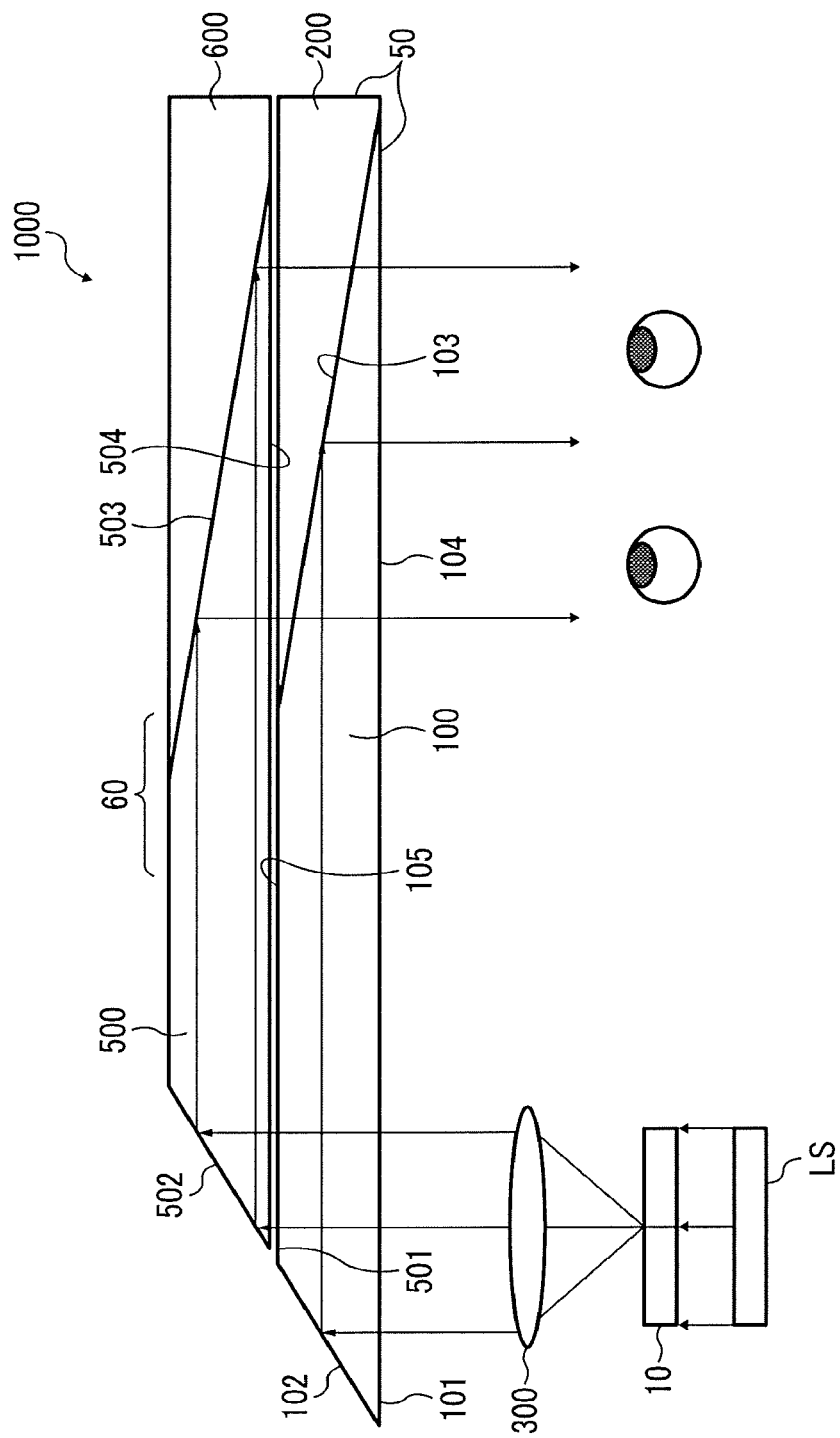
FIG. 41 is a plan view of a virtual image display device with the light guide unit of FIG. 35.

As illustrated in FIGS. 35, 36, and 41, the incidence portion 501, which allows image light from the optical system to enter the second light guide 60, of the second light guide 60 is disposed downstream in the optical path as compared to that of the first light guide 50. Accordingly, the second light guide 60 differs from the first light guide 50 in the longitudinal length of the light-guide member 500 and the optical member 600, i.e., the dimension along the optical path. The light-guide member 500 of the second light guide 60 is shorter in the longitudinal direction than the light-guide member 100 of the first light guide 50. Further, the optical member 600 of the second light guide 60 has a trapezoidal shape in a plan view, and is longer in the longitudinal direction than the optical member 200 of the first light guide 50.

More specifically, the light-guide member 500 of the second light guide 60 is disposed such that the reflective portion 502 of the second light guide 60 and the reflective portion 102 of the first light guide 50 form substantially a planar surface. In other words, the light-guide member 500 of the second light guide 60 is disposed such that the corner having an inclination angle θ0 formed by the incidence portion 501 and the reflective portion 502 is adjacent to the corner having an inclination angle of (180−θ0) formed by the reflective portion 102 and the front face 105 of the first light guide 50 (refer to FIG. 37). This arrangement allows image light having passed through the front face 105 of the first light guide 50 to enter the second light guide 60 through the incidence portion 501.

Further, the light-guide member 500 of the second light guide 60 is disposed such that the extraction portion 503 of the second light guide 60 deviates from the extraction portion 103 of the first light guide 50 along the longitudinal direction, i.e., the direction of propagation (travel) of image light. This arrangement allows adjusting and correcting the unevenness of quantity of light rays of image light emitted from the light guide unit 1000 as a whole and the unevenness of brightness of a virtual image to be visually observed. A detailed description is given later of the correction of the unevenness of brightness, referring to FIG. 42.

In the present embodiment, the dimension of the extraction portion 503 of the second light guide 60 in the longitudinal direction is substantially the same as that of the extraction portion 103 of the first light guide 50. As an example variation of the present embodiment, one of the extraction portions 103 and 503 may be longer than the other of the extraction portions 103 and 503.

Further, in the present embodiment, the extraction portion 503 of the second light guide 60 is disposed upstream from the extraction portion 103 of the first light guide 50 in the longitudinal direction, i.e., the direction of propagation of image light (that is, the left side in FIG. 15). Alternatively, the extraction portion 103 of the first light guide 50 may be disposed upstream from the extraction portion 503 of the second light guide 60 in the direction of propagation of image light. In this case, the optical member 600 of the second light guide 60 is shorter in longitudinal length than the optical member 200 of the first light guide 50.

The following describes the virtual display device VD including the light guide unit 1000 according to the present embodiment, referring to FIG. 41. In FIG. 41, the arrows represent optical paths of light rays of the image light emitted from the center of the image display surface of the image display element 10.

The virtual display device VD of FIG. 41 according to the present embodiment includes the image display element 10, a collimator optical system 300, and the light guide unit 1000. The image display element 10 outputs image light of a display image to the collimator optical system 300. The collimator optical system 300 collimates the image light and the collimated image light enters the light guide unit 1000. The image display element 10, the collimator optical system 300, and the light guide unit 1000 constitute the virtual image optical system VO.

The image display element 10 outputs image light corresponding to a display image, the image light which passes through the light guide unit 1000 to be displayed as a virtual image. Examples of the image display element 10 include, but not limited to, an organic light emitting diode (OLED) and a liquid crystal display element. Alternatively, other various display types are also applicable. For example, a digital micro-mirror device (DMD) is applicable as the image display element 10. Alternatively, in some embodiment, a thin film transistor (TFT) or a liquid crystal on silicon (LCOS) is applicable as the image display element 10. Alternatively, in some embodiment, a micro electro mechanical system (MEMS) is applicable as the image display element 10.

The image display element 10 of FIG. 41 according to the present embodiment is the LCOS or the DMD, in which a light source is employed together. In FIG. 41, a light source LS is employed to illuminate the image display element 10. Examples of the light source LS include a light emitting diode (LED), a semiconductor laser (laser diode (LD)), and a discharge lamp.

According to the present embodiment, the collimator optical system 300, which includes a plurality of optical lenses and a stop aperture, emits the image light for each pixel output from the image display element 10 as the parallel light.

In the virtual display device VD according to the present embodiment, the collimator optical system 300 enlarges and collimates the image light emitted from the image display element 10 illuminated with a light source LS. The collimated image light enters the first light guide 50 and the second light guide 60 of the light guide unit 1000. In other words, the image light collimated by the collimator optical system 300 enters the first light guide 50 through the incidence portion 101 of the light-guide member 100. In the present embodiment, a part of the image light having entered the first light guide 50 is reflected by the reflective portion 102 and is guided to travel through the light-guide member 100. Another part of the image light enters the second light guide 60 through the light-guide member 100. Specifically, the above-described another part (the light rays on the right in FIG. 41) of the image light having entered the first light guide 50 passes through the front face 105 of the light-guide member 100 and enters the second light guide through the incidence portion 501 without being reflected by the reflective portion 102.

The image light having been reflected by the reflective portion 102 of the first light guide 50 to be guided into the light-guide member 100 is reflected by the first surface 103*a* of the extraction portion 103 and exits from the exit portion 104 to the eyes of a user as image information. The image light having entered the incidence portion 501 of the second light guide 60 is reflected by the reflective portion 502 and is guided into the light-guide member 500. Subsequently, the guided image light is reflected by the first surface 103*a* of the extraction portion 503, and exits from the exit portion 504 to the outside.

The image light that has exited the second light guide 60 through the exit portion 504 passes through the first light guide 50 and exits through the exit portion 104 of the first light guide 50, traveling toward the eyes of a user, as image information. In the example configuration of FIG. 41, a part of the image light that exits from the exit portion 504 of the second light guide 60 and enters the first light guide 50 passes only through the light-guide member 100 of the first light guide 50. Another part of the light image passes through both the optical member 200 and the light-guide member 100. The above-described another part of the image light, which is to pass through both the optical member 200 and the light-guide member 100, travels through the inclined portion 203 of the optical member 200 and through the second surface 103*b* of the extraction portion 103, exiting the light-guide member 100 through the exit portion 104.

The user (observer) looks forward through the exit portions 104 and 504 and the optical members 200 and 600 of the light guide unit 1000 to visually identify a virtual image of the image light.

The following describes the occurrence of unevenness of brightness of light in the use of a single light guide, and a method for correcting the unevenness of brightness according to the present embodiment.

FIG. 42 represents the optical paths of image light emitted from the center of the image display surface of the image display element 10 as described above, using only the first light guide 50. The image light enters the light-guide member 100 through the incidence portion 101, and is partly reflected by the reflective portion 102 to be guided into the light-guide member 100. The guided image light is reflected by the first surface 103a of the extraction portion 103 to exit from the exit portion 104 and travel toward the eyes of a user, as image information. In this case, the image light that exit from the exit portion 104 includes light rays spaced apart from each other, as illustrated in FIG. 42. This might cause uneven brightness in a virtual image that is to be visually identified, according to the position of observation.

FIG. 43 represents the optical paths of image light emitted from the center of the image display surface of the image display element 10 as described above, using the light guide unit 1000 according to the present embodiment. As described above, a part of the image light is guided into the first light guide 50, and is reflected by the first surface 103a of the extraction portion 103. Another part of the image light is guided into the second light guide 60, and is reflected by the first surface 103a of the extraction portion 503. The reflected image light, which is reflected by the respective first surfaces 103a of the extraction portions 103 and 503, exits the first light guide 50 through the exit portion 104, and travels toward the eyes of a user as image information, as illustrated in FIG. 43. In this case, more light rays as the image light ultimately exit the first light guide 50 through the exit portion 104 than the case of FIG. 42 does.

In the present embodiment, the extraction portions 103 and 503 of the first light guide 50 and the second light guide 60, respectively deviate from each other along the direction of optical path, as described above. Accordingly, the light rays as image light that ultimately exit the first light guide 50 through the exit portion 104 are more closely spaced from each other than the case of FIG. 42 does.

FIG. 44 represents the optical paths of image light emitted from an area other than the center of the image display surface of the image display element 10 as described above, using only the first light guide 50. The image light similarly enters the light-guide member 100 through the incidence portion 101, and is partly reflected by the reflective portion 102 to be guided into the light-guide member 100. The guided image light is reflected by the first surface 103a of the extraction portion 103 to exit from the exit portion 104 and travel toward the eyes of a user as image information. In this case, the image light emitted from the exit portion 104 with an increase in viewing angle, i.e., light rays that are emitted from a position closer to the edge of the image display surface of the image display element 10 are reflected within the light-guide member 100 at a greater reflection angle, thus increasing the distance of propagation between reflection of the light rays. Such image light hits the first surface 103a of the extraction portion 103 at a greater interval than the image light emitted from the center of the image display surface does (refer to FIG. 42), the light rays of such image light that enter the eyes of a user are unevenly space apart from each other. Such light rays of image light might cause the uneven brightness of a virtual image to be visually identified.

FIG. 45 represents the optical paths of image light emitted from an area other than the center of the image display surface of the image display element 10 as described above, using the light guide unit 1000 according to the present embodiment. In the same manner as described above, a part of the image light is guided into the first light guide 50, and is reflected by the first surface 103a of the extraction portion 103. Another part of the image light is guided into the second light guide 60, and is reflected by the first surface 103a of the extraction portion 503. The reflected image light, which is reflected by the respective first surfaces 103a of the extraction portions 103 and 503, exits the first light guide 50 through the exit portion 104, and travels toward the eyes of a user as image information, as illustrated in FIG. 45. In this case, more light rays as the image light ultimately exit the first light guide 50 through the exit portion 104 than the case of FIG. 44 does.

In the present embodiment, the extraction portions 103 and 503 of the first light guide 50 and the second light guide 60, respectively deviate from each other along the direction of optical path, as described above. Accordingly, the light rays as image light that ultimately exit the first light guide 50 through the exit portion 104 are more closely spaced from each other than the case of FIG. 44 does.

The light guide unit 1000 according to the present embodiment includes two light guides 50 and 60 with the extraction portions 103 and 503 at different positions, respectively, and allow image light to enter and be guided into the light guide 50, emitting the image light from the exit portion 104 of the first light guide 50 to the eyes of a user as image information. The light guide unit 1000 according to the present embodiment complements the space between the light rays with image light emitted from the light guides 50 and 60, thereby improving the uneven brightness of a virtual image according to the position of the eyes of a user. In the present embodiment, the positions of the extraction portions 103 and 503 of the light guides 50 and 60, respectively are not different from each other. This arrangement relatively increases the lateral width of image light emitted from the light guide unit 1000, thus successfully increasing the size of an eye box.

In the above-described embodiments, a description is given of the example in which the incidence portion 101, 501 of FIGS. 35 through 46 is disposed on the left of an observer of a virtual image, allowing light image to enter the light-guide member 100 from the left as viewed from the observer. When the incidence portion 101, 501 is disposed on the opposite side, i.e., on the right of the observer, allowing the image light to enter the light guide 50, 60 from the right side as seen from the observer, the same advantageous effects are obtained as described above.

According to the above-described embodiments, the light guide unit 1000 having a wide viewing angle is provided, which allows a binocular light guide unit or a compact monocular light guide unit as a virtual-image observation system.

Example 8 A description is provided of a virtual image display device VD according to the following Example including the above-described light guide unit 1000, referring to FIG. 46. FIG. 46 is an illustration of image light that outputs from the light guide unit 1000 according to Example 8. FIG. 46 also represents the thickness tk and the longitudinal length Lk of the light guide unit 1000. The angles listed below are expressed by absolute values.

In Example 8, tk that is the thickness of the light guide unit 1000 is 3 mm, Lk that is a longitudinal length is 50 mm, and the width is 30 mm. The light guide unit 1000 includes light guides 50 and 60, each having the first surface 103a with an inclination angle θa of 30 degrees relative to the exit portion 104 (504) and each made of plastic with a refractive index (Nd) of 1.53. The light guide unit 1000 has a horizontal viewing angle of 40 degrees, and each light guide 50 (60) includes the second surface 103b having a width to obtain an eye box of greater than or equal to 5 mm with an eye relief of greater than or equal to 15 mm.

The configuration according to the present Example reduces the unevenness of brightness of the light rays of the image light that finally exits through the exit portion 104, particularly of the image light that exits from the center of the image display surface of the image display element 10.

According to the embodiments of the present disclosure, a light guide unit for use in a virtual image display device and a virtual image optical system can be provided that prevents or reduces uneven brightness of a virtual image to be observed while increasing a viewing angle.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A light guide, comprising:
a light-guide member including:
an incidence portion through which image light emitted from an image display element enters the light-guide member;
an exit portion through which the image light exits the light-guide member to an outside;
a retroreflection portion to reverse a direction of travel of the image light guided through the light-guide member; and
an extraction portion to guide the image light reversed by the retroreflection portion to the exit portion,
wherein the retroreflection portion has a plurality of surfaces,
the extraction portion includes a plurality of first surfaces and a plurality of second surfaces that are alternately disposed to guide the image light from the plurality of first surfaces to the exit portion, and
each of the first surfaces is inclined relative to the exit portion, and each of the second surfaces is parallel with the exit portion.

2. The light guide according to claim 1, wherein the retroreflection portion includes a plurality of prisms, each of which has an apex angle of 90 degrees.

3. The light guide according to claim 2, wherein the plurality of prisms is disposed on a surface vertical to the exit portion.

4. The light guide according to claim 1, wherein each of the first surfaces of the extraction portion faces the retroreflection portion.

5. The light guide according to claim 1, further comprising an optical member integrated with the light-guide member,
wherein the optical member includes a first face bonded to the light-guide member with an air layer interposed between the optical member and the light-guide member, and
the optical member includes a second face parallel with the exit portion of the light-guide member on an opposite side of the first face.

6. A virtual display device, comprising a virtual display optical system including the light guide according to claim 1 to guide and emit the image light.

7. A light guide comprising:
a light-guide member including:
an incidence portion through which image light emitted from an image display element enters the light-guide member;
an exit portion through which the image light exits the light-guide member to an outside;
a retroreflection portion having a plurality of surfaces to reverse a direction of travel of the image light guided through the light-guide member; and
an extraction portion to extract and guide the image light reversed by the retroreflection portion to the exit portion,
the extraction portion including:
a plurality of first surfaces, each of which is inclined relative to the exit portion at an angle θa;
a plurality of second surfaces, each of which is parallel with the exit portion; and
a plurality of third surfaces, each of which is inclined relative to the exit portion at an angle θc in an opposite direction of an inclination of each of the plurality of first surfaces,
the plurality of first surfaces, the plurality of second surfaces, and the plurality of third surfaces are disposed one by one in recited order toward the incidence portion to extract and guide the image light from the plurality of first surfaces to the exit portion.

8. The light guide according to claim 7, wherein each of the plurality of third surfaces of the extraction portion satisfies conditional formulas (1) and (2) below:

$$\theta a < 90 - \theta 1, \text{ and} \tag{1}$$

$$|90 - \theta c - \theta 1| < \sin^{-1}(1/n), \tag{2}$$

where
$|\theta 1|$ denotes a reflection angle of a light ray relative to each of the exit portion and the plurality of second surfaces, and the light ray is guided to travel through the light-guide member before reflected by the retroreflection portion, and
n denotes a refractive index of the light-guide member.

9. The light guide according to claim 7, wherein each of the plurality of third surfaces of the extraction portion satisfies conditional formulas (1) and (3) below:

$$\theta a < 90 - \theta 1, \text{ and} \tag{1}$$

$$|180 - 2\theta c - \theta 1| < \sin^{-1}(1/n), \tag{3}$$

where
$|\theta 1|$ denotes a reflection angle of a light ray relative to each of the exit portion and the plurality of second surfaces, and the light ray is guided to travel through the light-guide member before reflected by the retroreflection portion, and
n denotes a refractive index of the light-guide member.

10. The light guide according to claim 7, wherein each of the plurality of third surfaces of the extraction portion satisfies conditional formula (4) below:

$$\theta c > 90 - \theta 2, \tag{4}$$

where
$|\theta 2|$ denotes a reflection angle of a light ray relative to each of the exit portion and the plurality of second surfaces, and the light ray is guided to travel through the light-guide member after reflected by the retroreflection portion.

11. The light guide according to claim 7, wherein at least one of the plurality of third surfaces of the extraction portion is a scattering surface.

12. The light guide according to claim 7, wherein at least one of the plurality of third surfaces of the extraction portion is a curved surface.

13. A virtual display device, comprising:
a virtual display optical system including the light guide according to claim 8 to guide and emit the image light.

14. A light guide unit comprising:
a first light guide; and
a second light guide,
each of the first light guide and the second light guide including:
a light-guide member; and
an optical member integrated with the light-guide member,
the light-guide member including:
an incidence portion through which image light emitted from an image display element enters the light-guide member;
an exit portion through which the image light exits the light-guide member to an outside of the light-guide member;
a reflective portion inclined relative to the incidence portion, to guide the image light having entered the incidence portion, into a corresponding light guide of the first light guide and the second light guide; and
an extraction portion including a plurality of first surfaces and a plurality of second surfaces that are alternately disposed to extract and guide the image light from the plurality of the first surfaces to the exit portion, each of the plurality of first surfaces being inclined relative to the exit portion, each of the plurality of second surfaces being parallel with the exit portion,
the optical member including:
a parallel plane that is parallel with the exit portion of the light-guide member of the corresponding light guide of the first light guide and the second light guide; and
an inclined portion that is inclined relative to the parallel plane and opposed to the extraction portion,
wherein the first light guide is disposed adjacent to the second light guide with an air layer interposed between a face of the first light guide opposed to the exit portion and the exit portion of the second light guide.

15. The light guide unit according to claim 14, wherein the inclined portion of the optical member is disposed adjacent to the extraction portion of the light-guide member of the corresponding light guide.

16. A virtual display device comprising the light guide unit according to claim 14 to guide and emit the image light.

* * * * *